(12) United States Patent
Kwon et al.

(10) Patent No.: US 12,236,154 B2
(45) Date of Patent: Feb. 25, 2025

(54) ELECTRONIC DEVICE AND DISPLAY CONTROL METHOD THEREOF

(71) Applicant: Samsung Electronics Co., Ltd., Suwon-si (KR)

(72) Inventors: Yongjin Kwon, Suwon-si (KR); Hyoyeon Kim, Suwon-si (KR); Wooyoung Park, Suwon-si (KR); Sukjae Lee, Suwon-si (KR); Byungseok Jung, Suwon-si (KR); Seonghoon Choi, Suwon-si (KR); Jongwu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/545,350

(22) Filed: Dec. 19, 2023

(65) Prior Publication Data

US 2024/0118853 A1   Apr. 11, 2024

Related U.S. Application Data

(63) Continuation of application No. 17/882,964, filed on Aug. 8, 2022, now Pat. No. 11,868,671, which is a
(Continued)

(30) Foreign Application Priority Data

Feb. 19, 2019  (KR) ........................ 10-2019-0019500
Nov. 8, 2019   (KR) ........................ 10-2019-0142828

(51) Int. Cl.
*G06F 3/14*   (2006.01)
*G06F 1/16*   (2006.01)
(Continued)

(52) U.S. Cl.
CPC .......... *G06F 3/1423* (2013.01); *G06F 1/1641* (2013.01); *G06F 1/1652* (2013.01);
(Continued)

(58) Field of Classification Search
CPC .... G06F 3/1423; G06F 3/0416; G06F 3/0485; G06F 3/0488; G06F 3/04883;
(Continued)

(56) References Cited

U.S. PATENT DOCUMENTS 9,170,678 B2   10/2015  Cho et al.
9,684,342 B2   6/2017   Kim et al.
(Continued)

FOREIGN PATENT DOCUMENTS

CN   107871121 A    4/2018
EP   2 648 078 A2   10/2013
(Continued)

OTHER PUBLICATIONS

Chinese Office Action dated Jan. 11, 2024, issued in Chinese Patent Application No. 202010101721.7.
(Continued)

*Primary Examiner* — Mark Edwards
(74) *Attorney, Agent, or Firm* — Jefferson IP Law, LLP

(57) ABSTRACT

A mobile communication device is provided. The mobile communication includes a first touch display forming a portion of a first surface of the mobile communication device, a second touch display forming a portion of a second surface of the mobile communication device, and a processor configured to display in the first touch display a first screen corresponding to an application executed in a first folding state while a state of the device is the first folding state, identify the state of the mobile communication device changing to a second folding state, and display in the second touch display, based on the identification, a second screen
(Continued)

corresponding to the application and an image partially overlapping the second screen, a touch input on the second touch display while the second screen and the image are displayed in the second touch display as overlapping is configured to not be processed as an input.

20 Claims, 71 Drawing Sheets

Related U.S. Application Data continuation of application No. 16/793,614, filed on Feb. 18, 2020, now Pat. No. 11,409,488.

(51) Int. Cl.
*G06F 3/041* (2006.01)
*G06F 3/0485* (2022.01)
*G06F 3/0488* (2022.01)
*G06F 3/04883* (2022.01)
*G06F 3/04886* (2022.01)
*G06F 9/451* (2018.01)
*G06T 3/40* (2024.01)
*H04M 1/02* (2006.01)

(52) U.S. Cl.
CPC .......... *G06F 3/0416* (2013.01); *G06F 3/0485* (2013.01); *G06F 3/0488* (2013.01); *G06F 3/04883* (2013.01); *G06F 3/04886* (2013.01); *G06F 9/451* (2018.02); *G06T 3/40* (2013.01); *H04M 1/0216* (2013.01); *H04M 1/0268* (2013.01); *G06F 2203/04102* (2013.01); *H04M 2250/16* (2013.01)

(58) Field of Classification Search
CPC .. G06F 3/04886; G06F 1/1641; G06F 1/1652; G06F 9/451; G06F 2203/04102; H04M 1/0216; H04M 1/0268; H04M 2250/16; G06T 3/40
USPC ........................................................ 345/173
See application file for complete search history.

(56) References Cited

U.S. PATENT DOCUMENTS

| | | | |
|---|---|---|---|
| 9,992,327 | B1 | 6/2018 | Sharifi Mehr |
| 10,078,439 | B2 | 9/2018 | Chaudhri et al. |
| 10,452,171 | B2 | 10/2019 | Jung et al. |
| 2009/0089225 | A1 | 4/2009 | Baier et al. |
| 2011/0216064 | A1 | 9/2011 | Dahl et al. |
| 2011/0256848 | A1 | 10/2011 | Bok et al. |
| 2012/0117249 | A1 | 5/2012 | Jung et al. |
| 2013/0265257 | A1 | 10/2013 | Jung et al. |
| 2013/0300687 | A1 | 11/2013 | Park |
| 2014/0218321 | A1 | 8/2014 | Lee et al. |
| 2014/0354567 | A1 | 12/2014 | Park et al. |
| 2015/0015506 | A1 | 1/2015 | Lares |
| 2015/0317006 | A1 | 11/2015 | Cho et al. |
| 2015/0365306 | A1 | 12/2015 | Chaudhri et al. |
| 2015/0378557 | A1 | 12/2015 | Jeong et al. |
| 2016/0026381 | A1 | 1/2016 | Kim et al. |
| 2016/0077606 | A1 | 3/2016 | Hyun et al. |
| 2016/0132074 | A1 | 5/2016 | Kim et al. |
| 2017/0278482 | A1* | 9/2017 | Purushothaman ........ G06F 3/14 |
| 2018/0039410 | A1* | 2/2018 | Kim ........................ G06F 1/1652 |
| 2018/0203564 | A1 | 7/2018 | Putzolu et al. |
| 2018/0329580 | A1 | 11/2018 | Aurongzeb et al. |
| 2018/0335922 | A1 | 11/2018 | Nilo et al. |
| 2019/0018454 | A1 | 1/2019 | Jung et al. |
| 2020/0050416 | A1 | 2/2020 | Myung et al. |

FOREIGN PATENT DOCUMENTS

| | | |
|---|---|---|
| KR | 10-2012-0048312 A | 5/2012 |
| KR | 10-2013-0104682 A | 9/2013 |
| KR | 10-2014-0115226 A | 9/2014 |
| KR | 10-2014-0140891 A | 12/2014 |
| KR | 10-2015-0048575 A | 5/2015 |
| KR | 10-1569776 B1 | 11/2015 |
| KR | 10-2016-0030640 A | 3/2016 |
| KR | 10-1692252 B1 | 1/2017 |
| KR | 10-2018-0101964 A | 9/2018 |
| WO | 2018/066964 A1 | 4/2018 |
| WO | 2018/211825 A1 | 11/2018 |

OTHER PUBLICATIONS

European Office Action dated Mar. 15, 2024, issued in European Patent Application No. 22 186 586.8.
International Search Report dated May 26, 2020, issued in International Application No. PCT/KR2020/002401.
European Search Report dated Jun. 5, 2020, issued in European Application No. 20158016.4.
Extended European Search Report dated Nov. 14, 2022, issued in European Application No. 22186586.8-1224.
Summons to attend Oral Proceedings dated Nov. 24, 2022, issued in European Application No. 20158016.4-1224.
European Office Action dated May 26, 2023, issued in European Patent Application No. 20 158 016.4.
Office Action dated Aug. 4, 2023, issued in European Patent Application No. 22 186 586.8.
Notice of Allowance dated Sep. 11, 2023, issued in European Patent Application No. 20 158 016.4.

* cited by examiner

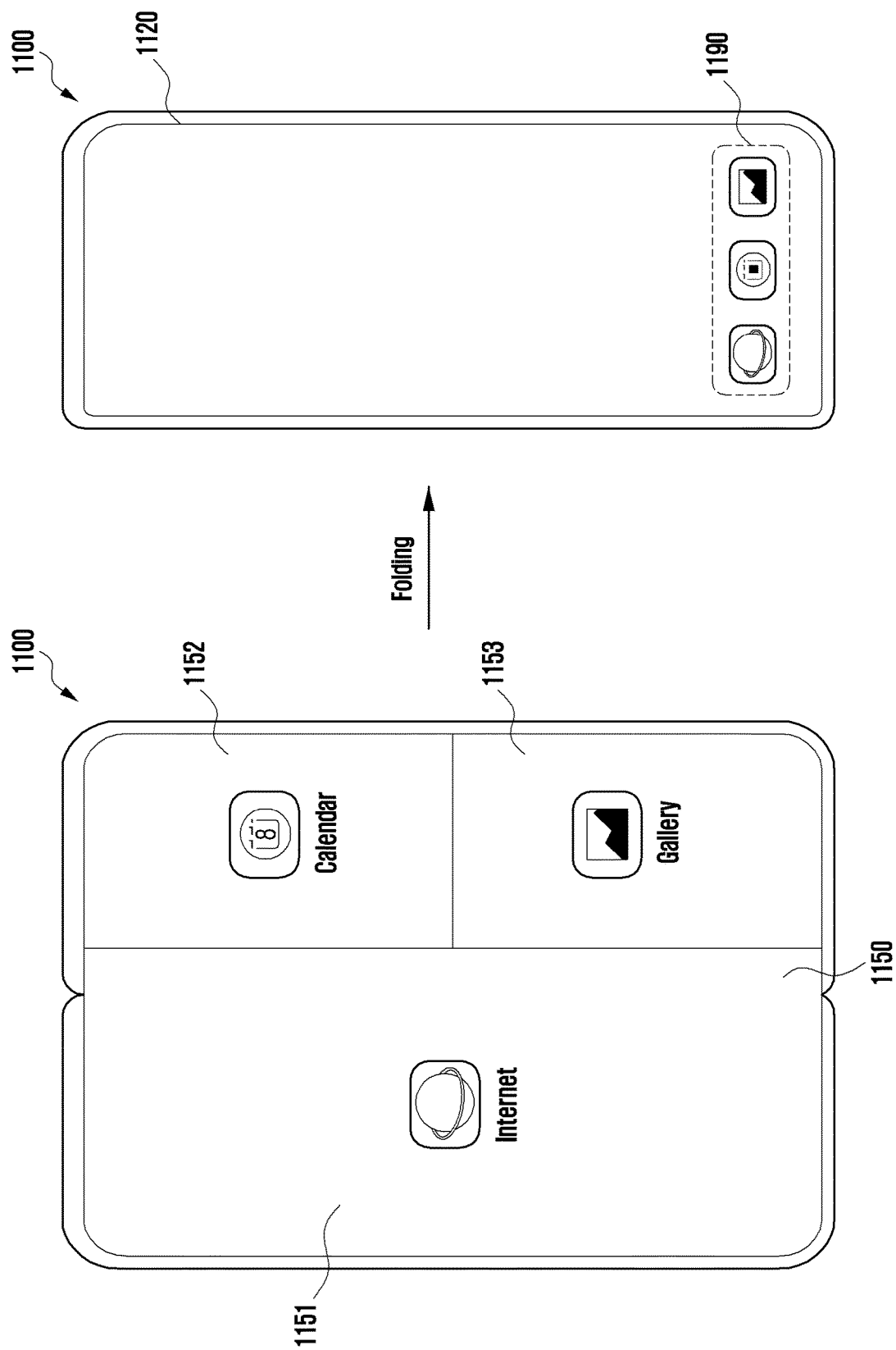

ELECTRONIC DEVICE AND DISPLAY CONTROL METHOD THEREOF

CROSS-REFERENCE TO RELATED APPLICATION(S)

This application is a continuation application of prior application Ser. No. 17/882,964 filed on Aug. 8, 2022; which is a continuation application of prior application Ser. No. 16/793,614, filed on Feb. 18, 2020, which issued as U.S. Pat. No. 11,409,488 on Aug. 9, 2022; and which claims priority under 35 U.S.C. § 119(a) of a Korean patent application number 10-2019-0019500, filed on Feb. 19, 2019, in the Korean Intellectual Property Office, and of a Korean patent application number 10-2019-0142828, filed on Nov. 8, 2019, in the Korean Intellectual Property Office, the disclosures of each of which is incorporated by reference herein in its entirety.

BACKGROUND

1. Field

The disclosure relates to an electronic device. More particularly, the disclosure relates to an electronic device including one or more displays.

2. Description of Related Art

With the growth of related technologies, electronic devices such as a smart phone have evolved to offer various essential or optional functions to users. In order for the user to easily access such functions, the electronic device includes a touch-sensitive display such as a touch screen and is capable of providing screens of various applications through the display.

Recently, in order to increase portability, a flexible display, and as a more improved form, a fully foldable display have been developed. The electronic device having such a foldable display can use a large display size in an unfolded state and also can reduce the entire volume thereof in a folded state. It is therefore possible to increase both usability and portability. Alternatively, the electronic device may include a plurality of displays separated from each other.

In case of the electronic device including the foldable display or the plurality of separated displays, the user takes an action of folding or unfolding the electronic device while directly gripping the housing of the electronic device. During this action, the user may often touch a portion of the display. Because the display and a touch sensor thereof are in an activated state, a user's unintentional touch on the display may be detected by the touch sensor and thereby causing any operation of application.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a control method thereof for processing, to be adapted for a user's intention, a touch event caused by a touch input generated during a folding or unfolding action.

Another aspect of the disclosure is to provide an electronic device and a control method thereof for appropriately configuring an application screen according to state information of an application during a folding or unfolding action.

Additional aspects will be set forth in part in the description which follows and, in part, will be apparent from the description, or may be learned by practice of the presented embodiments.

A mobile communication device may comprise a first touch display forming at least a portion of a first surface of the mobile communication device, a second touch display forming at least a portion of a second surface of the mobile communication device, and a processor configured to display in the first touch display a first screen corresponding to an application that is executed in a first folding state while a state of the mobile communication device is the first folding state, identify the state of the mobile communication device changing to a second folding state, and display in the second touch display, based on the identification, a second screen corresponding to the application and an image at least partially overlapping the second screen, wherein a touch input that is input on the second touch display while the second screen and the image are displayed in the second touch display as overlapping is configured to not be processed as an input on at least the portion of the second screen.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following detailed description, taken in conjunction with the accompanying drawings, in which:

FIGS. 11A, 11B, 11C, 11D, and 11E are screenshots showing a screen displayed on each display of an electronic device in a folding operation according to various embodiments of the disclosure;

The same reference numerals are used to represent the same elements throughout the drawings.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
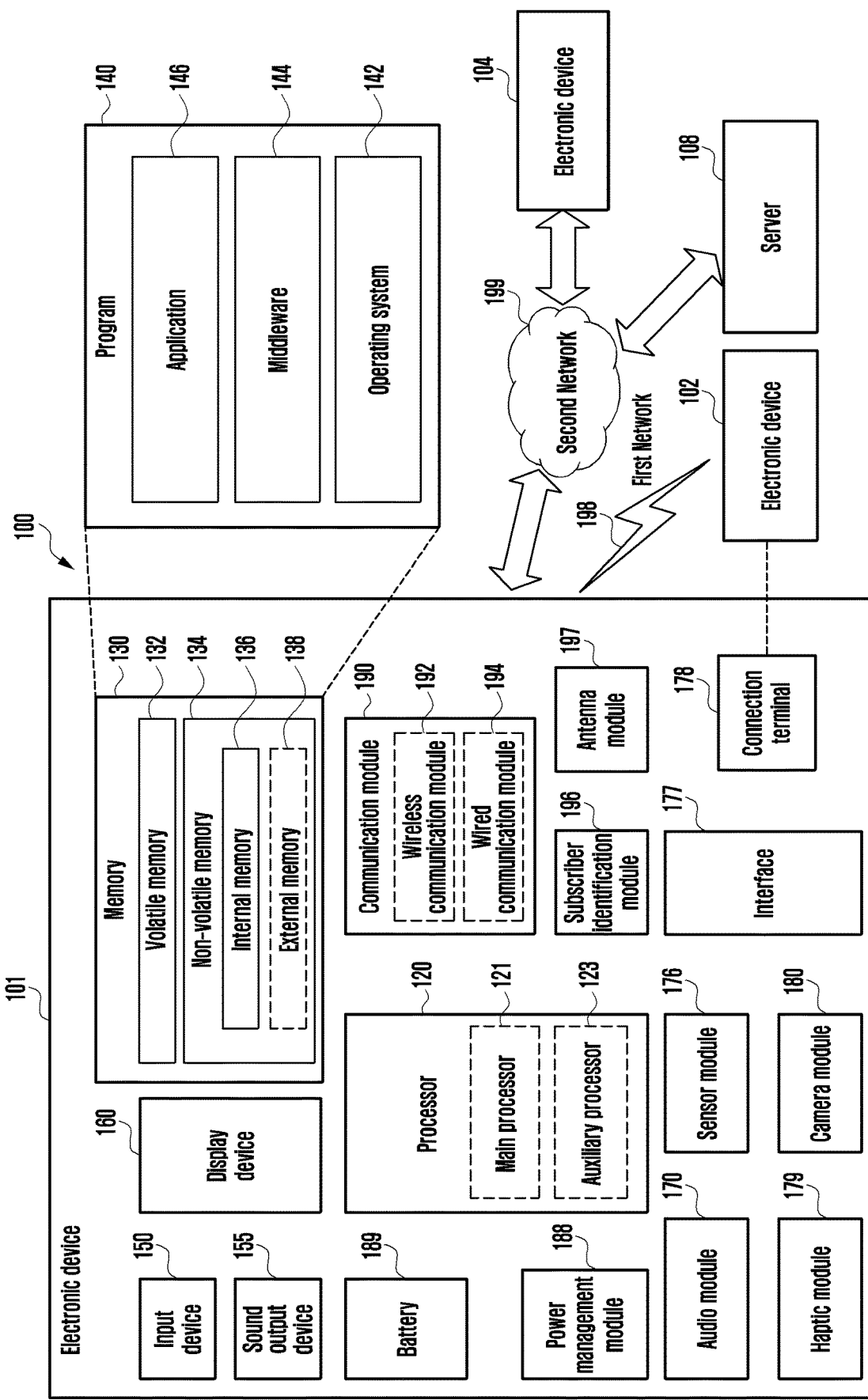
FIG. 1A is a block diagram illustrating an electronic device in a network environment according to an embodiment of the disclosure.

FIG. 1A is a block diagram illustrating an electronic device in a network environment according to an embodiment of the disclosure.

Referring to FIG. 1A, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an activated state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 1B:
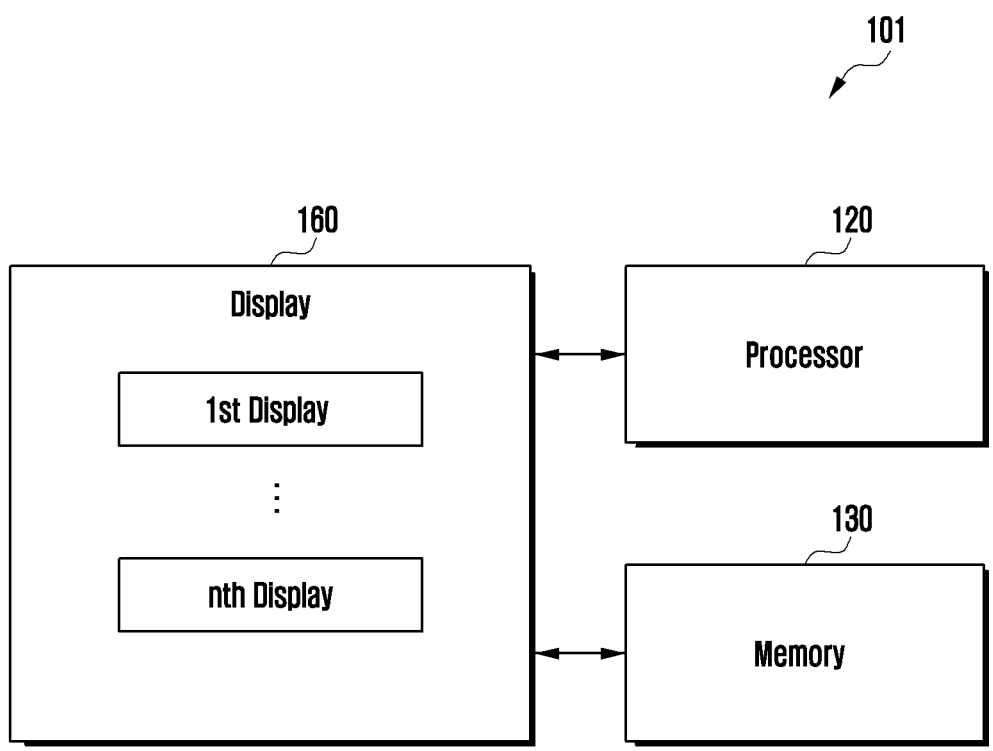
FIG. 1B is a block diagram illustrating an electronic device according to an embodiment of the disclosure.

FIG. 1B is a block diagram illustrating an electronic device according to an embodiment of the disclosure.

Referring to FIG. 1B, the electronic device 101 according to various embodiments may include at least one display 160, a processor 120, and a memory 130. Some of such components of the electronic device 101 may be omitted or replaced.

According to various embodiments, the components of the electronic device 101 are disposed in a housing of the electronic device 101, and the at least one display 160 may be seen from the outside in the housing.

According to various embodiments, the housing may be folded through a hinge structure. In areas of the housing separated by folding, the respective displays 160 or respective regions of the display 160 may be disposed.

According to various embodiments, the electronic device 101 may include one or more displays 160, at least one of which may include a touch sensor.

According to various embodiments, the electronic device 101 may be configured with various form factors. For example, the electronic device 101 may have an in-folding foldable display structure, an out-folding foldable display structure, a dual display structure, a G-type folding structure, an S-type folding structure, or a rollable display structure.

In the in-folding foldable display structure, the electronic device includes a foldable display, which has first and second areas separated from each other based on a folding axis and facing each other when the electronic device is folded. Therefore, when folding is completed, most (or all) of the display may not be exposed to the user. In the in-folding foldable display structure, the foldable display may be disposed on a first surface of the housing, and a non-foldable display may be disposed on a second surface of the housing. Therefore, in a folded state, the foldable display may not be seen from the outside, and the non-foldable display may be seen from the outside. According to some embodiments, the electronic device having the in-folding foldable display structure may include only the foldable display on the first surface and may not include a separate display on the second surface.

The in-folding foldable display structure will be described in detail with reference to FIGS. 2A to 4F.

In the out-folding foldable display structure, the electronic device includes a foldable display, which has first and second areas separated from each other based on a folding axis and disposed on opposite sides, respectively, to be seen from the outside when the electronic device is folded. In a folded state, the user can view a screen through the first area or the second area. In the out-folding foldable display structure as well, the foldable display may be disposed on the first surface of the housing, and a separate display may or may not be disposed on the second surface.

The out-folding foldable display structure will be described in detail with reference to FIGS. 21A to 21C.

In the dual display structure, the electronic device includes two displays physically separated from each other on one surface of the housing. For example, the housing of the electronic device may include first and second housing structures which are foldable with each other, and first and second displays may be disposed in the first and second housing structures, respectively. Each of the first and second housing structures may be folded in an in-folding or out-folding manner. When folded, the first and second displays may face each other in case of in-folding, and may be seen through opposite sides in case of out-folding. In addition, the electronic device having the dual display structure may further include a separate display on the other surface of the housing opposite to one surface on which the first and second displays are disposed.

The dual display structure will be described in detail with reference to FIGS. 29A and 29B.

The G-type folding structure is one of structures capable of folding based on two folding axes. The electronic device of the G-type folding structure may include, on one surface of the housing, a display that can be folded in three layers based on two folding axes. The display may be divided into a first area, a second area, and a third area, based on two folding axes. When the electronic device is folded, the first area may face the second area, and the third area may face the opposite side of the first area. Therefore, in a folded state, the display may not be seen from the outside.

The G-type folding structure will be described in detail with reference to FIGS. 31A and 31B.

The S-type folding structure is a structure capable of folding based on two folding axes like the G-type folding structure, but a part of the display may be seen from the outside in a folded state unlike the G-type folding structure.

The electronic device of the S-type folding structure includes a first housing structure, a second housing structure, and a third housing structure, which are distinguished based on two folding axes. A foldable first display may be disposed on one surface of the first and second housing structures, and a non-foldable second display may be disposed on one surface of the third housing structure. The surface on which the second display is disposed may be opposite to the surface on which the first display is disposed in an unfolded state of the electronic device. When the electronic device is folded, first and second areas of the first display which are divided based on one folding axis may face each other, and the second display may be seen from the outside.

The S-type folding structure will be described in detail with reference to FIGS. 32A to 32C.

The rollable display structure refers to a structure in which the electronic device can be rolled up.

The rollable display structure will be described in detail with reference to FIGS. 33A and 33B.

The electronic device according to various embodiments may have a widthwise folding structure (or a horizontal folding structure) or a lengthwise folding structure (or a vertical folding structure). The widthwise folding structure refers to a structure capable of folding the foldable display in a left and right direction based on a folding axis which extends vertically, and the lengthwise folding structure refers to a structure capable of folding the foldable display in an up and down direction based on a folding axis which extends horizontally.

In the disclosure, descriptions will be focused on the widthwise folding structure. However, various embodiments about the in-folding foldable display structure, the out-folding foldable display structure, the dual display structure, and the like may also be implemented as the lengthwise folding structure. The lengthwise (i.e., vertical) folding structure will be described for example with reference to FIGS. 19A to 19C.

According to various embodiments, the memory 130 may include a volatile memory and a nonvolatile memory, which are known in the art and not limited to specific implementation. The memory 130 may include at least some of configurations and/or functions of the memory 130 shown in FIG. 1A. In addition, the memory 130 may store at least a part of the program 140 shown in FIG. 1A.

The memory 130 may store various instructions being executable by the processor 120. Such instructions may include various control commands recognizable to the processor 120 in connection with arithmetic and logical operations, data transfer, input/output, and/or the like.

According to various embodiments, the processor 120 is configured to perform operations or data processing related to control and/or communication of components of the electronic device 101, and may include at least some of configurations and/or functions of the processor 120 shown in FIG. 1A. The processor 120 may be functionally, operatively, and/or electrically connected to internal components of the electronic device 101 including the at least one display 160 and the memory 130.

The operation and data processing functions that can be implemented by the processor 120 in the electronic device 101 are not limited. However, in the disclosure, descriptions will be focused on operations of processing a touch event and operations of displaying an application screen seamlessly when a folding or unfolding gesture occurs. The operations of the processor 120 to be described hereinafter may be performed by loading instructions stored in the memory 130.

According to various embodiments, the processor 120 may display a screen of an application on the at least one display 160 while the electronic device 101 is in an unfolded state. For example, when the electronic device 101 includes a foldable display (e.g., an in-folding foldable display or an out-folding foldable display), the processor 120 may display the application screen on the foldable display being in an unfolded state. When the electronic device 101 includes a dual display, the processor 120 may display the application screen on one part of the dual display, or divide the screen and display divided portions through first and second displays, respectively.

According to various embodiments, the processor 120 may detect a folding gesture when the electronic device 101 is in an unfolded state. The folding gesture may refer to a user's action of folding a part of the electronic device 101 based on the folding axis by applying force to the electronic device 101 being in the unfolded state. For example, when the electronic device 101 has an in-folding foldable display structure composed of first and second housing structures, the user may inwardly fold the electronic device while holding front and rear sides of the first housing structure with his right hand and also holding front and rear sides of the second housing structure with his left hand. The electronic device 101 may include a sensor (not shown) for sensing the folding of the electronic device 101. The sensor may detect a folding gesture through a rotation angle of a part of the housing on the folding axis.

According to various embodiments, the processor 120 can determine the folding state based on the angle formed by the folding axis. For example, when the angle formed by a first area and a second area, separated based on the folding axis, is close to a completely folded angle (e.g., 0° or 10°), the processor determines that the device is in the folding state (or a first folding state). If the angle is close to a completely unfolded angle (e.g., 170° or 180°), the processor determines that the device is in an unfolding state (or a second folding state). According to various embodiments, unfolding According to various embodiments, when a folding gesture is started, the processor 120 may stop transmission of a touch event to each display 160. This is because a touch on the display 160 during the folding gesture is not a user's intention. In some embodiments, when the folding gesture is started, the processor 120 may ignore a received touch event rather than request the touch sensor to stop transmitting the touch event. That is, even if a touch event is received, it may not be provided to an application. According to various embodiments, the processor 120 may cancel a touch event (e.g., a press event or a release event) having been provided to an application before the folding gesture is started. For example, the processor 120 may cancel the execution of the application to be carried in response to the touch event, or cancel the execution of the application having been already carried in response to the touch event.

According to various embodiments, when the folding gesture is started, the processor 120 may provide an application with a cancel event corresponding to a touch event previously provided. For example, even if a press event actually occurs during the folding gesture, it is not a user's intention. Thus, the processor 120 may provide the cancel event to the application even if the press event is received from the touch sensor. This prevents the application from being operated wrongly by recognizing a touch for folding as a touch event.

According to various embodiments, when the electronic device 101 is folded, the processor 120 may change an area of the display 160 to display an application. For example, when the electronic device 101 has an in-folding foldable display structure, an application screen may be displayed using both a foldable first display disposed on one housing surface and a non-foldable second display disposed on the other housing surface. When the electronic device has an out-folding foldable display structure, the application screen may be displayed on any one of first and second areas separated based on a folding axis of a foldable display. In case where most of a display is not viewed to the user among the above-described various form factors (e.g., in case where there is no rear display in the in-folding foldable display structure or in the dual display structure), the application is no longer displayed and may be operated in the background when the electronic device is folded.

According to various embodiments, as the area in which the application is displayed is changed, the processor 120 may generate an application screen based on the attributes (e.g., size, ratio, resolution, and the like) of the changed area. The processor 120 may provide the application with a folding event and also attribute information of an area in which the application will be displayed after folding.

For example, in case where the electronic device 101 has an in-folding foldable display structure, the processor 120 may generate the application screen based on the attributes (e.g., size, ratio, resolution) of the second display when folding. In case where the electronic device has an out-folding foldable display structure, the processor 120 may generate, when folding, the application screen based on the attributes of an area (e.g., being placed in a user's gaze direction) selected from the first and second areas.

According to various embodiments, the processor 120 may determine whether an execution screen of an application is resizable.

When the application displayed on the display 160 in an unfolded state is a resizable application (e.g., an Internet browser), and when a folding gesture is detected, the processor 120 may resize a screen of the application based on the attributes of the changed display area.

When the application displayed on the display 160 in an unfolded state is a non-resizable application (e.g., a game application), and when a folding gesture is detected, the processor 120 may output a menu for selecting a restart (i.e., re-execution) or continuation (i.e., continued execution) of the application.

According to various embodiments, the processor 120 may generate a touch lock screen in response to a folding gesture, and display the touch lock screen in an area to display an application screen after folding. The touch lock screen may be determined according to state information (e.g., security level and/or whether being resizable) of the running application.

According to various embodiments, the processor 120 may display the touch lock screen on an upper layer of the screen to be displayed on the changed area when folding. The processor 120 may display the touch lock screen in the foreground to cover the screen of the top-level application on the z-order, thereby preventing an unintended touch event from being transmitted to the application.

According to various embodiments, after displaying the touch lock screen, the processor 120 may process a touch event received from the touch sensor of the display 160 on which the application execution screen is displayed. After displaying the touch lock screen, the processor 120 may release the touch lock screen in response to a touch event received from the display 160 and provide the touch event to the application being executed.

According to various embodiments, the processor 120 may operate in a non-secure mode, a weak secure mode, or a strong secure mode, depending on a security level assigned to an application. When folding, the processor 120 may generate and display the touch lock screen corresponding to the security level of the application being executed. Alternatively, based on the attributes of a folding gesture, the processor 120 may determine the security level or the execution mode.

Figure 2A:
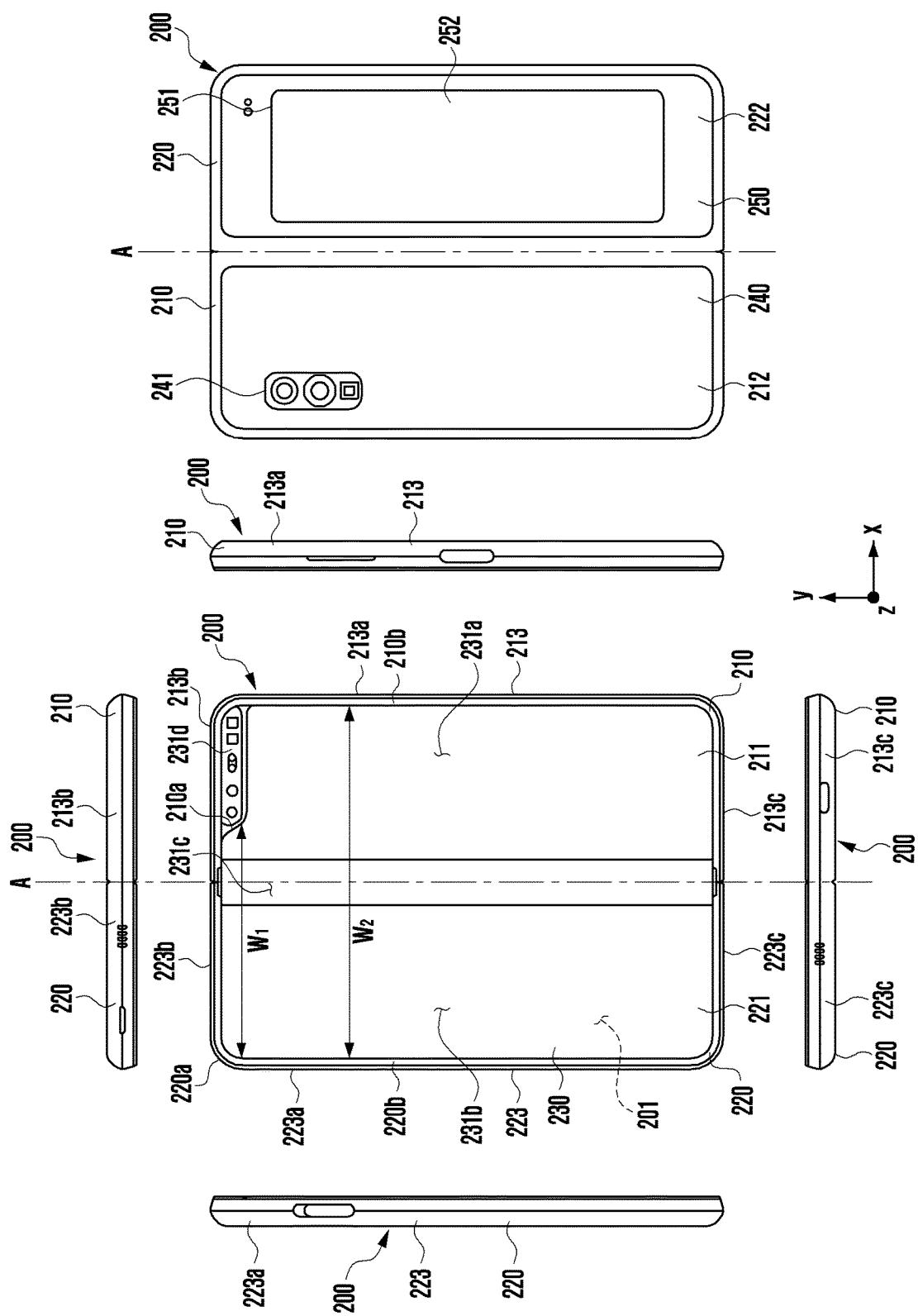
FIGS. 2A and 2B are views showing an unfolded state and a folded state of an electronic device according to various embodiments of the disclosure.

FIG. 2A is a view showing an unfolded state of an electronic device according to an embodiment of the disclosure.

According to various embodiments, the electronic device may include a first display and a second display which are separated from each other. The first display may be foldable, and the second display may be non-foldable.

Referring to FIG. 2A, an electronic device 200 may include a pair of housing structures 210 and 220 that are rotatably combined with each other through a hinge structure (e.g., a hinge structure 264 in FIG. 3), a hinge cover 265 that covers a foldable portion of the pair of housing structures 210 and 220, and a first display 230 (e.g., a flexible display or a foldable display) that is disposed in a space formed by the pair of housing structures 210 and 220. In the disclosure, a surface on which the display 230 is disposed is defined as a front surface (or a first surface) of the electronic device 200, and the opposite surface of the front surface is defined as a rear surface (or a second surface) of the electronic device 200. Also, a surface surrounding a space between the front and rear surfaces is defined as a lateral surface of the electronic device 200.

In an embodiment, the pair of housing structures 210 and 220 may include a first housing structure 210 having a sensor area 231*d*, a second housing structure 220, a first rear cover 240, and a second rear cover 250. The pair of housing structures 210 and 220 of the electronic device 200 is not limited to the shape and configuration shown in FIGS. 2A and 2B, and may be implemented with any other shape and configuration. For example, in another embodiment, the first housing structure 210 and the first rear cover 240 may be integrally formed, and also the second housing structure 220 and the second rear cover 250 may be integrally formed.

In an embodiment, the first housing structure 210 and the second housing structure 220 are disposed at both sides with respect to a folding axis (indicated by 'A'), and may have a generally symmetric shape with respect to the folding axis (A). As will be described later, the first and second housing structures 210 and 220 may have different angles or distances therebetween, depending on whether the electronic device 200 is in an unfolded state (also referred to as a flat state or an open state), a folded state (also referred to as a closed state), or an intermediate state. In the illustrated embodiment, contrary to the second housing structure 220, the first housing structure 210 has the sensor area 231*d* in which various sensors are disposed. Excepting this, both housing structures may be symmetrical in shape. In another embodiment, the sensor area 231*d* may be alternatively or additionally disposed in the second housing structure 220.

In an embodiment, the first housing structure 210 is connected to the hinge structure (e.g., the hinge structure 264 in FIG. 3) and may include a first surface 211 corresponding to a portion of the front surface of the electronic device 200 and facing in a first direction, a second surface 212 corresponding to a portion of the rear surface of the electronic device 200 and facing in a second direction opposite to the first direction, and a first lateral member 213 partially surrounding a space between the first surface 211 and the second surface 212. In an embodiment, the first lateral member 213 may include a first lateral surface 213a disposed in parallel with the folding axis (A), a second lateral surface 213b extended perpendicularly to the folding axis (A) from one end of the first lateral surface 213a, and a third lateral surface 213c extended perpendicularly to the folding axis (A) from the other end of the first lateral surface 213a.

In an embodiment, the second housing structure 220 is connected to the hinge structure (e.g., the hinge structure 264 in FIG. 3) and may include a third surface 221 corresponding to a portion of the front surface of the electronic device 200 and facing in a third direction, a four surface 222 corresponding to a portion of the rear surface of the electronic device 200 and facing in a fourth direction opposite to the third direction, and a second lateral member 223 partially surrounding a space between the third surface 221 and the fourth surface 222. In an embodiment, the second lateral member 213 may include a fourth lateral surface 223a disposed in parallel with the folding axis (A), a fifth lateral surface 223b extended perpendicularly to the folding axis (A) from one end of the fourth lateral surface 223 a, and a sixth lateral surface 223c extended perpendicularly to the folding axis (A) from the other end of the fourth lateral surface 223a. In the folded state, the first surface 211 and the third surface 221 may face each other.

In an embodiment, the electronic device 200 may include a recess 201 formed through a structural shape coupling of the first and second housing structures 210 and 220 to accommodate the display 230 therein. The recess 201 may have the substantially same size as the display 230. In an embodiment, the recess 201 may have two or more different widths in a direction perpendicular to the folding axis (A) because of the sensor area 231d. For example, the recess 201 may have a first width (w1) between a first portion 220a of the second housing structure 220 parallel to the folding axis (A) and a first portion 210a of the first housing structure 210 formed at one edge of the sensor area 231d, and a second width (w2) between a second portion 220b of the second housing structure 220 parallel to the folding axis (A) and a second portion 210b of the first housing structure 210 not corresponding to the sensor area 231d and being parallel to the folding axis (A). In this case, the second width (w2) may be greater than the first width (w1). That is, the first portion 210a of the first housing structure 210 and the first portion 220a of the second housing structure 220, which have asymmetrical shapes, form the first width (w1) of the recess 201, whereas the second portion 210b of the first housing structure 210 and the second portion 220b of the second housing structure 220, which have symmetrical shapes, form the second width (w2) of the recess 201. In an embodiment, the first portion 210a and the second portion 210b of the first housing structure 210 may have different distances from the folding axis (A). The width of the recess 201 is not limited to the illustrated example. In various embodiments, the recess 201 may have two or more different widths depending on the shape of the sensor area 231d or asymmetrical shapes of the first and second housing structures 210 and 220.

In an embodiment, at least a portion of the first and second housing structures 210 and 220 may be formed of a metallic or non-metallic material having a selected rigidity value to support the display 230.

In an embodiment, the sensor area 231d may be formed to occupy a certain region adjacent to one corner of the first housing structure 210. The arrangement, shape, and size of the sensor area 231d are not limited to the illustrated example. In another embodiment, the sensor area 231d may be formed at any other corner of the first housing structure 210 or at any position between top and bottom corners. In still another embodiment, the sensor area 231d may be formed in a portion of the second housing structure 220. In yet another embodiment, the sensor area 231d may be formed in a portion of both the first and second housing structures 210 and 220. In various embodiments, components for performing various functions may be embedded in the electronic device 200 and exposed to the front surface of the electronic device 200 through the sensor area 231d or through one or more openings formed in the sensor area 231d. In embodiments, such components may include at least one of a front camera device, a receiver, a proximity sensor, an illuminance sensor, an iris recognition sensor, an ultrasonic sensor, or an indicator.

In an embodiment, the first rear cover 240 may be disposed on the second surface 212 of the first housing structure 210, and may have a substantially rectangular periphery. The periphery may be surrounded, at least in part, by the first housing structure 210. Similarly, the second rear cover 250 may be disposed on the fourth surface 222 of the second housing structure 220, and a substantially rectangular periphery thereof may be surrounded, at least in part, by the second housing structure 220.

In the illustrated embodiment, the first rear cover 240 and the second rear cover 250 may have substantially symmetrical shapes with respect to the folding axis (A). In another embodiment, the first and second rear covers 240 and 250 may have various different shapes. In yet another embodiment, the first rear cover 240 may be integrally formed with the first housing structure 210, and the second rear cover 250 may be integrally formed with the second housing structure 220.

In an embodiment, the first rear cover 240, the second rear cover 250, the first housing structure 210, and the second housing structure 220 may provide together a space in which various components of the electronic device 200 (e.g., a PCB, an antenna module, a sensor module, or a battery) are disposed. In an embodiment, one or more components may be disposed near and visually exposed to the rear surface of the electronic device 200. For example, one or more components or sensors may be visually exposed through a first rear area 241 of the first rear cover 240. In various embodiments, such sensors may include a proximity sensor, a rear camera device, and/or a flash. In another embodiment, at least a portion of a sub display 252 may be visually exposed through a second rear area 251 of the second rear cover 250.

The display 230 may be disposed in a space formed by the pair of housing structures 210 and 220. For example, the display 230 may be mounted in the recess 201 formed by the pair of housing structures 210 and 220 while occupying most of the front surface of the electronic device 200. Therefore, the front surface of the electronic device 200 may include the display 230, a portion (e.g., a periphery) of the first housing structure 210 adjacent to the display 230, and a portion (e.g., a periphery) of the second housing structure 220. In addition, the rear surface of the electronic device 200 may include the first rear cover 240, a portion (e.g., a periphery) of the first housing structure 210 adjacent to the first rear cover 240, the second rear cover 250, and a portion (e.g., a periphery) of the second housing structure 220 adjacent to the second rear cover 250.

In an embodiment, the display 230 may refer to a display that allows at least a portion thereof to be deformed into a curved surface. In an embodiment, the display 230 may include a folding area 231c, a first area 231a disposed on one side (e.g., the right side) with respect to the folding area 231c, and a second area 231b disposed on the other side (e.g., the left side) with respect to the folding area 231c. For example, the first area 231a may be disposed on the first surface 211 of the first housing structure 210, and the second area 231b may be disposed on the third surface 221 of the second housing structure 220. Such divided areas of the display 230 are exemplary only, and the display 230 may be divided into a plurality of areas (e.g., two, four or more) according to the structure or function thereof. Although, in an embodiment shown in FIG. 2A, the display 230 is divided into areas based on the folding area 231c running in parallel with the folding axis (A) corresponding to the y-axis, the display 230 in another embodiment may be divided into areas based on another folding area running in parallel with another folding axis (e.g., corresponding to the x-axis). The above division of the display is merely a virtual division based on the pair of housing structures 210 and 220 and the hinge structure (e.g., the hinge structure 264 in FIG. 3). In practice, regardless of the pair of housing structures 210 and 220 and the hinge structure 264, the display 230 is capable of displaying one full screen. In an embodiment, the first area 231a and the second area 231b may have symmetrical shapes as a whole with respect to the folding area 231c. However, unlike the second area 231b, the first area 231a may have a cut portion (e.g., a cut portion 233 in FIG. 3) for exposing the sensor area 231d, resulting in an asymmetrical shape. Thus, strictly, the first and second areas 231a and 231b may have a symmetrical portion and an asymmetrical portion.

Figure 2B:
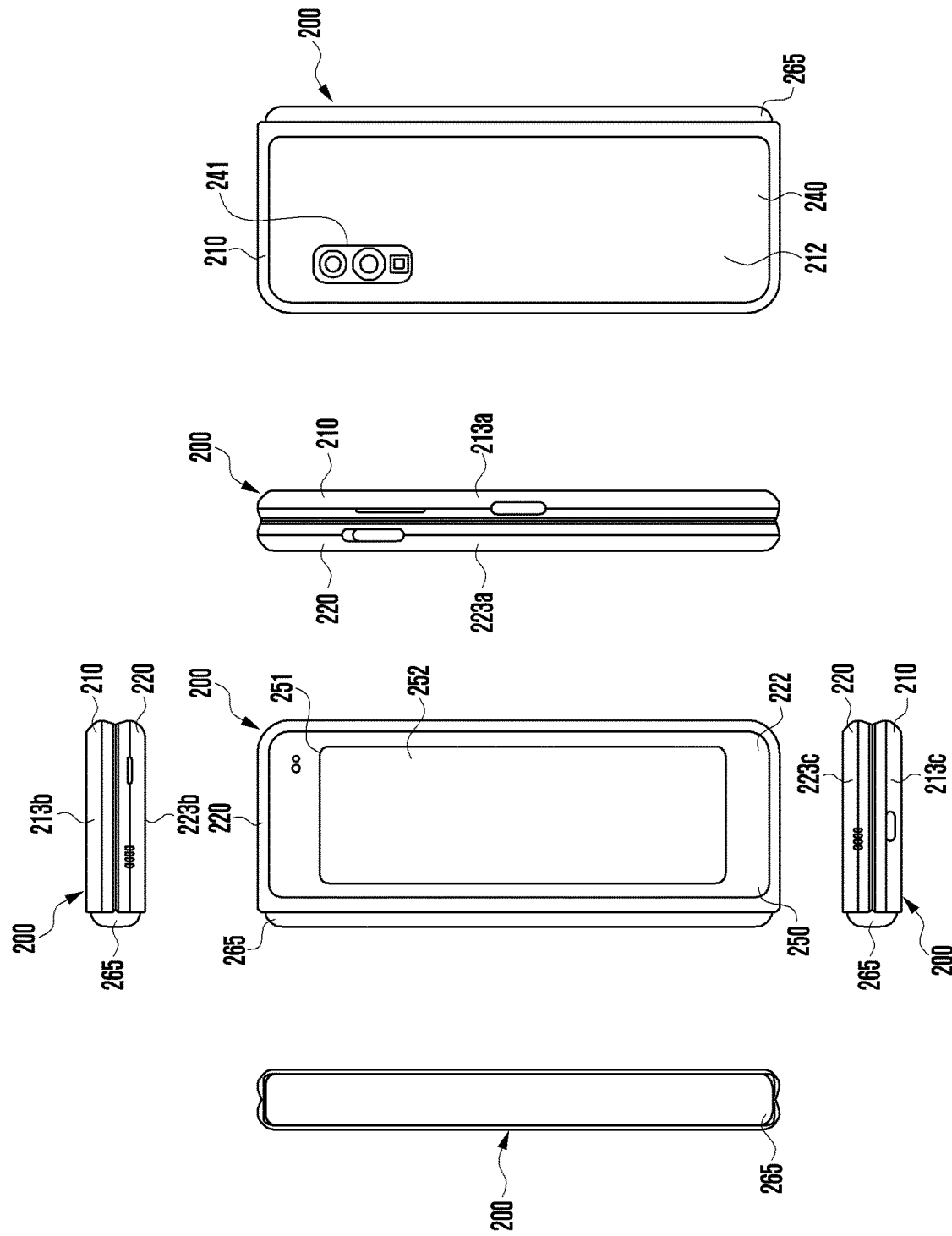

FIG. 2B is a view showing a folded state of an electronic device according to an embodiment of the disclosure.

Figure 3:
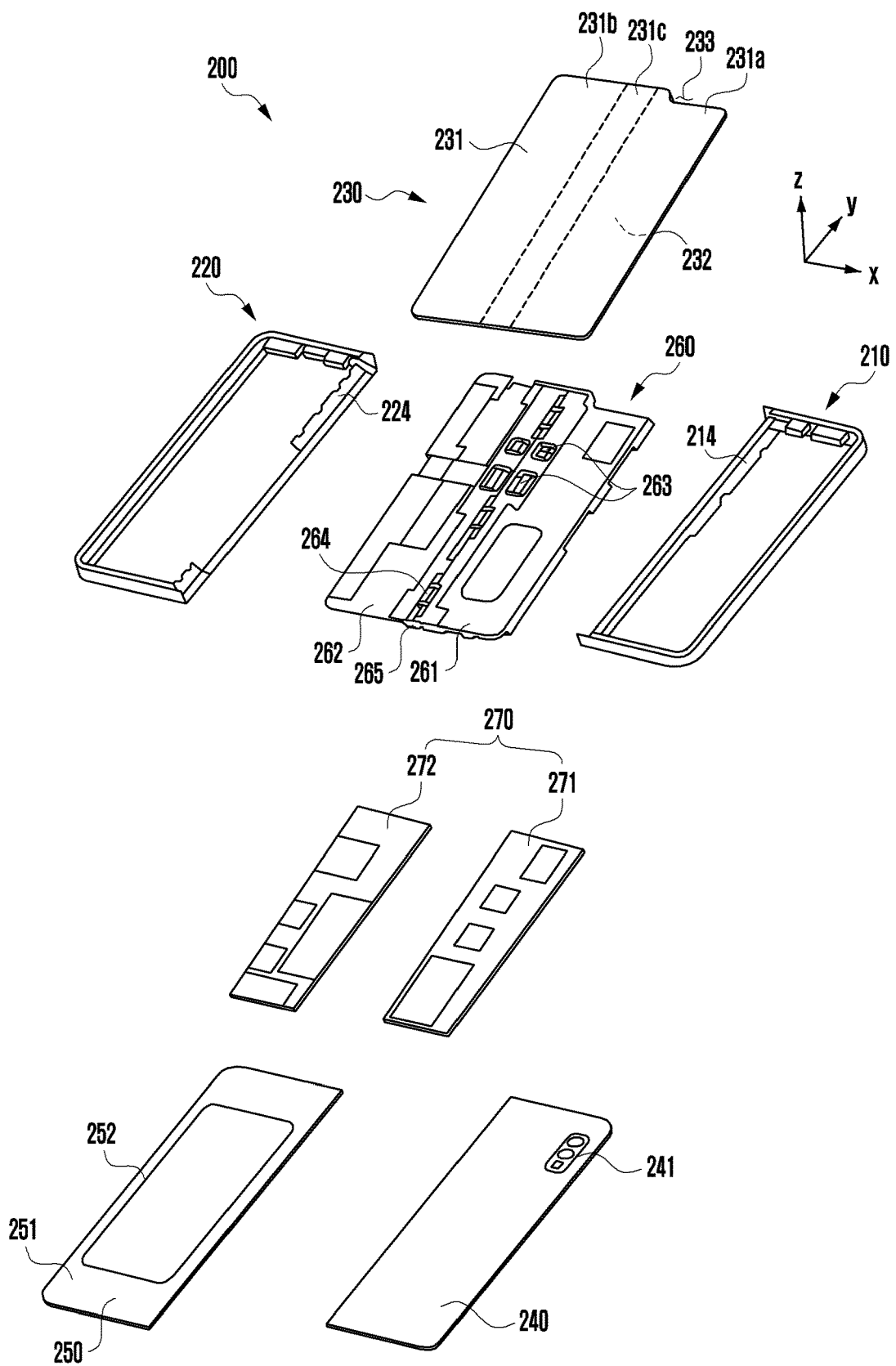
FIG. 3 is an exploded perspective view showing an electronic device according to an embodiment of the disclosure.

Referring to FIG. 2B, the hinge cover 265 is disposed between the first housing structure 210 and the second housing structure 220 to cover any underlying component (e.g., the hinge structure 264 in FIG. 3). In an embodiment, depending whether the electronic device 200 is in the unfolded state or in the folded state, the hinge cover 265 may be hidden by a part of the first and second housing structures 210 and 220 or exposed to the outside.

When the electronic device 200 is in the unfolded state as shown in FIG. 2A, the hinge cover 265 may be hidden by the first and second housing structures 210 and 220, thus being not exposed. When the electronic device 200 is in the folded state (e.g., a completely folded state) as shown in FIG. 2B, the hinge cover 265 may be exposed to the outside between the first and second housing structures 210 and 220. When the electronic device 200 is in the intermediate state where the first and second housing structures 210 and 220 are folded with a certain angle, the hinge cover 265 may be partially exposed to the outside between the first and second housing structures 210 and 220. The exposed area in the intermediate state may be smaller than that in the completely folded state. In an embodiment, the hinge cover 265 may have a curved surface.

Hereinafter, in each particular state of the electronic device 200, the operations of the first and second housing structures 210 and 220 and the respective areas of the display 230 will be described.

In an embodiment, when the electronic device 200 is in the unfolded state (e.g., FIG. 2A), the first housing structure 210 and the second housing structure 220 are disposed to form an angle of 180 degrees with each other, and thus the first and second areas 231a and 231b of the display 230 face the same direction. In addition, the folding area 231c may form the same plane as the first and second areas 231a and 231b.

In an embodiment, when the electronic device 200 is in the folded state (e.g., FIG. 2B), the first housing structure 210 and the second housing structure 220 are disposed to face each other. Thus, the first and second areas 231a and 231b of the display 230 may form a very small angle (e.g., between 0 and 10 degrees) and face each other. In addition, the folding area 231c may form, at least in part, a curved surface having certain curvature.

In an embodiment, when the electronic device 200 is in the intermediate state, the first housing structure 210 and the second housing structure 220 are disposed to form a certain angle. Thus, the first and second areas 231a and 231b of the display 230 may form a certain angle which is greater than the angle in the folded state and smaller than the angle in the unfolded state. In addition, the folding area 231c may form, at least in part, a curved surface having certain curvature which is smaller than the curvature in the folded state. In an embodiment, the electronic device 200 may determine that the electronic device 200 is in an at least partially folded state when the electronic device 200 is in the intermediate state or the completely folded state.

FIG. 3 is an exploded perspective view showing an electronic device according to an embodiment of the disclosure.

Referring to FIG. 3, in an embodiment, the electronic device 200 may include the first housing structure 210, the second housing structure 220, the display 230, the first rear cover 240, and the second rear cover 250 all of which are described above. The electronic device 200 may further include a bracket assembly 260 and at least one printed circuit board (PCB) 270. The display 230 may be also referred to as a display module, a display assembly, or a display unit.

The display 230 (or the first display) may include a display panel 231 (e.g., a flexible display panel) and at least one plate or layer 232 on which the display panel 231 is mounted. In an embodiment, the plate 232 may be disposed between the display panel 231 and the bracket assembly 260. The display panel 231 may be disposed on one surface (e.g., a surface in the z-axis direction in FIG. 3) of the plate 232. The plate 232 may be formed in a shape corresponding to the display panel 231. For example, a portion of the plate 232 may be formed in a shape corresponding to the cut portion 233 of the display panel 231.

The bracket assembly 260 may include a first bracket 261, a second bracket 262, the hinge structure 264 disposed between the first and second brackets 261 and 262, the hinge cover 265 covering the hinge structure 264 (when viewing the hinge structure 264 from the outside), and at least one wiring member 263 (e.g., a flexible printed circuit board (FPC)) intersecting with the first and second brackets 261 and 262.

In an embodiment, the bracket assembly 260 may be disposed between the plate 232 and the at least one PCB 270. For example, the first bracket 261 may be disposed between the first area 231a of the display 230 and a first PCB 271, and the second bracket 262 may be disposed between the second area 231b of the display 230 and a second PCB 272.

In an embodiment, the wiring member 263 and the hinge structure 264 may be disposed, at least in part, inside the bracket assembly 260. The wiring member 263 may be disposed in a direction (e.g., the x-axis direction) that crosses the first and second brackets 261 and 262. That is, the wiring member 263 may be disposed in a direction perpendicular to the folding axis (e.g., the y-axis or the folding axis (A) in FIG. 2A) of the folding area 231c.

As mentioned above, the at least one PCB 270 may include the first PCB 271 disposed to correspond to the first bracket 261, and the second PCB 272 disposed to correspond to the second bracket 262. The first and second PCBs 271 and 272 may be disposed in a space formed by all of the bracket assembly 260, the first housing structure 210, the second housing structure 220, the first rear cover 240, and the second rear cover 250. On the first and second PCBs 271 and 272, electronic components for implementing various functions of the electronic device 200 may be mounted.

In an embodiment, while the display 230 is combined with the bracket assembly 260, the first housing structure 210 and the second housing structure 220 may be assembled to each other to be combined with both sides of the bracket assembly 260. As described below, the first housing structure 210 and the second housing structure 220 may be combined with the bracket assembly 260 by sliding on both sides of the bracket assembly 260.

In an embodiment, the first housing structure 210 may include a first rotation supporting surface 214, and the second housing structure 520 may have a second rotation supporting surface 224 corresponding to the first rotation supporting surface 214. The first rotation supporting surface 214 and the second rotation supporting surface 224 may include curved surfaces corresponding to curved surfaces included in the hinge cover 265.

In an embodiment, when the electronic device 200 is in the unfolded state (e.g., FIG. 2A), the first and second rotation supporting surfaces 214 and 224 cover the hinge cover 265 so that the hinge cover 265 may not be exposed or may be minimally exposed to the rear surface of the electronic device 200. In addition, when the electronic device 200 is in the folded state (e.g., FIG. 2B), the first and second rotation supporting surfaces 214 and 224 rotate along the curved surfaces included in the hinge cover 265 so that the hinge cover 265 may be maximally exposed to the rear surface of the electronic device 200.

In an embodiment, the sub display 252 (or a second display) may be mounted on the second rear cover 250 and exposed to the outside through the rear surface of the electronic device 200.

FIGS. 4A, 4B, 4C, 4D, 4E, and 4F are perspective views showing a used state of an electronic device in a folding or unfolding operation according to various embodiments of the disclosure.

The electronic device 200 (e.g., the electronic device 101 in FIG. 1A) according to various embodiments may include a foldable housing 410, a first display 430 (e.g., the first display 230 in FIG. 2A), and a second display (e.g., the sub display 252 in FIG. 2A).

According to various embodiments, the electronic device 200 may include the foldable housing 410 that includes a first housing structure 210 and a second housing structure 220 connected by a hinge structure (e.g., the hinge structure 264 in FIG. 3).

According to various embodiments, the first and second housing structures 210 and 220 may be connected to be foldable to each other. The first and second housing structures 210 and 220 may be foldable to each other about a folding axis 420 (e.g., the folding axis (A) in FIG. 2A) extending in the first direction. The first and second housing structures 210 and 220 may be disposed to face each other in a folded state.

Figure 4A:
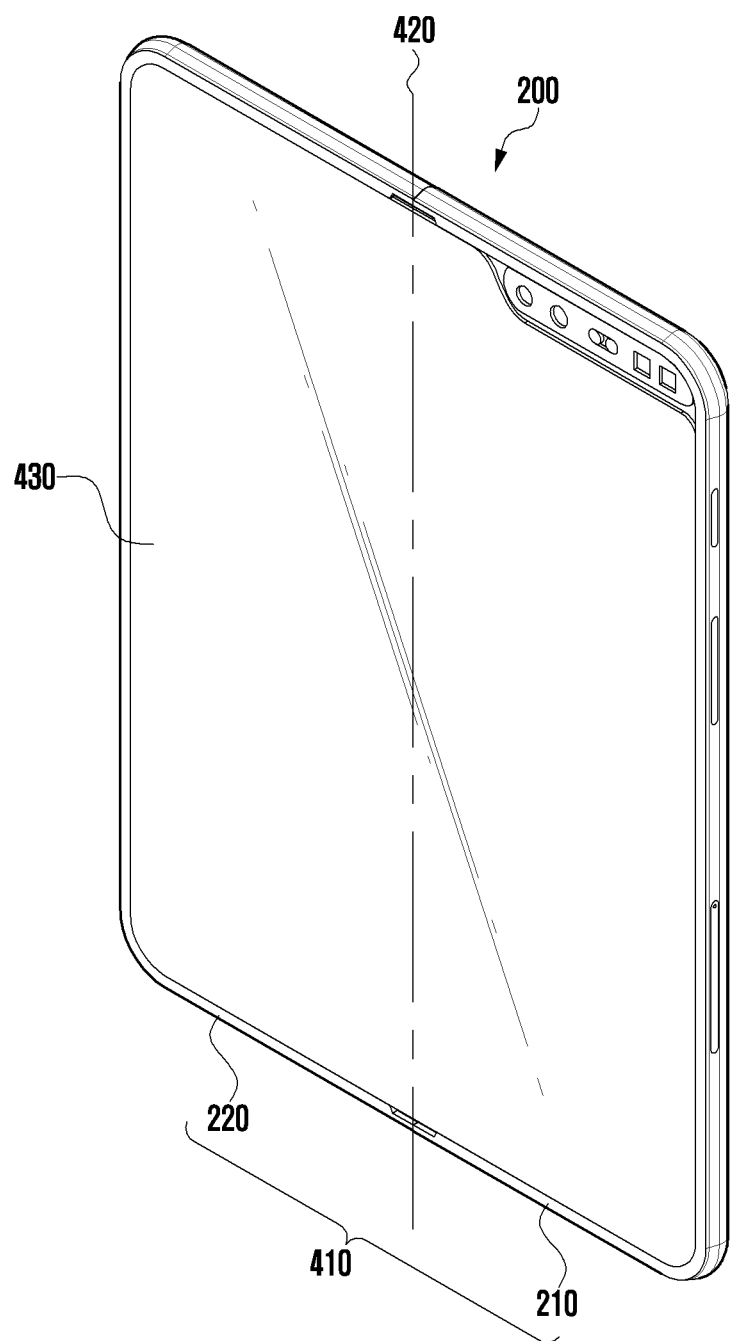
FIGS. 4A, 4B, 4C, 4D, 4E and 4F are perspective views showing a used state of an electronic device in a folding or unfolding operation according to various embodiments of the disclosure.

Referring to FIG. 4A, an angle formed between the first housing structure 210 and the second housing structure 220 may be about 180 degrees. As such, when the angle between the first and second housing structures 210 and 220 is greater than a predetermined angle (e.g., about 170 degrees), it may be defined that the electronic device (or the first display 430) is in the unfolded state. When the electronic device 200 is in the unfolded state, the first housing structure 210 and the second housing structure 220 may form a substantially planar structure.

Figure 4B:
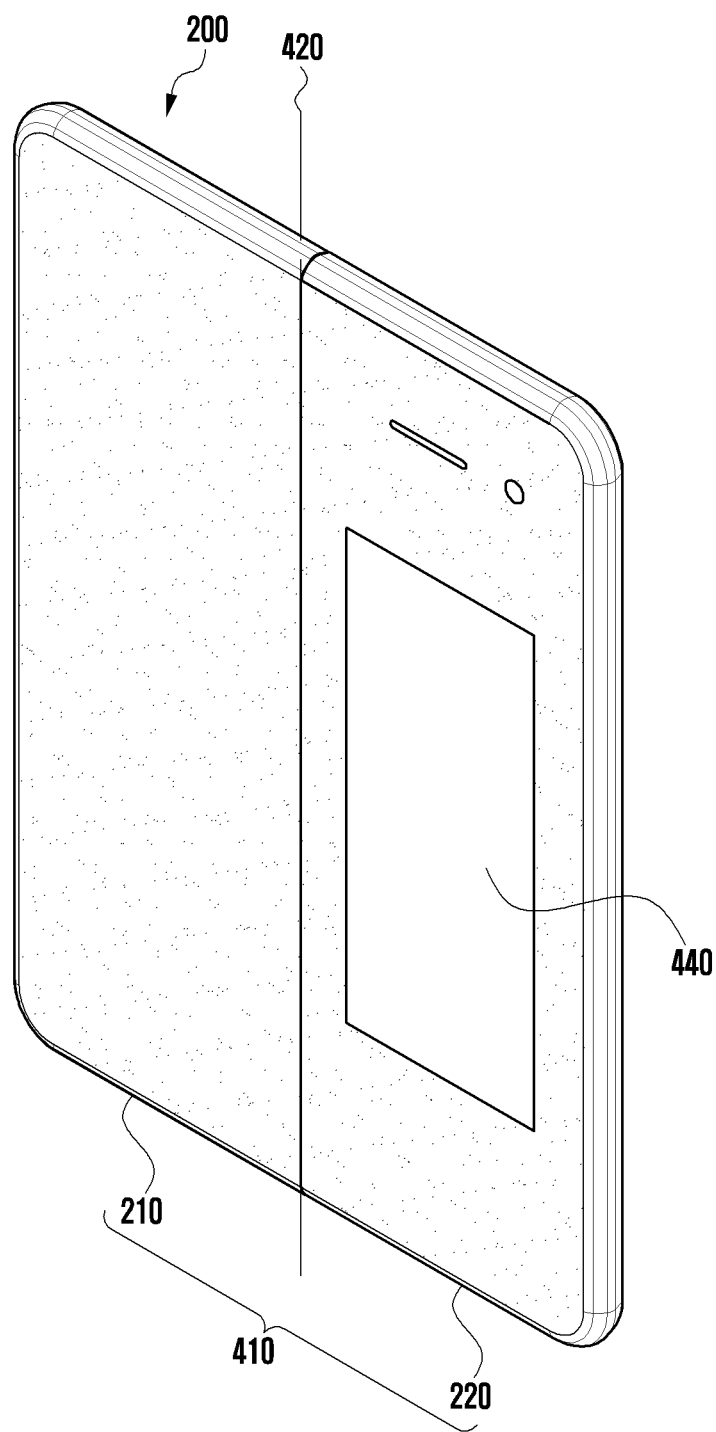

Referring to FIG. 4B, the electronic device 200 according to various embodiments may further include the second display 440 (e.g., the sub display 252 in FIG. 2A).

Figure 4C:
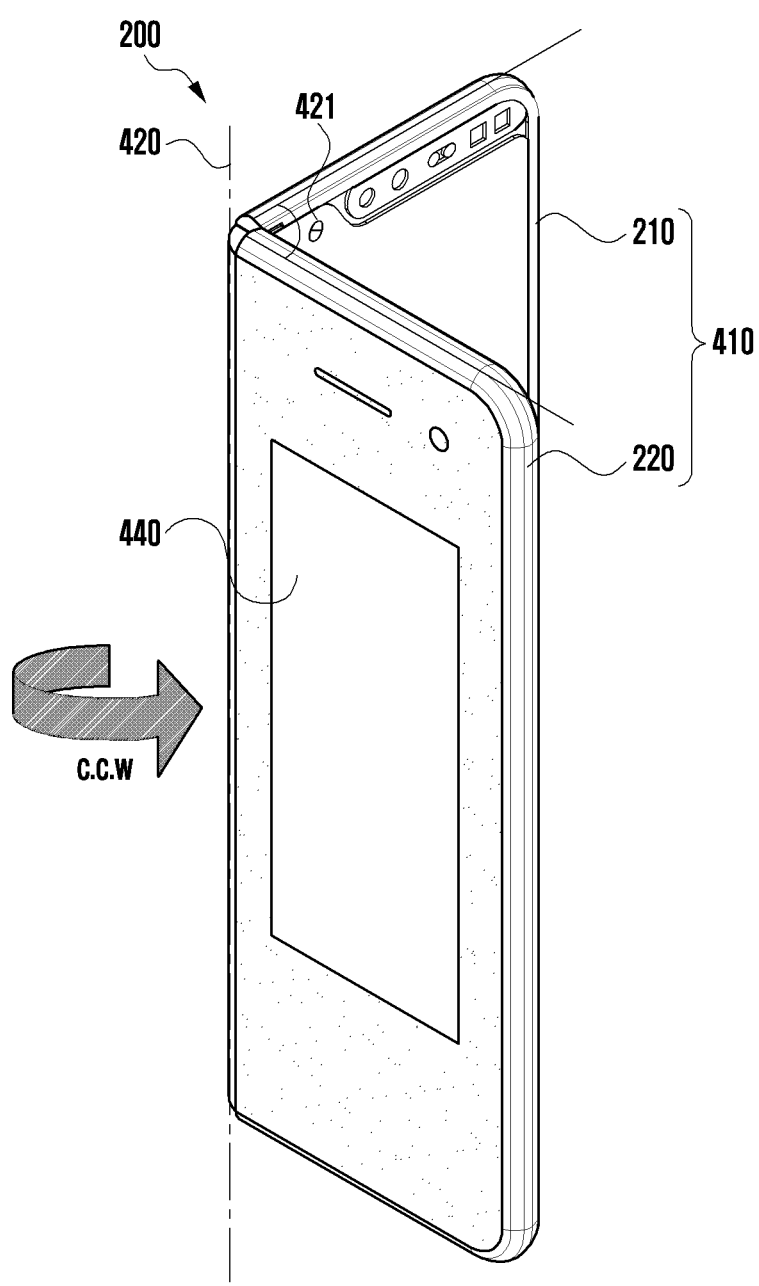
Figure 4D:
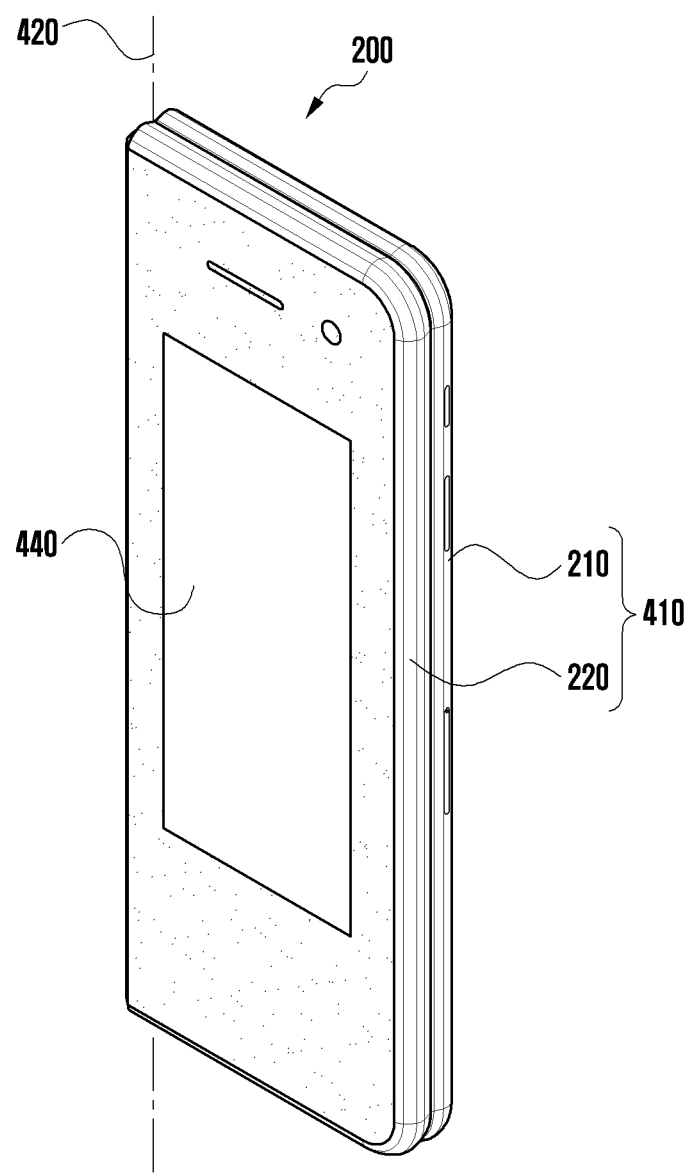

FIG. 4C illustrates that the electronic device 200 is partially folded in a counterclockwise direction about the folding axis 420, and FIG. 4D illustrates that the electronic device 200 is maximally folded about the folding axis 420.

Referring to FIGS. 4C and 4D, the user of the electronic device 200 can fold the unfolded electronic device 200 or unfold the folded electronic device 200 about the folding axis 420 by applying a force to the electronic device 200.

While the electronic device 200 is folded or unfolded, a user's finger may touch the first display 430 and/or the second display 440. This touch may be detected by a touch sensor 421 of the first display 430 and/or a touch sensor of the second display 440. This touch may be a user's unintended touch rather than an intended touch for an actual input action on the screen.

Figure 4E:
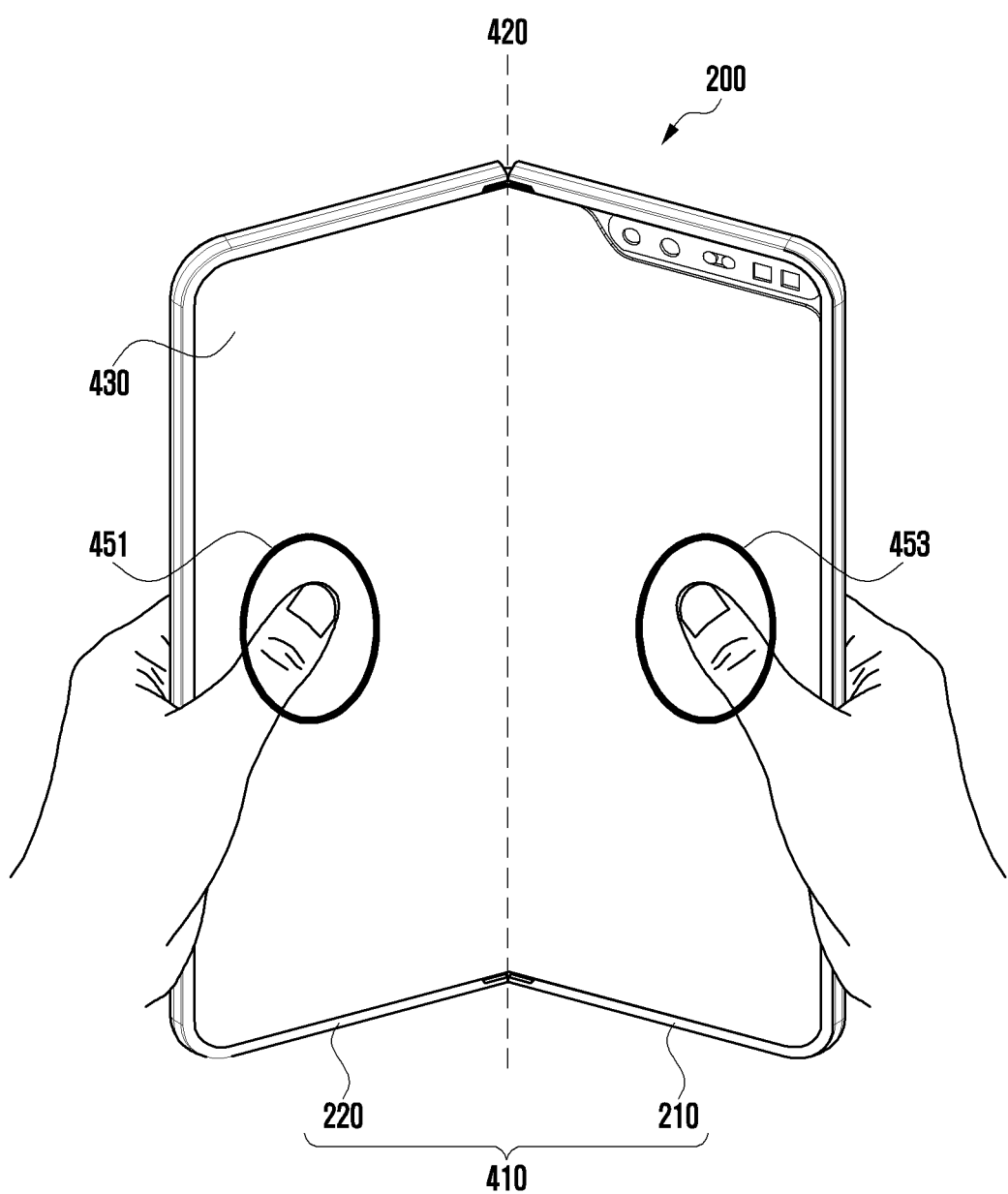

Referring to FIG. 4E, while the electronic device 200 is folded or unfolded, the electronic device 200 may receive a user input on the first display 430. For example, the electronic device 200 may receive a user input on some portions 451 and 453 of the first display 430. This user input may an unintended touch.

Figure 4F:
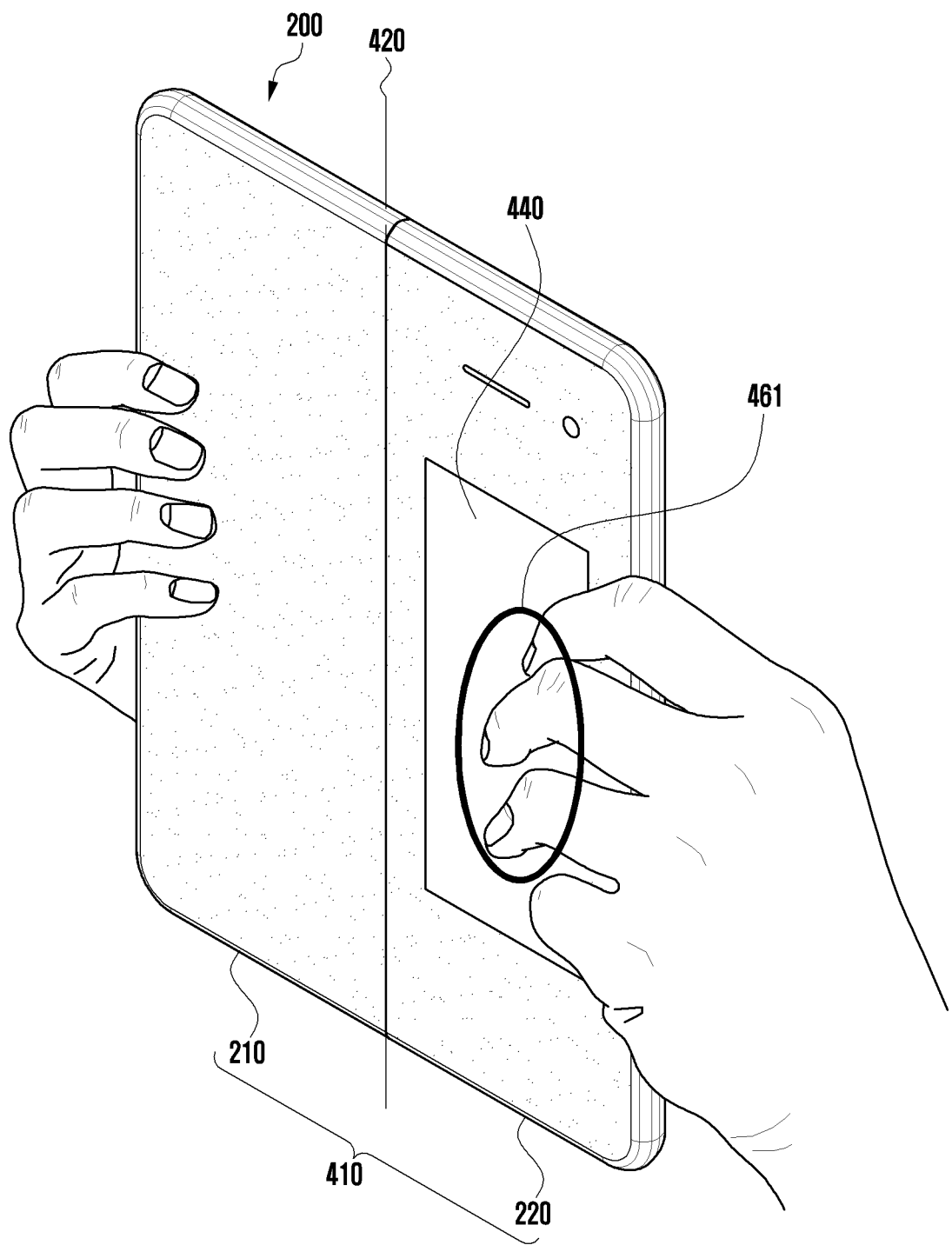

Referring to FIG. 4F, while the electronic device 200 is folded or unfolded, the electronic device 200 may receive a user input on the second display 440. For example, the electronic device 200 may receive a user input on a certain portion 461 of the second display 440. This user input may be an unintended touch.

Figure 5:
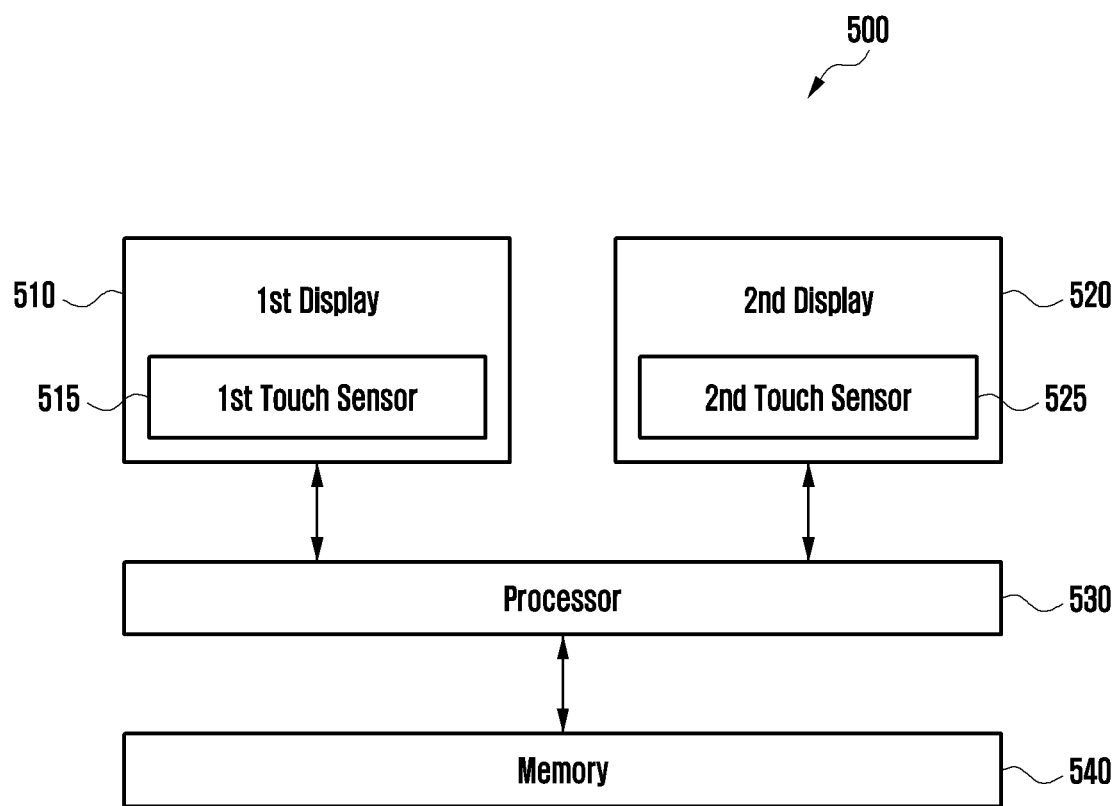
FIG. 5 is a block diagram illustrating an electronic device according to an embodiment of the disclosure.

FIG. 5 is a block diagram illustrating an electronic device according to an embodiment of the disclosure.

Referring to FIG. 5, an electronic device 500 may include a first display 510, a second display 520, a processor 530, and a memory 540. Some of such components of the electronic device 500 may be omitted or replaced. The electronic device 500 may include at least some of the configurations and/or functions of the electronic device 101 in FIG. 1A. The electronic device 500 may include the structures shown in FIGS. 2A, 2B, and 3, and may include the foldable structure as described with reference to FIGS. 4A to 4F.

According to various embodiments, the first display 510 may be disposed on a first surface (or front surface) of a housing of the electronic device 500 in a first direction. The first display 510 may include a first touch sensor 515 that detects a touch input occurring on the first display 510. The first touch sensor 515 may be implemented in one of various schemes such as an in-cell scheme or an on-cell scheme.

According to various embodiments, the first display 510 may be folded. Based on a folding area (e.g., the folding area 231c in FIG. 2A), the first display 510 may be divided into a first area (e.g., the first area 231a in FIG. 2A) and a second area (e.g., the second area 231b in FIG. 2A), and may be folded in a direction where the first area and the second area face each other. Therefore, when the electronic device 500 is folded, the first display 510 may not be visible to the user.

According to various embodiments, the second display 520 may be disposed on a second surface (or rear surface) of the housing of the electronic device 500 in a second direction. The second display 520 may be disposed on one of rear covers of the housing (e.g., the second rear cover 250 in FIG. 2A). Therefore, the area (or the widthwise length) of the second display 520 may be half or less than that of the first display 510.

The second display 520 may include a second touch sensor 525 that detects a touch input occurring on the second display 520. The implementation scheme of the second touch sensor 525 may be the same as the first touch sensor 515.

The first touch sensor 515 and/or the second touch sensor 525 may provide the processor 530 with a touch event corresponding to the touch input. The touch event may include a press event, a release event, and/or a cancel event. For example, when the user presses a certain region of the first display 510, the first touch sensor 515 may provide the press event to the processor 530 together with the coordinates of the pressed region. When the user releases such a touch, the first touch sensor 515 may provide the release event to the processor 530. When the touch is removed without being released, for example, when the user's finger moves without releasing the touch and thereby leaves the touch region, the first touch sensor 515 may provide the cancel event to the processor 530.

The processor 530 may provide a received touch event to an application corresponding to the touch event (or an application displayed in the foreground). When providing the press event or the release event to the application, the processor 530 may perform a corresponding operation. When providing the cancel event after the press event, the processor 530 may cancel the operation performed according to the press event.

According to various embodiments, while the electronic device 500 is unfolded, the second display 520 and the second touch sensor 525 may be in an inactivated state. Therefore, even if a user's touch occurs on the second display 520, the second touch sensor 525 does not generate a touch event. According to another embodiment, even when the electronic device 500 is unfolded, the second display 520 and the second touch sensor 525 may be in an activated state, and therefore the second touch sensor 525 may generate a touch event in respond to a user's touch input.

According to various embodiments, the memory 540 may include a volatile memory and a nonvolatile memory, which are known in the art and not limited to specific implementation. The memory 540 may include at least some of configurations and/or functions of the memory 130 shown in FIG. 1A. In addition, the memory 540 may store at least a part of the program 140 shown in FIG. 1A.

The memory 540 may be functionally, operatively, and/or electrically connected to the processor 530, and may store various instructions being executable by the processor 530. These instructions may include various control commands recognizable to the processor 120 in connection with arithmetic and logical operations, data transfer, input/output, and/or the like.

According to various embodiments, the processor 530 is configured to perform operations or data processing related to control and/or communication of components of the electronic device 501, and may include at least some of configurations and/or functions of the processor 120 shown in FIG. 1A. The processor 530 may be functionally, operatively, and/or electrically connected to internal components of the electronic device 500 including the first display 510, the second display 520, and the memory 540.

The operation and data processing functions that can be implemented by the processor 530 in the electronic device 500 are not limited. However, in the disclosure, descriptions will be focused on operations of processing a touch event and operations of displaying an application screen seamlessly between the first display 510 and the second display 520 when a folding or unfolding gesture occurs. The operations of the processor 530 to be described hereinafter may be performed by loading instructions stored in the memory 540.

According to various embodiments, the processor 530 may execute an application stored in the memory 540. In a state where the electronic device 500 (or the first display 510) is unfolded, the processor 530 may display an execution screen of the application on the first display 510. Also, in the unfolded state of the electronic device 500, the second display 520 may be turned off by operating in a power saving mode or may display only brief information such as time by operating in an always on display (AOD) mode.

In addition, when the electronic device 500 is unfolded, the first touch sensor 515 of the first display 510 may provide the processor 530 with a touch event corresponding to a touch input on the first display 510. At this time, the second display 520 and the second touch sensor 525 may be in an inactivated state, and therefore the second touch sensor 525 may not detect the touch input.

According to various embodiments, the electronic device 500 may include no bezel area or only a very narrow bezel area so that the first display 510 covers substantially the entire first surface of the housing.

According to various embodiments, in a state where the electronic device 500 (or the first display 510) is folded, the processor 530 may display an execution screen of the application on the second display 520. In the folded state of the electronic device 500, the first and second areas of the first display 510 face each other and are not recognized by the user. Therefore, the first display 510 may not display a screen by operating in a power saving mode, and also the first touch sensor 515 may not detect a touch input.

According to various embodiments, the processor 530 may detect a folding gesture for the electronic device 500 (or the first display 510) in the unfolded state. As described above with reference to FIGS. 4A to 4F, the user may apply a force to the housing of the electronic device 500 to fold the first and second areas of the first display 510 to face each other. When the electronic device 500 is folded, the processor 530 may detect the folding gesture through a variation in angle between a first housing structure (e.g., the first housing structure 210 in FIG. 2A) covering the first area of the first display 510 and a second housing structure (e.g., the second housing structure 220 in FIG. 2B) covering the second area of the first display 510, based on the folding area (e.g., the folding area 231c in FIG. 2A). For example, when the angle between the first and second housing structures is about 180 degrees, the processor 530 recognizes it as the unfolded state. When an angle change occurs in the unfolded state, the processor 530 determines that the folding gesture is started. When the angle decreases below a reference value (e.g., 10 degrees), the processor 530 determines that the folding gesture is completed.

In addition, the electronic device can determine that the device is in the first folding state if the angle formed by a first housing structure and a second housing structure is close to 0° (e.g., 0° or 10°) or that the device is in the second folding state if the angle is close to 180° (e.g., 170° or 180°). Based on the angle, the electronic device performs an operation corresponding to the folding state if the device is in the first folding state and an operation corresponding to the unfolding state if the device is in the second folding state.

According to various embodiments, when the folding gesture is started, the processor 530 may request the first touch sensor 515 of the first display 510 to stop transmitting the touch event. This is because, as described above with reference to FIGS. 4A to 4F, the touch on the first display 510 during folding is a user's unintended touch. According to another embodiment, when the folding gesture is started, the processor 530 may ignore the received touch event without requesting the first touch sensor 515 to stop transmitting the touch event. That is, even if any touch event is received, it may not be provided to the application. In this case, because the second display 520 and the second touch sensor 525 are still inactive, the second touch sensor 525 may not generate and transmit a touch event.

According to various embodiments, the processor 530 may switch the first display 510 to an inactivated state in response to the folding gesture. A time point of turning off a screen of the first display 510 and stopping a touch detection of the first touch sensor 515 is not limited. For example, the processor 530 may perform a control operation of turning off a screen of the first display 510 and stopping a touch detection of the first touch sensor 515 when the folding gesture is determined to be completed as described above by a decrease of the angle (e.g., 10 degrees or less) of the first display 510 being folded, or when a touch lock screen to be described later is displayed on the second display 520.

According to various embodiments, the processor 530 may switch the second display 520 to an activated state in response to the folding gesture. However, even in this case, the processor 530 may maintain the second touch sensor 525 in an inactivated state until the touch lock screen is displayed, or may not process a touch event occurring at the second touch sensor 525 even if the second touch sensor 525 is activated together with the second display 520. According to other embodiments, both the second display 520 and the second touch sensor 525 may be activated in the folded state or the unfolded state of the electronic device 500.

According to various embodiments, the processor 530 may cancel a touch event (e.g., a press event or a release event) having been provided to the application before the folding gesture is started. For example, the processor 530 may cancel the execution of the application to be carried in response to the touch event, or cancel the execution of the application having been already carried in response to the touch event.

According to various embodiments, when the folding gesture is started, the processor 530 may provide the application with a cancel event corresponding to a touch event previously provided. For example, even if a press event actually occurs during the folding gesture, it is not a user's intention. Thus, the processor 530 may provide the cancel event to the application even if the press event is received from the touch sensor. This prevents the application from being operated wrongly by recognizing a touch for folding as a touch event. Therefore, the application may not perform an operation according to a touch event generated by the first touch sensor 515 before the first display 510 is folded.

According to various embodiments, the processor 530 may display a touch lock screen on the second display 520 in response to the folding gesture. The processor 530 may display the touch lock screen when the state of the electronic device 500 is changed to at least partially folded state from the completely unfolded state. The touch lock screen may be determined according to state information (e.g., security level and/or whether being resizable) of the running application. Examples of the touch lock screen will be described below with reference to FIGS. 10A and 10B.

According to various embodiments, the touch lock screen can be displayed as the upper layer of the application and can partially overlap the application screen. When the application screen and the touch lock screen, which partially overlaps the application screen, are displayed, a touch input might not be processed as an input for the application.

According to various embodiments, the touch lock screen can be a partially changed application screen, where the application screen was to be displayed in the second display. For example, the touch lock screen can be a portion of the application screen, or the application screen is a different resolution, transparency, and the like.

According to various embodiments, the processor 530 may display the touch lock screen in the foreground to cover the screen of the top-level application on the z-order, thereby preventing an unintended touch event from being transmitted to the application.

According to various embodiments, the processor 530 may process a touch event received from the second touch sensor 525 of the second display 520 after displaying the touch lock screen. In response to displaying the touch lock screen, the processor 520 may activate the second touch sensor 525 or process a touch event received from the already activated second touch sensor 525. In this situation, a touch event that is received while the touch lock screen is displayed is executed for the touch lock screen and not for the application screen, which is displayed as a lower layer of the touch lock screen.

After displaying the touch lock screen, the processor 530 may release the touch lock screen in response to a touch event received from the second display 520 and provide the touch event to the running application. In this case, the first display 510 and the first touch sensor 515 may have been already inactivated.

According to various embodiments, the processor can remove the touch lock screen if at least one characteristic of a touch event received from the second display satisfies a designated condition. In this situation, the characteristics and conditions can refer to a distance, speed, location, and the like of the touch event.

According to another embodiment, the touch lock screen includes a certain indication and the processor can remove the touch lock screen when the indication is selected. In this situation, the indication can be displayed as a portion of the touch lock screen or as an image separate from the touch lock screen. In addition, the indication can displayed as partially overlapping with the touch lock screen.

A method of processing the touch event of the first touch sensor 515 and/or the second touch sensor 525 after the folding gesture is detected will be described below with reference to FIG. 8.

According to various embodiments, the processor 530 may generate the touch lock screen, based on state information of an application. The state information of the application may include information about a security level assigned to the application and/or information about whether an execution screen of the application is resizable.

According to various embodiments, the processor 530 may operate in a non-secure mode, a weak secure mode, or a strong secure mode, depending on a security level assigned to an application. For example, the non-secure mode is a case where a voice call application is running. In this case, even when a folding gesture is detected during a voice call, the processor 530 may not display the touch lock screen and may instead display an execution screen of the voice call application on the second display 520. Also, the processor 530 may provide a touch event received from the second touch sensor 525 to the voice call application.

In case of the weak secure mode (or a first security level), the processor 530 may display a translucent touch lock screen on an upper layer of an application execution screen. Thereafter, when a certain touch input (e.g., swipe) for the touch lock screen displayed on the second display 520 is detected, the processor 530 may remove the touch lock screen and display a screen of the running application on the second display 520. In this case, the screen of the application may be resized corresponding to the resolution of the second display 520.

In case of the strong secure mode (or a second security level), the processor 530 may display an opaque touch lock screen on the second display 520. In this case, the processor 530 may display an application execution screen on the second display 520 when a user authentication (e.g., a pattern input, a password input, an iris recognition, a fingerprint recognition, and the like) is completed while the touch lock screen is displayed. According to an embodiment, the processor 530 may display another application (e.g., a home screen or a background running application) on the second display 520 other than the running application.

According to various embodiments, the processor can display in the second display an interface (e.g., pattern input, password input) for receiving an input that releases the lock state of the application if a security level (e.g., strong secure mode, second security mode) is designated for the application. In this situation, the interface can be displayed as at least a portion of the touch lock screen or as an image separate from the touch lock screen.

According to various embodiments, the second display is smaller than the first display and therefore, the interface displayed in the first display during the unfolding state is minimized and then displayed in the second display. In addition, the interface displayed in the first display is displayed in a lower resolution in the second display.

According to various embodiments, the processor 530 may determine the security level or the execution mode, based on the attributes of an application running in an unfolded state.

For example, when the running application is an application (e.g., a call application) that requires a continuous use, the processor 530 may operate in the non-secure mode. Also, the processor 530 may operate in the weak secure mode for a general application, and operate in the strong secure mode for an application that requires security such as user's privacy.

According to various embodiments, the processor 530 may determine the security level or the execution mode, based on the attributes of the folding gesture.

According to an embodiment, the processor 530 may identify a time difference between a start time and a completion time of the folding gesture. If the identified time difference is less than a given threshold, the processor 530 may operate in the strong secure mode. This is because, when the user quickly folds the electronic device 500, it may be interpreted that the user does not want to expose information displayed on the display for reasons such as privacy.

According to another embodiment, the processor 530 may determine through the direction of the folding gesture whether the second display 520 is in a user's visible direction after folding. For example, when the second display 520 is positioned upward (counter-gravity direction), it is determined that the second display 520 is in the visible direction. In contrast, when the second display 520 is positioned downward (gravity direction), it may be determined that the second display 520 is in the invisible direction. The processor 530 may display the touch lock screen of the weak secure mode when determining the second display 520 to be in the visible direction. In contrast, when determining the second display 520 to be in the invisible direction, the processor 530 may operate in the strong secure mode or set the second display 520 to be in the power saving mode.

According to still another embodiment, the processor 530 may determine the execution mode, based on a pattern of the folding gesture. For example, the processor 530 may compare an acceleration of one housing structure (e.g., the second housing structure 220 in FIG. 2A) having the second display 520 with an acceleration of the other housing structure (e.g., the first housing structure 210 in FIG. 2A) having no second display. If the acceleration of the second housing structure having the second display 520 is greater, the processor 530 may determine the second display 520 to be in the user's visible direction and display the touch lock screen of the weak secure mode. If the acceleration of the first housing structure having no second display is greater, the processor 530 may determine the second display 520 to be in the user's invisible direction and operate in the strong secure mode or set the second display 520 to be in the power saving mode.

According to various embodiments, the electronic device 500 may include a sensor (e.g., an acceleration sensor or a gyro sensor) disposed on the first housing structure and/or the second housing structure, thus identifying the pattern of the folding gesture from the sensor.

According to various embodiments, the processor 530 may identify whether an application is resizable. For example, from attribute information of the application, the processor 530 may identify whether an execution screen of the application is resizable.

When the application displayed on the first display 510 is a resizable application (e.g., an Internet browser), the processor 530 may generate a touch lock screen having at least a translucent portion in response to detection of the folding gesture and display the touch lock screen on an upper layer of the resized execution screen of the application displayed on the second display 520.

Thereafter, when a certain touch input (e.g., swipe) for the touch lock screen displayed on the second display 520 is detected, the processor 530 may remove the touch lock screen and display a screen of the running application on the second display 520. According to other embodiments, after given authentication (e.g., pattern input, password input, iris recognition, fingerprint recognition, and the like) is completed for the touch lock screen, the processor 530 may remove the touch lock screen and display the application screen on the second display 520. In this case, an authentication type may be determined according to the security level (e.g., the weak secure mode, the strong secure mode, and the like) and/or user's setting. Thereafter, when the electronic device 500 is unfolded again, the application may be displayed on the first display 510 in its original size. This embodiment will be described below with reference to FIG. 14.

When an application displayed on the first display 510 is a non-resizable application (e.g., a game application), and when the folding gesture is detected, the processor 530 may display on the second display 520 a touch lock screen containing a menu for selecting a restart (i.e., re-execution) or continuation (i.e., continued execution) of the application.

Then, if the continuation is selected from the menu on the touch lock screen, the processor 530 may execute the application in the background and display another application (e.g., a home screen or a background execution application) on the second display 520. Thereafter, when the electronic device 500 is unfolded again, the application may be displayed on the first display 510 in the foreground. This embodiment will be described below with reference to FIG. 15.

According to various embodiments, the touch lock screen may be displayed even before folding is not completed after the folding gesture is started. For example, the processor 530 may display the touch lock screen on the second display when the angle between the first and second housing structures reaches a predetermined value (e.g., 150 degrees, 120 degrees, 90 degrees, 60 degrees, 30 degrees) while varying from 180 degrees to 0 degree. Alternatively, the processor 530 may offer a visual effect corresponding to the touch lock screen and, when folding is completed, display the touch lock screen.

Figure 6:
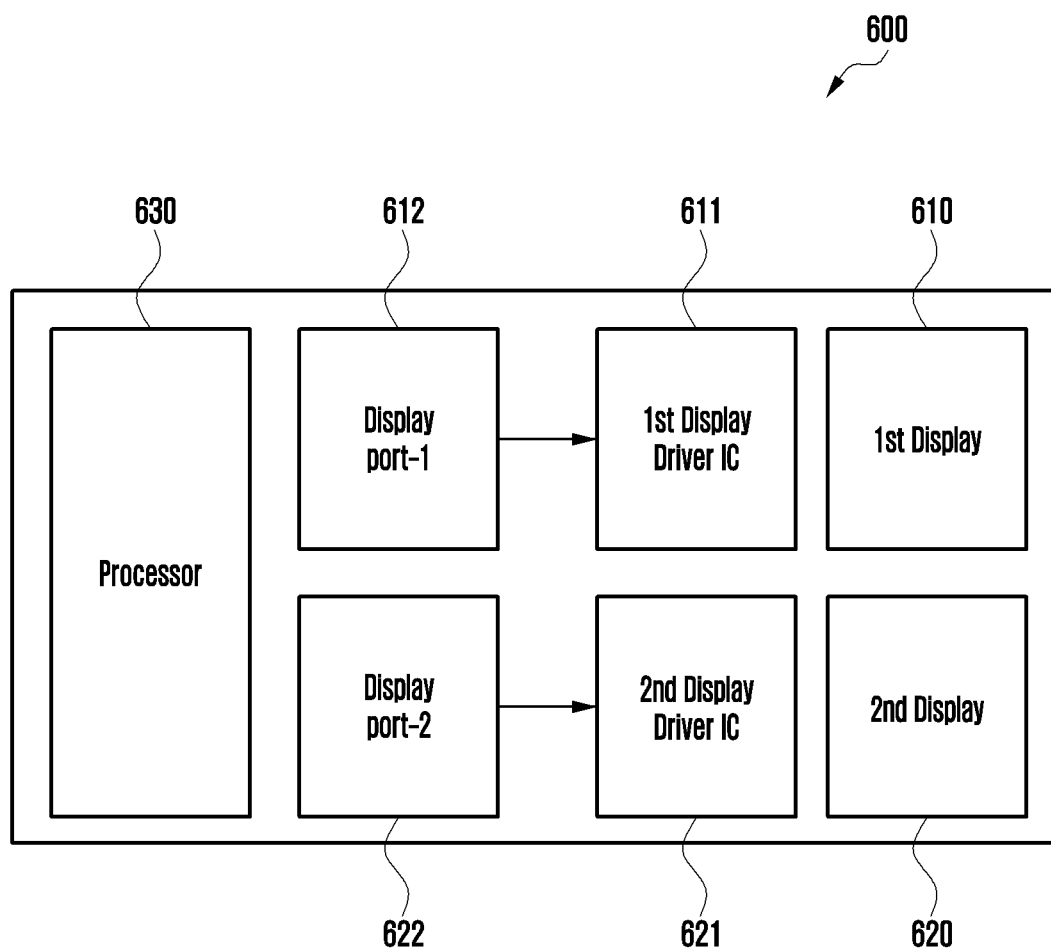
FIG. 6 is a block diagram illustrating a display-related configuration of an electronic device according to an embodiment of the disclosure.

FIG. 6 is a block diagram illustrating a display-related configuration of an electronic device according to an embodiment of the disclosure.

Referring to FIG. 6, an electronic device 600 may include a first display 610, a second display 620, a first display driver IC 611, a second display driver IC 621, and a processor 630.

According to an embodiment, the first display driver IC 611 may include an interface module (not shown), a memory (e.g., a buffer memory) (not shown), an image processing module (not shown), and/or a mapping module (not shown). The first display driver IC 611 may receive image information containing image data and/or an image control signal corresponding to a command for controlling the image data from other components of the electronic device 600 through the interface module. For example, the first display driver IC 611 may receive the image information from the processor 630 or from an auxiliary processor (e.g., a graphics processing apparatus) that is operated independently of the processor 630. According to an embodiment, the first display driver IC 611 may communicate with a touch circuit or a sensor module through the interface module. According to an embodiment, the first display driver IC 611 may store at least part of the received image information in the memory, for example, in units of frames. According to an embodiment, the image processing module may perform pre-processing or post-processing (e.g., adjusting resolution, brightness, or size) of at least part of the image data, based at least on the characteristics of the image data or the characteristics of the first display 610. According to an embodiment, the mapping module may generate a voltage value or a current value corresponding to the image data pre-processed or post-processed through the image processing module. According to an embodiment, the generation of the voltage value or the current value may be performed, based on at least in part the attributes of pixels of the first display 610 (e.g., an array of pixels (RGB stripe or pentile structure), or the size of each subpixel). At least some pixels of the first display 610 may be driven based on at least in part the voltage value or the current value, and thereby visual information (e.g., text, images, icons) corresponding to the image data may be displayed through the display 610.

According to an embodiment, the second display driver IC 621 may drive the second display 620 to display an image based on the image information received from the processor 630. According to an embodiment, the second display driver IC 621 may include the same or similar components as those of the first display driver IC 611, except for driving the second display 620. For example, the second display driver IC 621 may include an interface module (not shown), a memory (e.g., a buffer memory) (not shown), an image processing module (not shown), and/or a mapping module (not shown) which perform operations similar to those of the first display driver IC 611.

According to an embodiment, the processor 630 may include a first display port 612 operatively connected to the first display driver IC 611, and a second display port 622 operatively connected to the second display driver IC 621. For example, the processor 630 may transmit first image information to the first display driver IC 611 through the first display port 612 and also transmit second image information to the second display driver IC through the second display port 622.

According to an embodiment, the first image information and the second image information may be identical to each other. For example, the processor 630 may transmit image information containing the same image data to both the first display driver IC 611 and the second display driver IC 621.

According to another embodiment, image data contained in the second image information may include at least part of image data contained in the first image information. For example, the processor 630 may receive a user input for selecting part of first image data (e.g., the entire image displayed on the first display 610) and, based on the received input, transmit second image data (e.g., a part of the entire image displayed on the first display 610), which is part of the first image data, to the second display driver IC 621.

According to still another embodiment, the processor 630 may transmit the same image data to both the first display driver IC 611 and the second display driver IC 621, and further transmit coordinate information based the user input to the second display driver IC 621. For example, the coordinate information may define a specific part (i.e., the second image data), selected by the user, of the first image data, and the second display driver IC 621 may drive the second display 620 to display the specific part of the first image data, based on the coordinate information.

Figure 7:
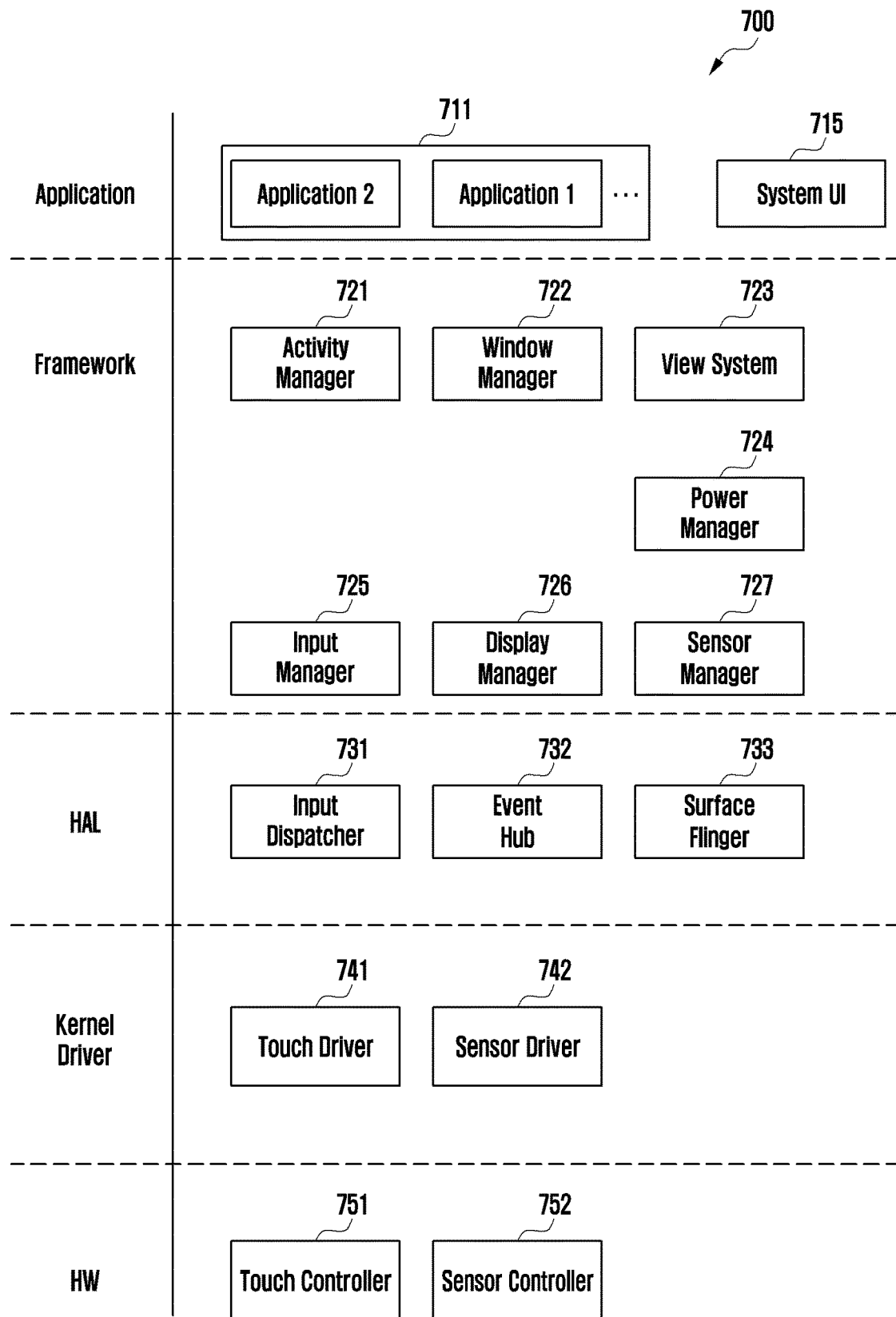
FIG. 7 is a block diagram illustrating software layers of an electronic device according to an embodiment of the disclosure.

FIG. 7 is a block diagram illustrating software layers of an electronic device according to an embodiment of the disclosure.

Shown is a software structure 700 according to some embodiments, which may be changed at least in part depending on the platform included in the electronic device (e.g., the electronic device 500 in FIG. 5). FIG. 7 illustrates some configurations related to processing a touch events on the software structure 700.

Referring to FIG. 7, an application layer may include at least one application 711 and a system UI 715 that are stored in a memory and executable by a processor. The application 711 may include, but is not limited to, an Internet browser, a video application, a game application, and the like. The system UI 715 may refer to a particular application that configures various GUI screens such as a notification bar and a quick view to be implemented on the system of the electronic device.

A framework may provide various functions to the application 711 such that functions or information provided from one or more resources of the electronic device can be used by the application 711.

The framework may include an activity manager 721 for managing a life cycle of the application 711, a window manager 722 for managing one or more GUI resources being displayed, a view system 723 which is a set of expandable views used to create a user interface of the application 711, a power manager 724 for managing a battery (e.g., the battery 189 in FIG. 1A) of the electronic device, an input manager 725 for providing information of an input means provided by the electronic device, a display manager 726 for providing information related to a display (e.g., the first display 510 and the second display 520 in FIG. 5) of the electronic device, and a sensor manager 727 for controlling a sensor (e.g., the sensor module 176 in FIG. 1A).

A hardware abstraction layer (HAL) may refer to an abstracted layer between a plurality of hardware modules included in a hardware layer and software of the electronic device. The hardware abstraction layer may include an input dispatcher 731, an event hub 732, and a surface flinger 733. The input dispatcher 731 may perform a function of determining which application 711 to be provided with the generated event. The event hub 732 may provide an interface for standardizing an event occurring in the sensor. The surface flinger 733 may perform a function of providing an execution screen to be displayed on the display among execution screens generated by the applications 711 and also request the applications 711 to process changes in resolution and density in accordance with a changed display configuration.

A kernel driver layer may include various drivers for controlling various hardware modules included in the electronic device. The kernel driver layer may include a touch driver 741 including an interface module for controlling a touch controller 751 and a sensor driver 742 including an interface module for controlling a sensor controller 752 connected to the sensor.

A hardware layer may include the touch controller 751 and the sensor controller 752. The touch controller 751 may receive a touch input occurring at a first touch sensor (e.g., the first touch sensor 515 in FIG. 5) of a first display and/or a second touch sensor (e.g., the second touch sensor 525 in FIG. 5) of a second display, and provide a touch event corresponding to the touch input. The electronic device may have a sensor for detecting folding in a portion of the housing (e.g., the first housing structure 210 and the second housing structure 220), and the sensor controller 752 may provide information obtained from the sensor.

According to various embodiments, when a touch input is detected by the first touch sensor of the first display and/or the second touch sensor of the second display, the touch controller 751 may output the touch event corresponding to the touch input. The touch event may be inputted to the event hub 732 through an interface provided by the touch driver 741. The touch event inputted to the event hub 732 may be provided to the application 711 (e.g., a foreground application) determined by the input dispatcher 731.

According to various embodiments, when the folding gesture is started, the electronic device may request the first touch sensor of the first display and/or the second touch sensor of the second display to stop transmitting the touch event. In response to the transmission stop request, the touch event collected by the event hub 732 may not be transmitted to the application 711.

According to various embodiments, the electronic device may cancel a touch event (e.g., a press event or a release event) having been provided to the application 711 before folding is started. For example, when the folding is started, the electronic device may provide the application 711 with a cancel event corresponding to the touch event previously provided. In this case, although press events are continuously delivered to the event hub, the electronic device may forcibly provide the cancel event to the application 711 because such press events are not due to a user's intended touch.

Figure 8:
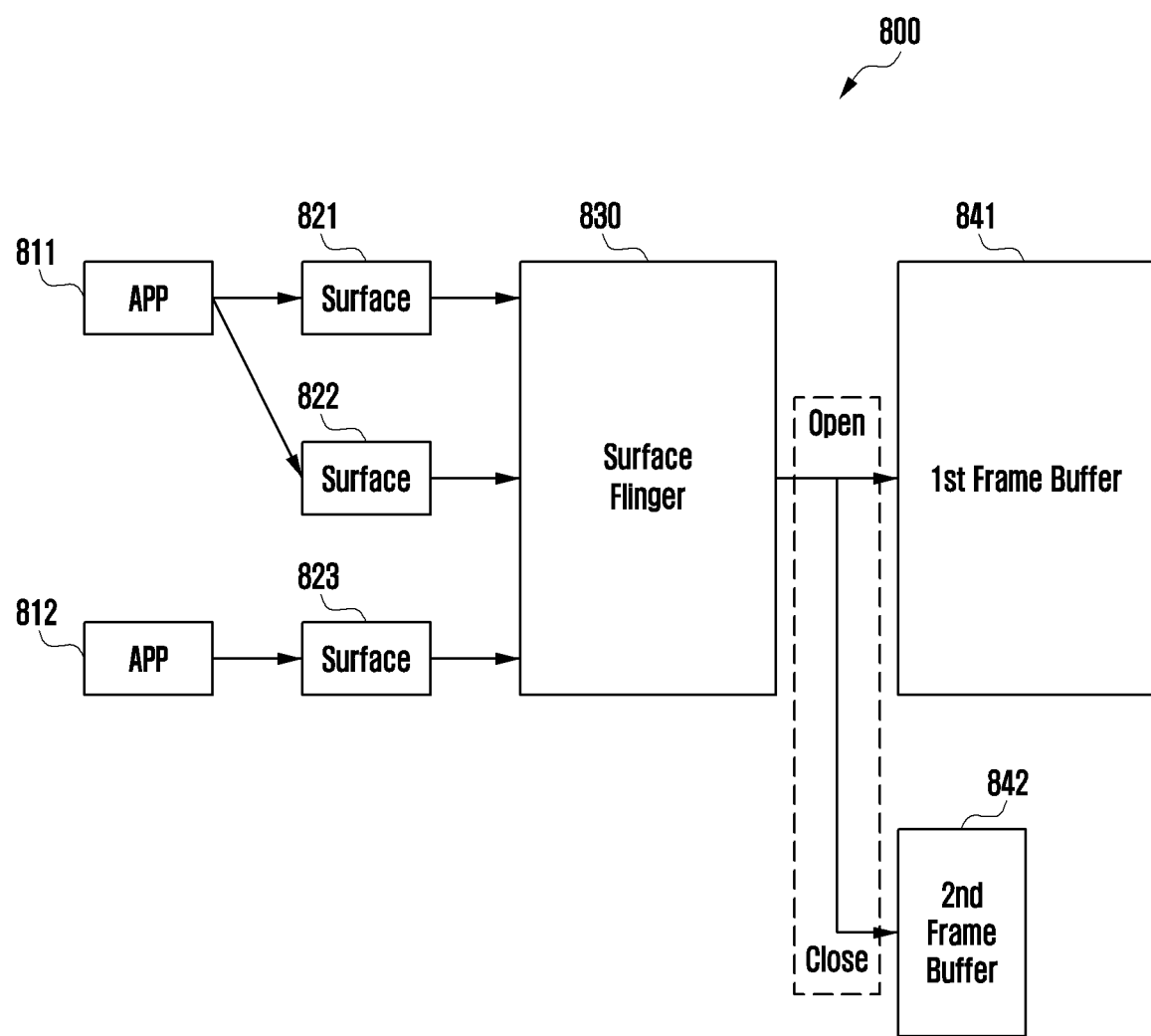
FIG. 8 is a block diagram illustrating a drawing engine of an electronic device according to an embodiment of the disclosure.

FIG. 8 is a block diagram illustrating a drawing engine of an electronic device according to an embodiment of the disclosure.

Referring to FIG. 8, a drawing engine 800 includes the electronic device (e.g., the electronic device 500 in FIG. 5) may designate a portion of a memory (e.g., the memory 540 in FIG. 5) as surfaces 821, 822, and 823 for recording execution states of applications 811 and 812.

A surface flinger 830 may determine whether to display an execution screen of an application recorded on the surfaces 821, 822, and 823, and also request the applications 811 and 812 to process changes in resolution and density in accordance with a changed display configuration.

A first frame buffer 841 may store an execution screen corresponding to the resolution and density of the first display (e.g., the first display 510 in FIG. 5) and generated by each of the applications 811 and 812. A second frame buffer 842 may store an execution screen corresponding to the resolution and density of the second display (e.g., the second display 520 in FIG. 5) and generated by each application.

In a state where the electronic device is unfolded, the surface flinger 830 may store, in the first frame buffer 841, the execution screen corresponding to the resolution and density of the first display, generated by each of the applications 811 and 812, and recorded on the surfaces 821, 822, and 823.

When the electronic device is folded, the surface flinger 830 may request each of the applications 811 and 812 to process the execution screen corresponding to the resolution and density of the second display, and store, in the second frame buffer 842, the execution screen corresponding to the resolution and density of the second display and recorded on the surfaces 821, 822, and 823.

The electronic device may open or close a path transmitted from the surface flinger 830 to the first frame buffer 841 or the second frame buffer 842 in response to a screen switching event.

Therefore, in case of folding or unfolding, the screen can be provided seamlessly though switch between the first display and the second display.

Figure 9:
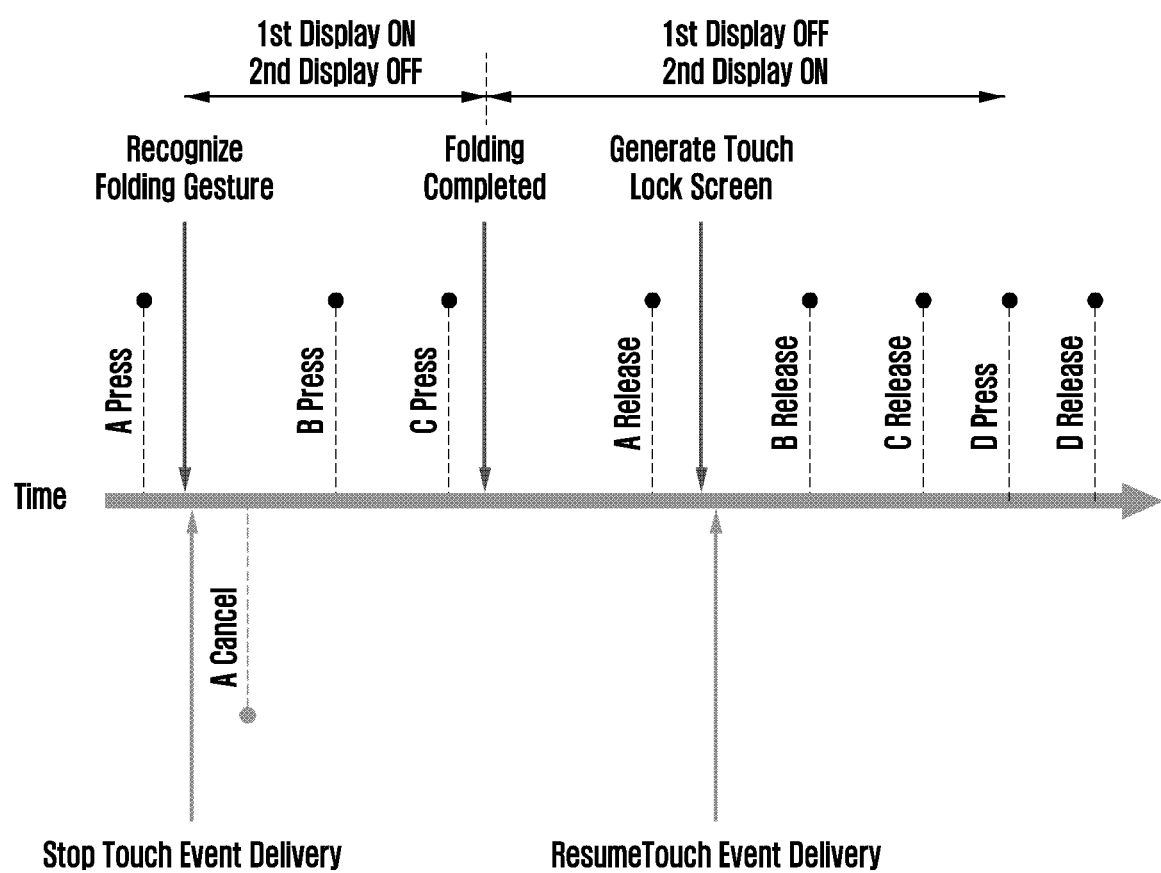
FIG. 9 is a diagram illustrating a method of processing a touch event detected in a folding operation at an electronic device according to an embodiment of the disclosure.

FIG. 9 is a diagram illustrating a method of processing a touch event detected in a folding operation at an electronic device according to an embodiment of the disclosure.

Referring to FIG. 9, the processor may display an execution screen of an application on the first display while the electronic device (e.g., the electronic device 500 in FIG. 5) or the first display (e.g., the first display 510 in FIG. 5) is unfolded. At this time, a press event (A press) for one region of the first display may be detected. According to various embodiments, when the electronic device is in the unfolded state, the second display (e.g., the second display 520 in FIG. 5) and the second touch sensor (e.g., the second touch sensor 525 in FIG. 5) may be in an activated state or in an inactivated state. Hereinafter, an embodiment in which the inactivated state is switched to the activated state in response to the folding gesture will be described.

The processor (e.g., the processor 530 in FIG. 5) may detect that the folding gesture is started. For example, the processor may detect the folding gesture through a variation in angle between the first housing structure (e.g., the first housing structure 210 in FIG. 2A) covering the first area of the first display and the second housing structure (e.g., the second housing structure 220 in FIG. 2B) covering the second area of the first display.

When the folding gesture is detected, the processor may request the first touch sensor (e.g., the first touch sensor 515 in FIG. 5) to stop transmitting the touch event. Therefore, the touch event of the first touch sensor and/or the second touch sensor may not be delivered to the processor until the processor requests again the first touch sensor and/or the second touch sensor to transmit the touch event. For example, the touch event delivered to the event hub (e.g., 732 in FIG. 7) from the touch controller (e.g., 751 in FIG. 7) in the hardware layer and the touch driver (e.g., 741 in FIG. 7) in the kernel driver layer may not be delivered to the application (e.g., 711 in FIG. 7).

This is to prevent a touch from being wrongly inputted during display switching.

Among touch events that have already occurred, the processor may discard a touch event that has not been delivered to the application. The processor may provide the application with a cancel event (A cancel) for a touch event (A press) having been provided to the application before the folding is started. Therefore, the application may not perform an operation corresponding to the previously received touch event (A press) or cancel an operation that has already been performed.

Touch events (B press, C press) occurring while the folding gesture is carried may not be delivered to the processor.

When the folding gesture is completed, the processor may switch the first display to the inactivated state and switch the second display to the activated state. The state switching timing between the first and second displays is not limited to the above. In a certain case, the first and second displays may be simultaneously turned on for a while.

The processor may generate and display a touch lock screen on the second display in response to the folding gesture. The processor may prevent an unintended touch input from being transmitted to the application by generating the touch lock screen as an upper layer of the application window on the z-order.

When displaying the touch lock screen, the processor may activate the second touch sensor and request the first touch sensor and/or the second touch sensor to resume delivery of the touch event. Regardless of the activated touch sensors, the processor may request both the first touch sensor and the second touch sensor to stop or resume the delivery of the touch event.

Therefore, a touch event (A release) occurring before the touch lock screen is displayed may not be provided to the application. This is to prevent a touch input from being wrongly entered because the user may maintain a grip state for folding even just after the second display is switched to the activated state.

The second touch sensor of the second display may provide the processor with a touch event occurring after the touch lock screen is generated. For example, from a point of view of the user or the touch sensor, touch events of B release and C release are operations connected with touch events of B press and C press. Because the touch events of B press and C press are made during folding, the touch events of B press and C press may not be delivered to the processor. Thus, even though the touch events of B release and C release are delivered from the second touch sensor, the processor may ignore the touch events of B release and C release and may not perform operations corresponding to the touch events of B release and C release. Alternatively, the processor may not provide the touch events of B release and C release to the application.

According to another embodiment, the processor may deliver, to the application, all touch events received from the second touch sensor after the touch lock screen is generated. Then, among such touch events, the application may regard some touch events, such as B release and C release, received without corresponding press events as errors and thereby may not reflect them in an application state.

Thereafter, when a new touch event of D press is provided from the second touch sensor, the processor may perform an operation corresponding to the D press. For example, the processor may remove the touch lock screen from the display in response to touch events (D press and D release) occurring on the second display while the touch lock screen is displayed, and may display an execution screen of the application on the second display. Thereafter, the processor may provide the application with a touch event occurring while the execution screen of the application is displayed.

Unlike FIG. 9, when a touch event of D press is not entered within a given time (e.g., about 5 seconds), the processor may terminate displaying the touch lock screen and turn off the second display.

FIGS. 10A, 10B, 10C, 10D, 10E and 10F are screenshots showing a touch lock screen displayed on an electronic device according to various embodiments of the disclosure.

According to various embodiments, a processor (e.g., the processor 530 in FIG. 5) of an electronic device 1000 may display a touch lock screen 1070 on a second display 1020 in response to a folding gesture. In this case, the processor may generate the touch lock screen 1070, based on a security level assigned to an application, and operate in a non-secure mode, a weak secure mode, or a strong secure mode, depending on the security level. Although it will be described that the touch lock screen determined according to the security mode is displayed, this is not construed as a limitation. For example, the touch lock screen 1070 shown in FIG. 10A is not necessarily limited to being displayed only in the weak secure mode.

Figure 10A:
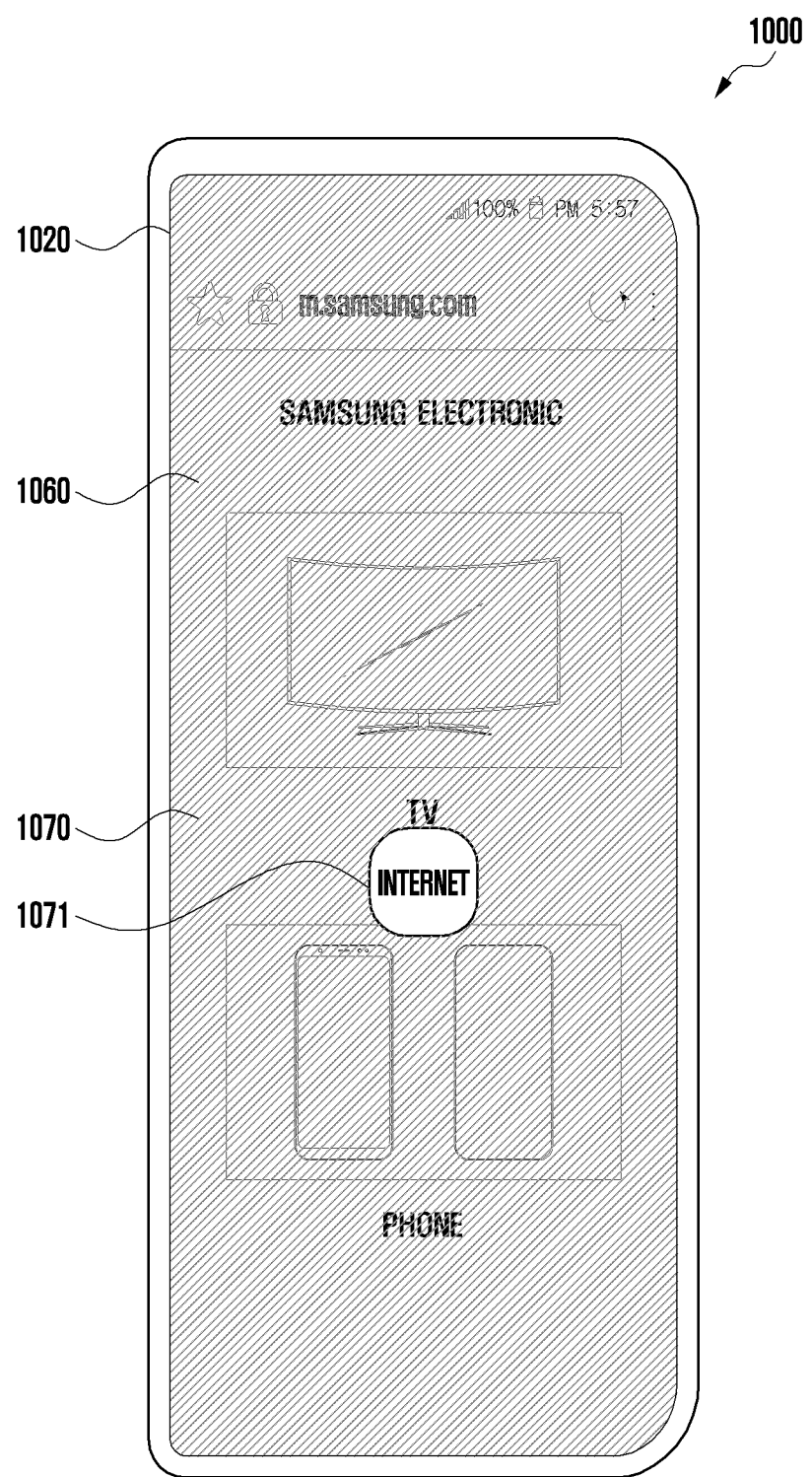
FIGS. 10A, 10B, 10C, 10D, 10E, and 10F are screenshots showing a touch lock screen displayed on an electronic device according to various embodiments of the disclosure.

Referring to FIG. 10A, an example of the touch lock screen 1070 displayed in the weak secure mode is illustrated.

For example, when a first display (e.g., the first display 510 in FIG. 5) is unfolded, the processor may execute an Internet application in the foreground and display an execution screen of the Internet application on the first display. At this time, the second display 1020 may be turned off in a power saving mode or may be in always on display (AOD) mode.

When a folding gesture is detected, the processor may identify the security level assigned to the Internet application as a first level corresponding to the weak secure mode. The security level assigned to an application may be contained in attribute information of the application and may be changed according to user's setting.

According to various embodiments, when the security level is set to the first level, the processor may generate the touch lock screen 1070 containing at least in part a translucent region. In this situation, the touch lock screen is displayed as an upper layer compared to the execution screen 1060 of the application and the touch lock screen is displayed as partially overlapping with the execution screen of the application.

The touch lock screen 1070 may contain an icon 1071 indicating an execution screen 1060 of the Internet application being executed on a lower layer of the touch lock screen 1070. The processor may resize the execution screen 1060 of the Internet application, based on a resolution of the second display 1020 in response to the folding gesture.

Because the first display covers most of a first surface of the housing and the second display 1020 covers a portion (e.g., half) of a second surface of the housing, the first display and the second display 1020 may have different resolutions (or aspect ratios).

The processor may display the generated touch lock screen 1070 on the upper layer of the execution screen 1060 of the Internet application.

Referring to FIG. 10A, because the touch lock screen 1070 contains a translucent area, the execution screen 1060 of the Internet application disposed on the lower layer may also be recognized by the user.

Figure 10B:
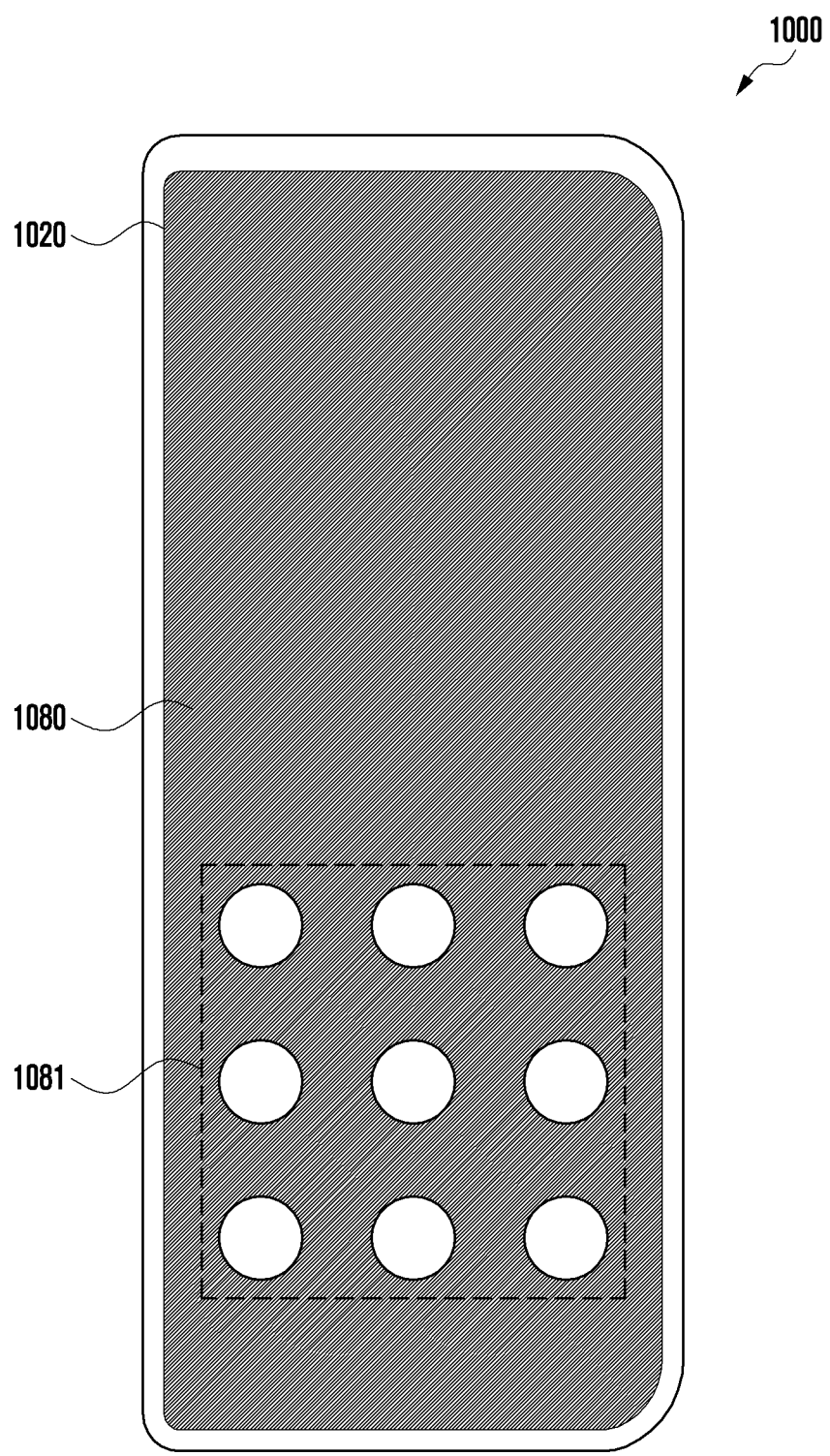

FIG. 10B illustrates an example of a touch lock screen displayed in the strong secure mode.

For example, when the first display is unfolded, the processor may execute a memo application having a security level set to a second level in the foreground, and display an execution screen of the memo application on the first display.

When a folding gesture is detected, the processor may identify the second level assigned to the executed memo application and generate a touch lock screen 1080 containing guide information for releasing a security state. The guide information is information for guiding an unlocking method (e.g., a pattern input, a password input, an iris recognition, a fingerprint recognition, and the like) in a lock mode.

Referring to FIG. 10B, the guide information may have an image 1081 for entering an unlock pattern. In this situation, the size and/or the resolution of the guide information during the unfolding state is reduced compared to the size and/or resolution of the guide information displayed in the first display.

In the strong secure mode, the processor may display the touch lock screen 1080 opaquely on the second display 1020 in order not to expose information of the executed application.

In this case, when user authentication (e.g., a pattern input, a password input, an iris recognition, a fingerprint recognition, and the like) is completed while the touch lock screen 1080 is displayed, the processor may display an execution screen of an application on the second display 1020. According to an embodiment, the processor may display another application (e.g., a home screen or a background running application) instead of the executed application on the second display 1020.

According to various embodiments, the processor may determine the security level or execution mode, based on the attributes of the folding gesture. For example, the attributes of the folding gesture may include a time difference between a start time point and a completion time point of the folding gesture, a direction of the second display 1020 (i.e., a user's visible direction or not), after folding, determined through a direction of the folding gesture, or a comparison in acceleration between housing structures (e.g., the first housing structure 210 and the second housing structure 220 in FIG. 2A) moved when folding.

The attributes of the application and the attributes of the folding gesture for determining the security level or execution mode may be changed by user's setting.

Figure 10C:
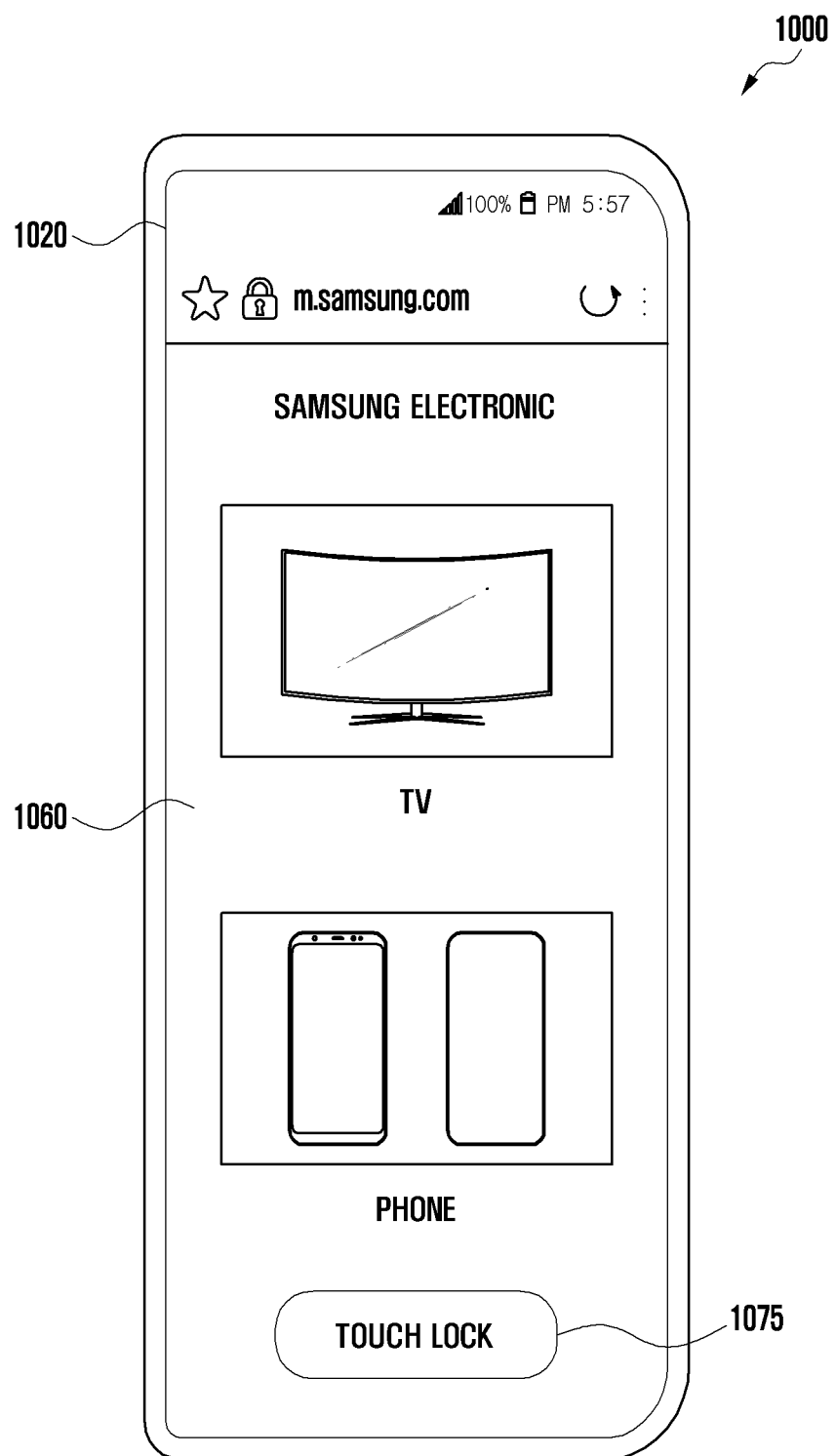

FIG. 10C illustrates another example of the touch lock screen. The touch lock screen of FIG. 10C may be displayed in the weak secure mode, but is not limited thereto.

Referring to FIG. 10C, when the electronic device 1000 is folded, the processor may display the touch lock screen composed of a transparent layer on the second display 1020 to be overlapped with the application execution screen 1060. In this case, the touch lock screen may contain an object 1075 such as a specific phrase (e.g., touch lock) for indicating the touch lock state. Because the touch lock screen is transparent, the application execution screen 1060 may be visible to the user as it is.

Thereafter, the touch lock screen may be removed when an input for the object 1075 of the touch lock screen or a predetermined touch input such as swipe is received. For example, the predetermined touch input may include, besides the swipe, any touch input that satisfies predetermined input strength, input direction, input frequency, input duration, and/or distance.

While the touch lock screen is displayed, a touch occurring on the application execution screen 1060 may be rejected, and a visual or tactile feedback corresponding thereto may be provided.

Figure 10D:
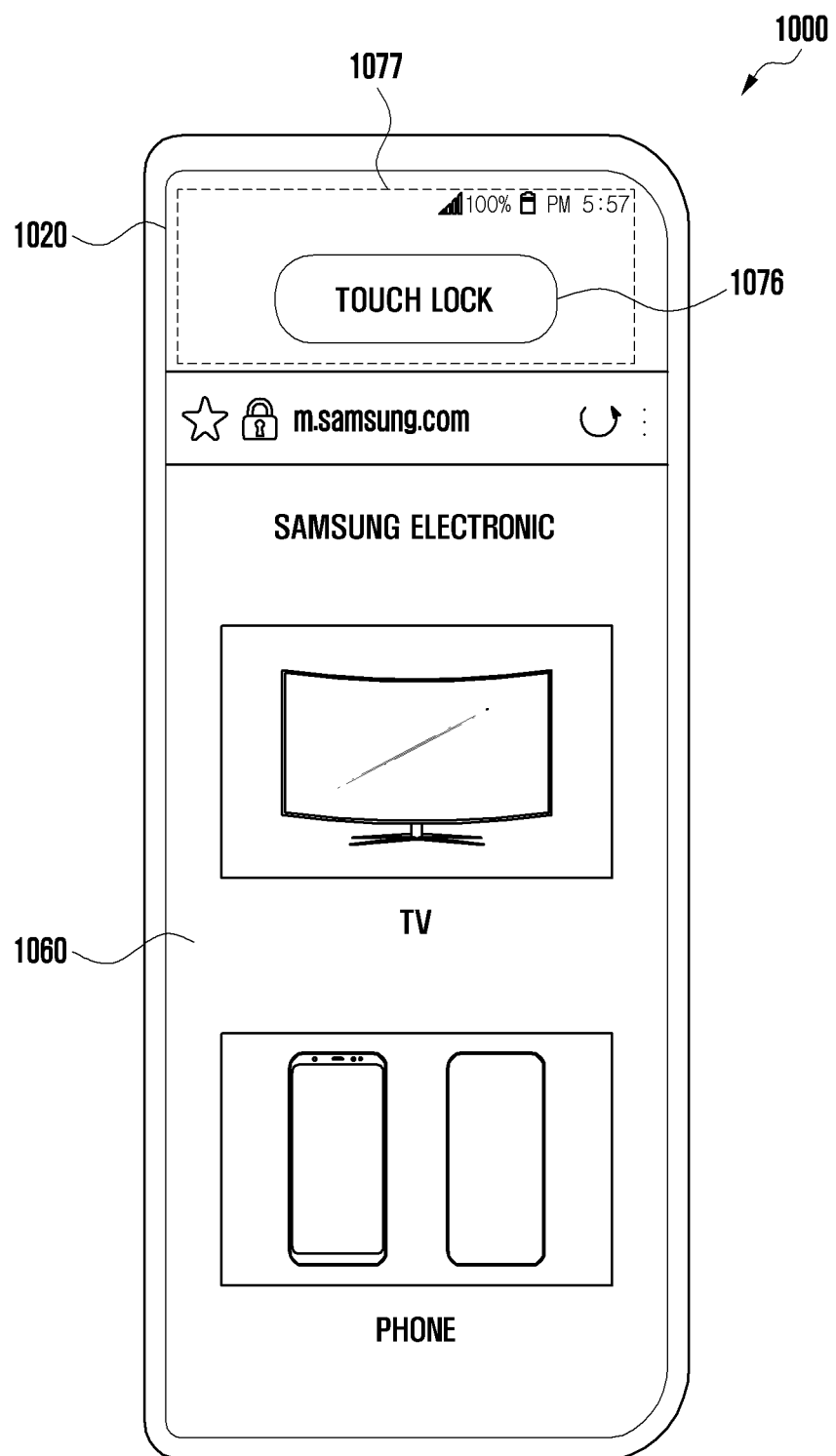

FIG. 10D illustrates still another example of the touch lock screen.

Referring to FIG. 10D, when the electronic device 1000 is folded, the processor may display the touch lock screen composed of a transparent layer and display an object 1076 such as a specific phrase (e.g., touch lock) for indicating the touch lock state on an external area 1077 of the application execution screen 1060. Thereafter, the touch lock screen may be removed when an input for the object 1076 of the touch lock screen or a predetermined touch input such as swipe is received. While the touch lock screen is displayed, a touch occurring on the application execution screen 1060 may be rejected, and a visual or tactile feedback corresponding thereto may be provided.

Figure 10E:
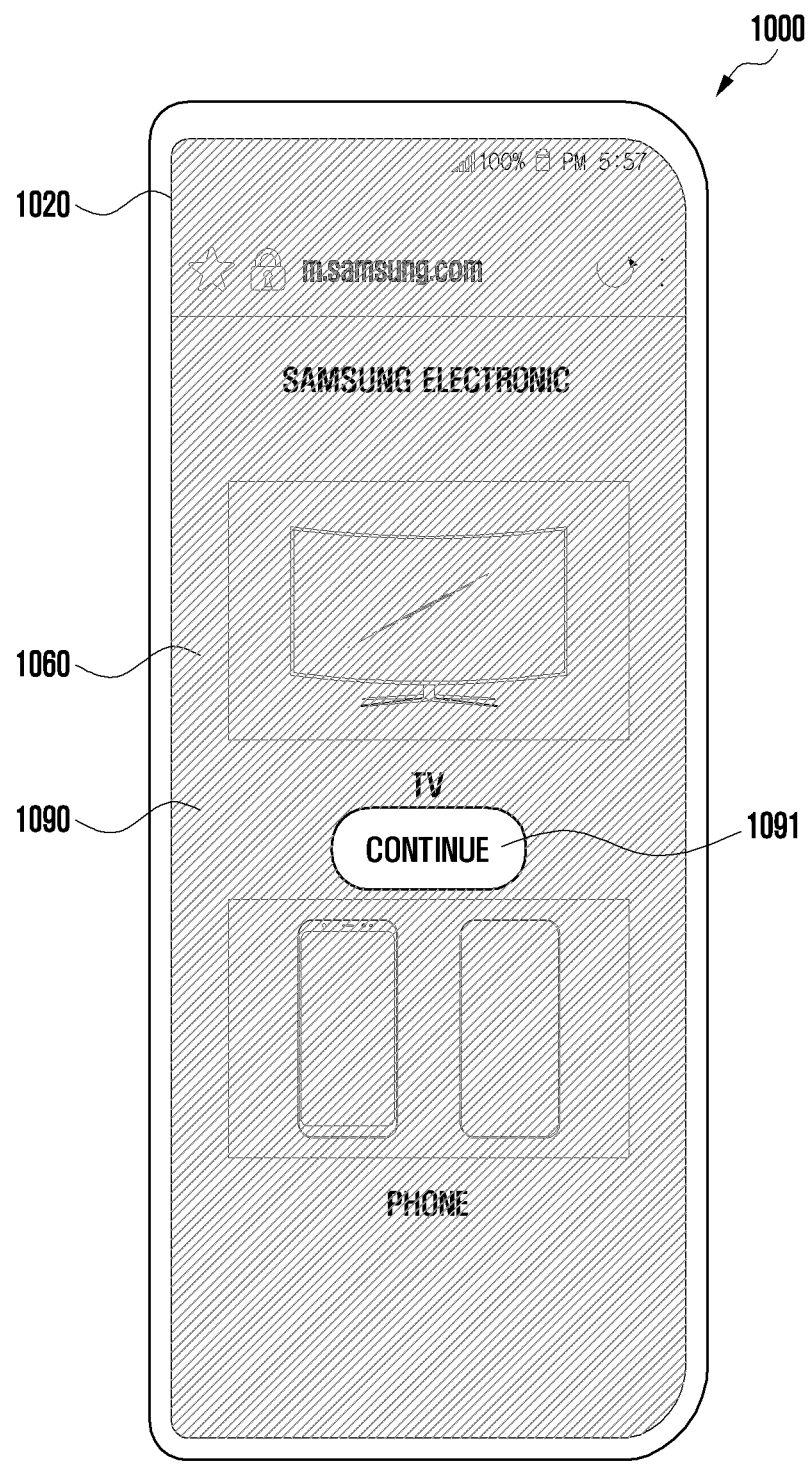

FIG. 10E illustrates yet another example of the touch lock screen.

Referring to FIG. 10E, the processor may generate a touch lock screen 1090 containing at least in part a translucent region and display the generated touch lock screen 1090 on the second display 1020. The touch lock screen 1090 may contain a certain object 1091 for removing the touch lock screen 1090. When a touch input for the object 1091 of the touch lock screen 1090 is received, the touch lock screen 1090 may be removed, and the application execution screen 1060 may be displayed.

Figure 10F:
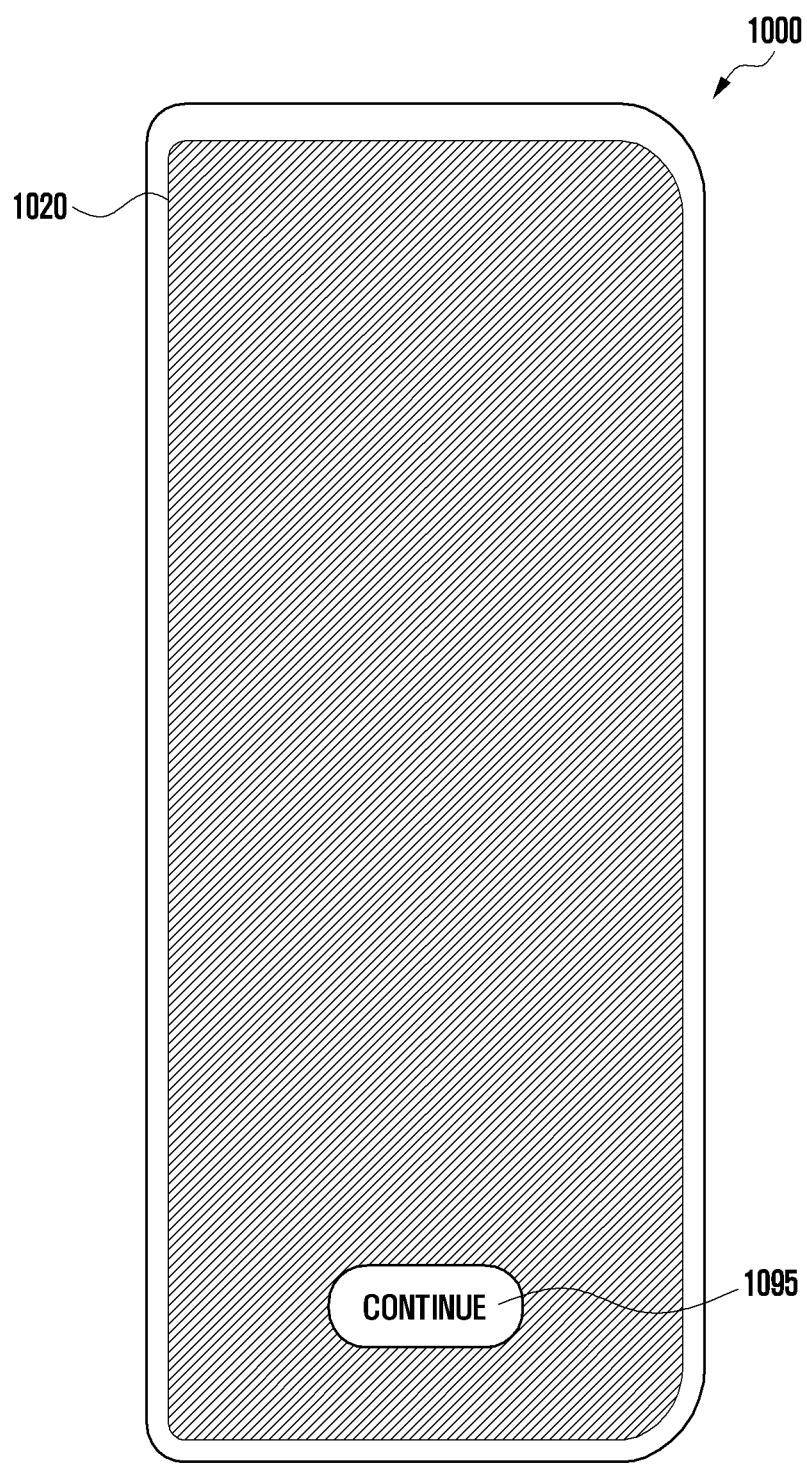

Referring to FIG. 10F, the processor may turn off the second display without displaying the touch lock screen. For example, when the electronic device 1000 is completely folded, the processor may turn off the second display 1020 and display an object 1095 for turning on the second display 1020. When a touch input for the object 1095 is received, the processor may turn on the second display 1020 and display an application execution screen.

FIGS. 11A to 11E are screenshots showing a screen displayed on each display of an electronic device in a folding operation according to various embodiments of the disclosure.

According to various embodiments, a processor (e.g., the processor 530 in FIG. 5) may determine a method of displaying an application on a second display 1120, based on whether an execution screen of the application is resizable.

Figure 11A:
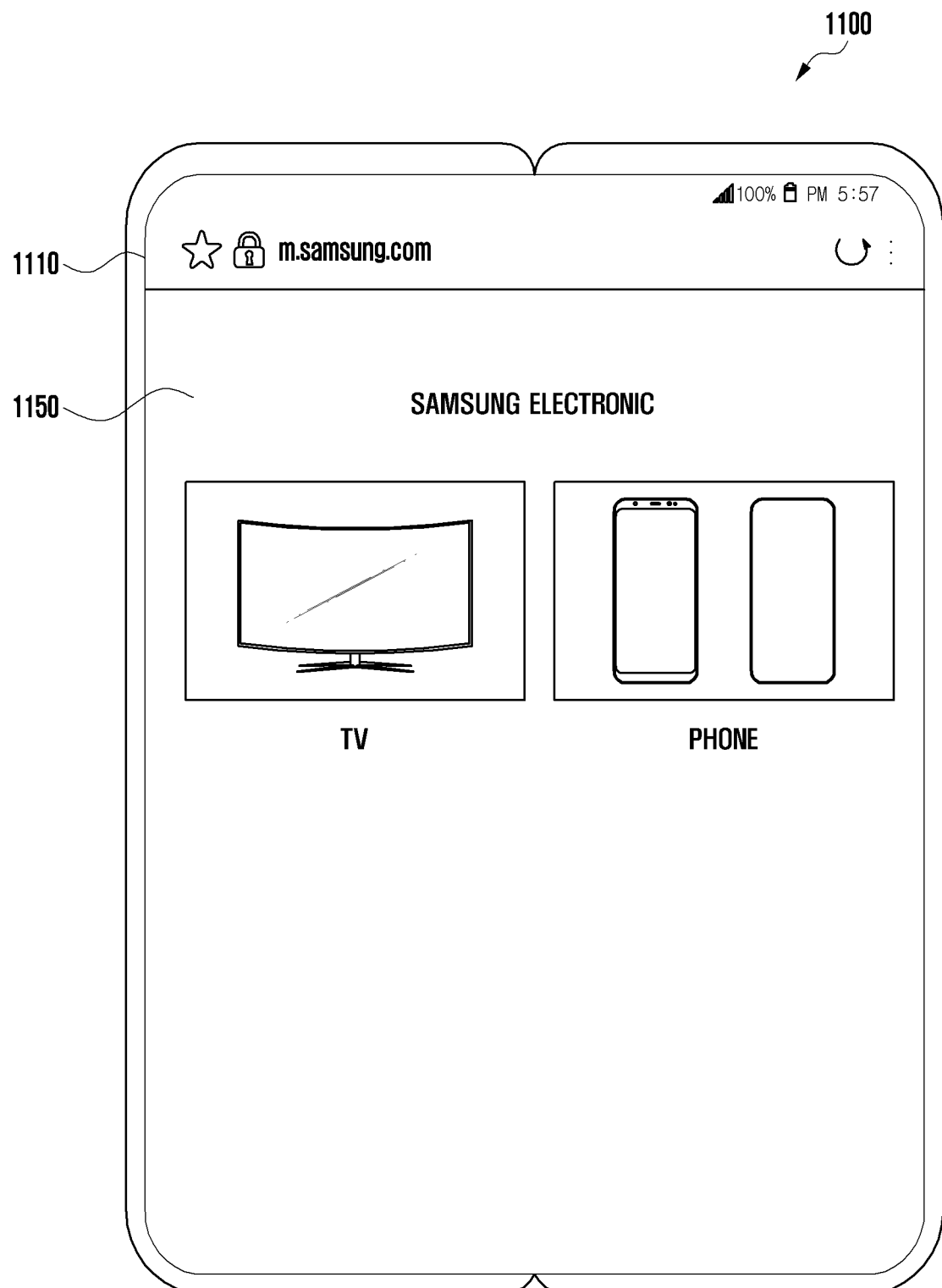
Figure 11B:
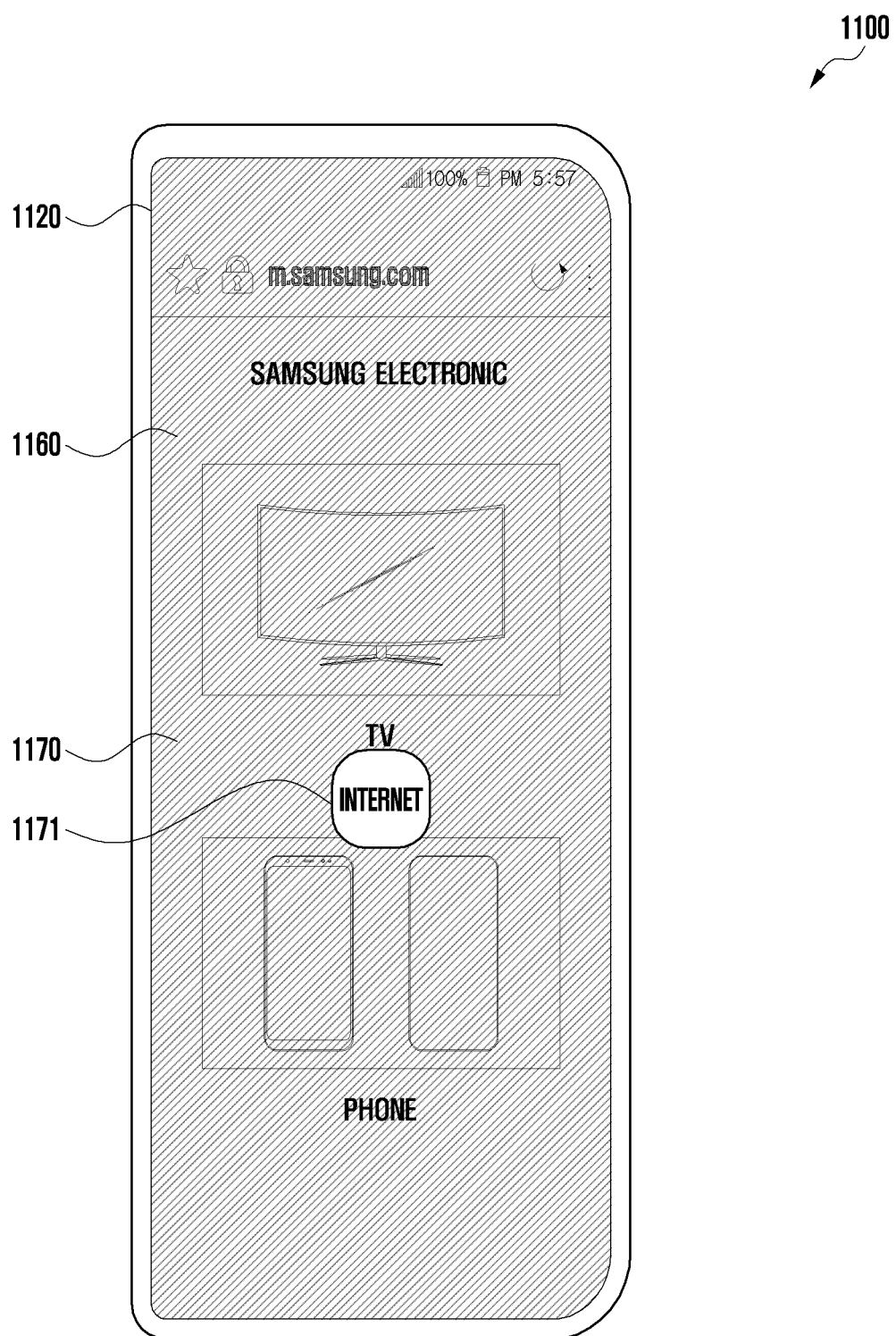
Figure 11C:
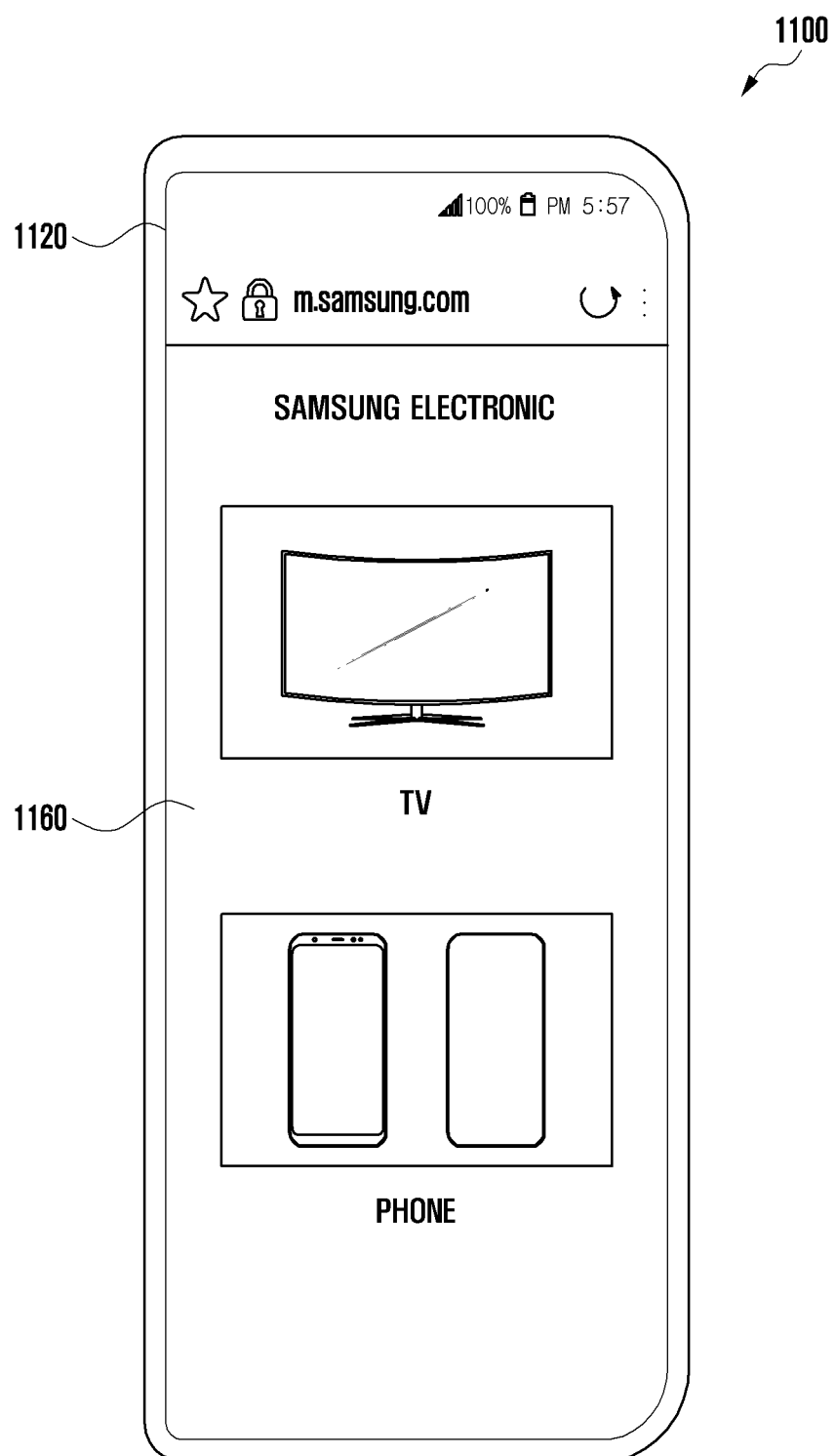

FIGS. 11A to 11C show examples of displaying an Internet application which is a resizable application.

Referring to FIG. 11A, in an electronic device 1100 when a first display 1110 is unfolded, the processor may generate an execution screen 1150 of the Internet application corresponding to the resolution and density of the first display 1110 and display the generated screen 1150 on the first display 1110.

Referring to FIG. 11B, when a folding gesture is detected, the processor may generate a touch lock screen 1170. At the same time, the processor may transmit a screen switch event to the Internet application, so that the Internet application may redraw the application execution screen in accordance with the resolution and density of the second display 1120.

The touch lock screen 1170 may contain an icon 1171 indicating an execution screen 1160 of an application being executed on a lower layer of the touch lock screen 1170.

According to various embodiments, the processor may generate the touch lock screen 1170 to contain at least in part a translucent region, and display the touch lock screen 1170 on an upper layer of the resized execution screen 1160 of the Internet application.

As described above with reference to FIGS. 10A and 10B, the processor may generate the touch lock screen 1170, based on a security level of an application and/or attributes of a folding gesture. After the touch lock screen 1170 is displayed, the processor may perform an operation according to a touch event of a second touch sensor of the second display 1120.

According to various embodiments, when a specific input (e.g., a long press) is received while the touch lock screen 1170 is displayed, the processor may process the received input as an input for the application execution screen 1160 displayed on a lower layer of the touch lock screen 1170 and thereby perform a corresponding operation. In contrast, when a touch input that is not of a determined type is input, the touch input might not be processed as an input for the application execution screen.

According to various embodiments, the touch lock screen 1170 may have a partially removed portion. For example, when the touch lock screen 1170 is formed of a translucent screen, at least a portion thereof may be completely transparent. Even when the touch lock screen 1170 is being displayed, the processor may provide a touch event to an application in response to a touch input for the portion of being completely transparent and update an application execution screen. For example, when the Internet application is being executed, portions of the touch lock screen corresponding to a web page refresh button, a favorite button, and a URL input window may be removed to receive a user input even when the touch lock screen is displayed. When the user touches the web page refresh button, the application execution screen may be updated by refreshing the web page while displaying the touch lock screen 1170 is maintained.

Referring to FIG. 11C, when a predetermined touch input (e.g., swipe) occurs on the touch lock screen 1170, the processor may remove the touch lock screen 1170 displayed on the upper layer and thereby display the application execution screen 1160. The application execution screen 1160 may be different from the application execution screen 1150 displayed on the first display 1110. For example, because time elapses, an execution state of the application before folding may be changed after folding, and therefore the application execution screen may be updated.

Figure 11D:
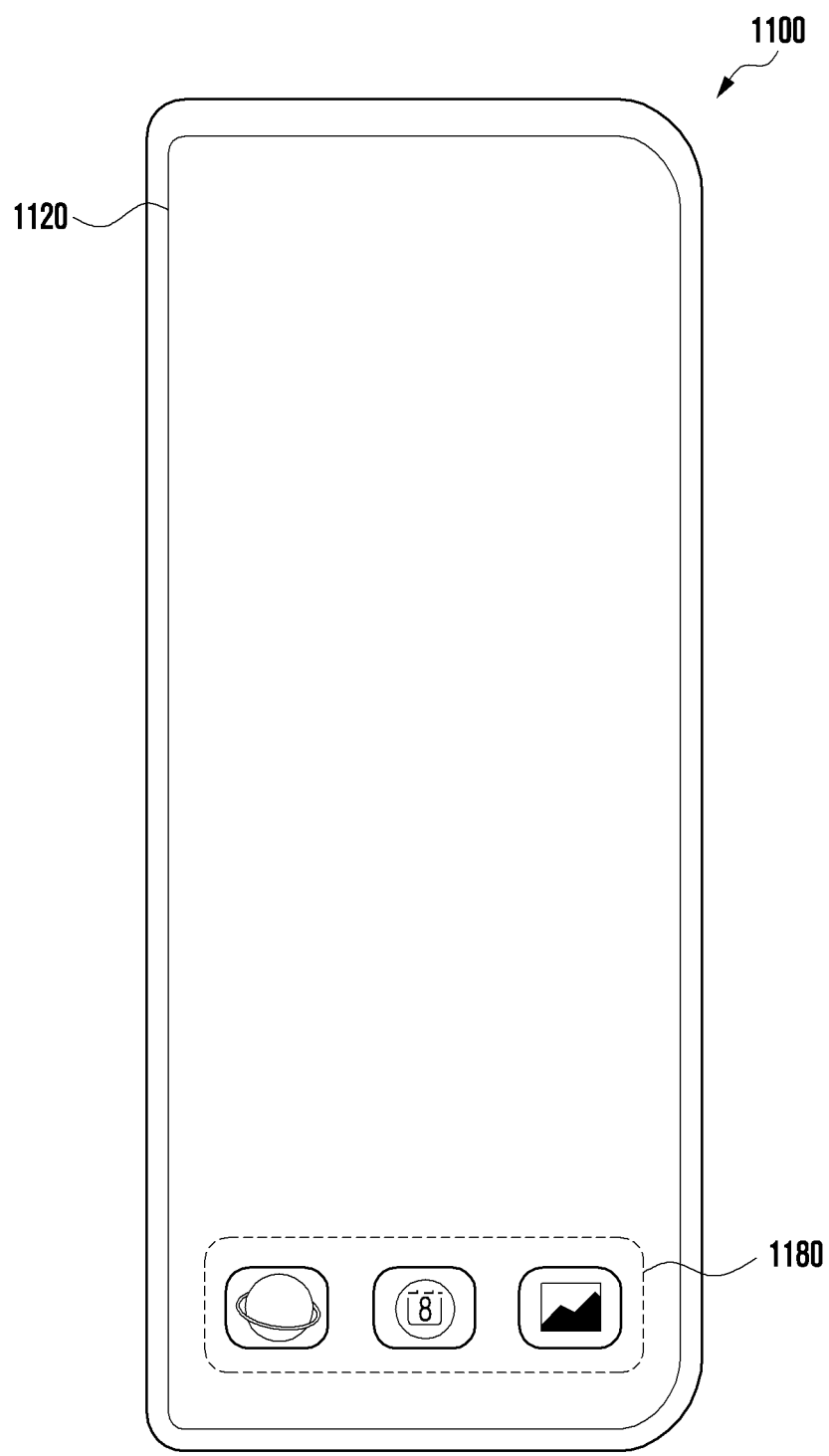

Referring to FIG. 11D, when the electronic device 1100 is folded, the processor may display one or more application icons 1180 on the second display 1120. These icons 1180 may be related to an application set by the user, an application frequently used, and/or an application recently used. When an input for one of the application icons 1180 is received, the processor may immediately execute the corresponding application and display it on the second display 1120.

Referring to FIG. 11E, when the electronic device 1100 is folded, the processor may display icons 1190 corresponding to a plurality of applications 1150 displayed on a multi-screen in an unfolded state. FIG. 11E illustrates an Internet application 1151, a calendar application 1152, and a gallery application 1153 displayed on the multi-screen in the unfolded state. After the electronic device is folded, the processor may display the icons 1190 corresponding to the above applications on the second display 1120. Then, when an input for one of the icons 1190 is received, the processor may immediately execute the corresponding application and display it on the second display 1120. In addition, when a predetermined input (e.g., a swipe, a password input, and the like) for the touch lock screen is received, the processor may display, on the second display 1120, the applications previously displayed on the multi-screen.

According to another embodiment, when folding, the processor may display, on the second display, icons corresponding to at least one application displayed on the first display in the unfolded state and an application running in the background.

FIGS. 12A to 12D are screenshots showing a screen displayed on each display of an electronic device in a folding operation according to various embodiments of the disclosure.

FIGS. 12A to 12D show examples of displaying a video application which does not support a change in resolution (or aspect ratio) but is resizable by a processor.

Figure 12A:
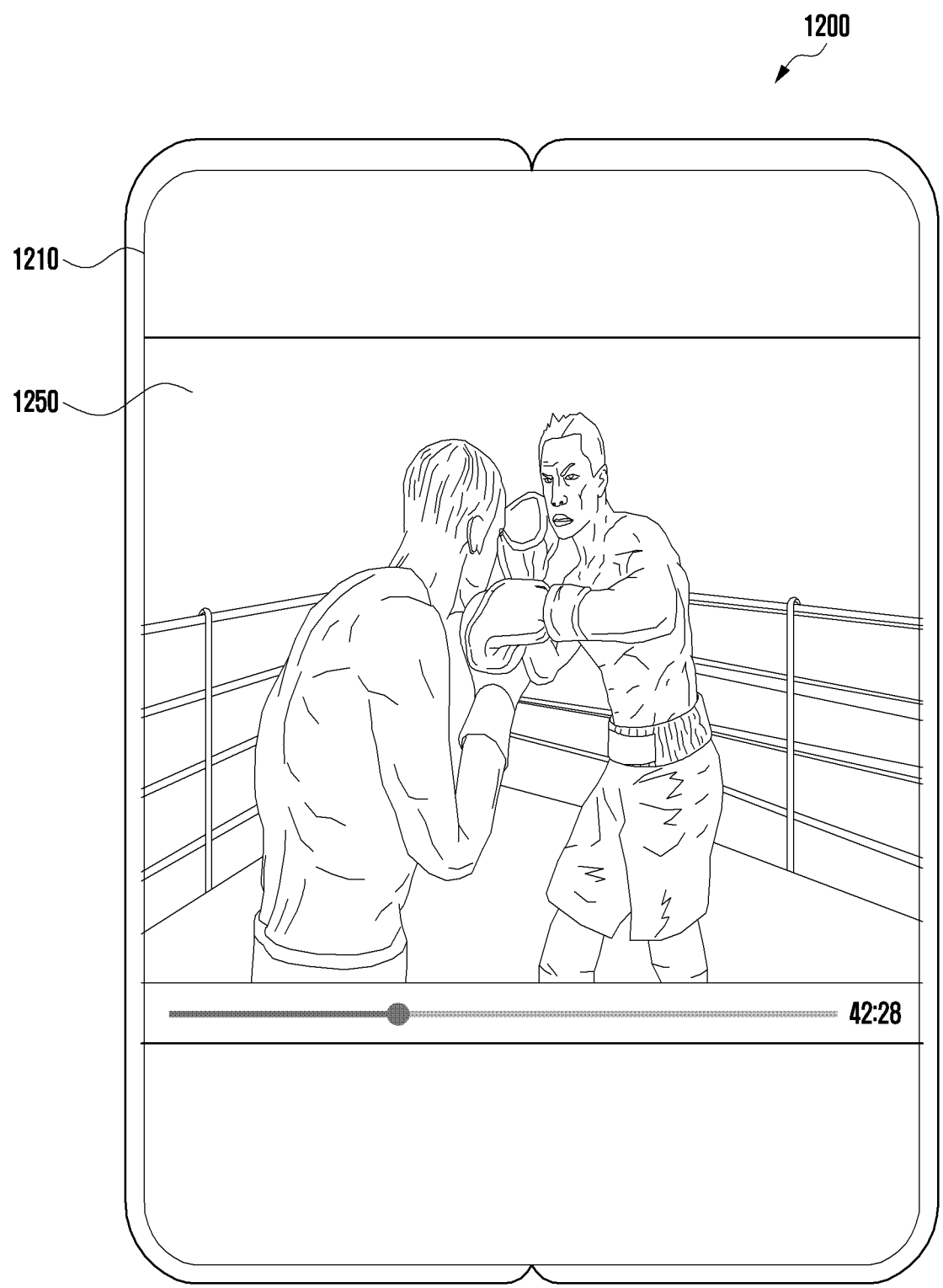
FIGS. 12A, 12B, 12C and 12D are screenshots showing a screen displayed on each display of an electronic device in a folding operation according to various embodiments of the disclosure.

Referring to FIG. 12A, in an electronic device 1200 when a first display 1210 is unfolded, the processor (e.g., the processor 530 in FIG. 5) may generate an execution screen 1250 of a video application to correspond to the resolution and density of the first display 1210 and display the generated screen 1250 on the first display 1210.

Figure 12B:
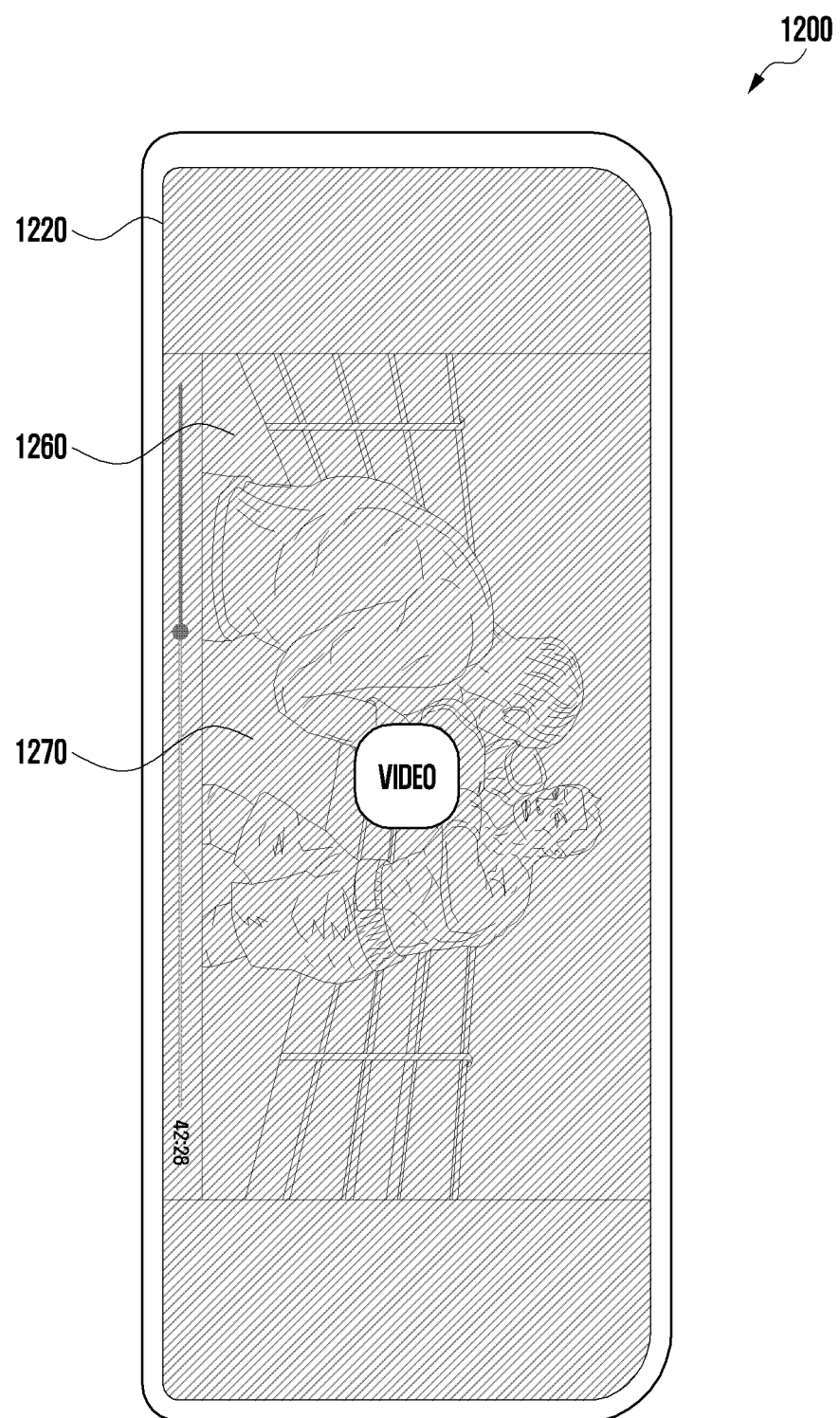

Referring to FIG. 12B, the processor may generate and display a touch lock screen 1270 on a second display 1220 in response to a folding gesture. In this case, the touch lock screen 1270 may contain at least in part a translucent region and may be displayed on an upper layer of a resized execution screen 1260 of the video application.

Because the video application does not support changing the resolution, the processor may forcibly change the resolution of the execution screen of the video application in accordance with the resolution (or aspect ratio) of the second display 1220. Therefore, contrary to the execution screen 1250 of the video application displayed on the first display 1210, the execution screen 1260 of the video application displayed on the second display 1220 may have, for example, an aspect ratio of being extended widthwise.

Figure 12C:
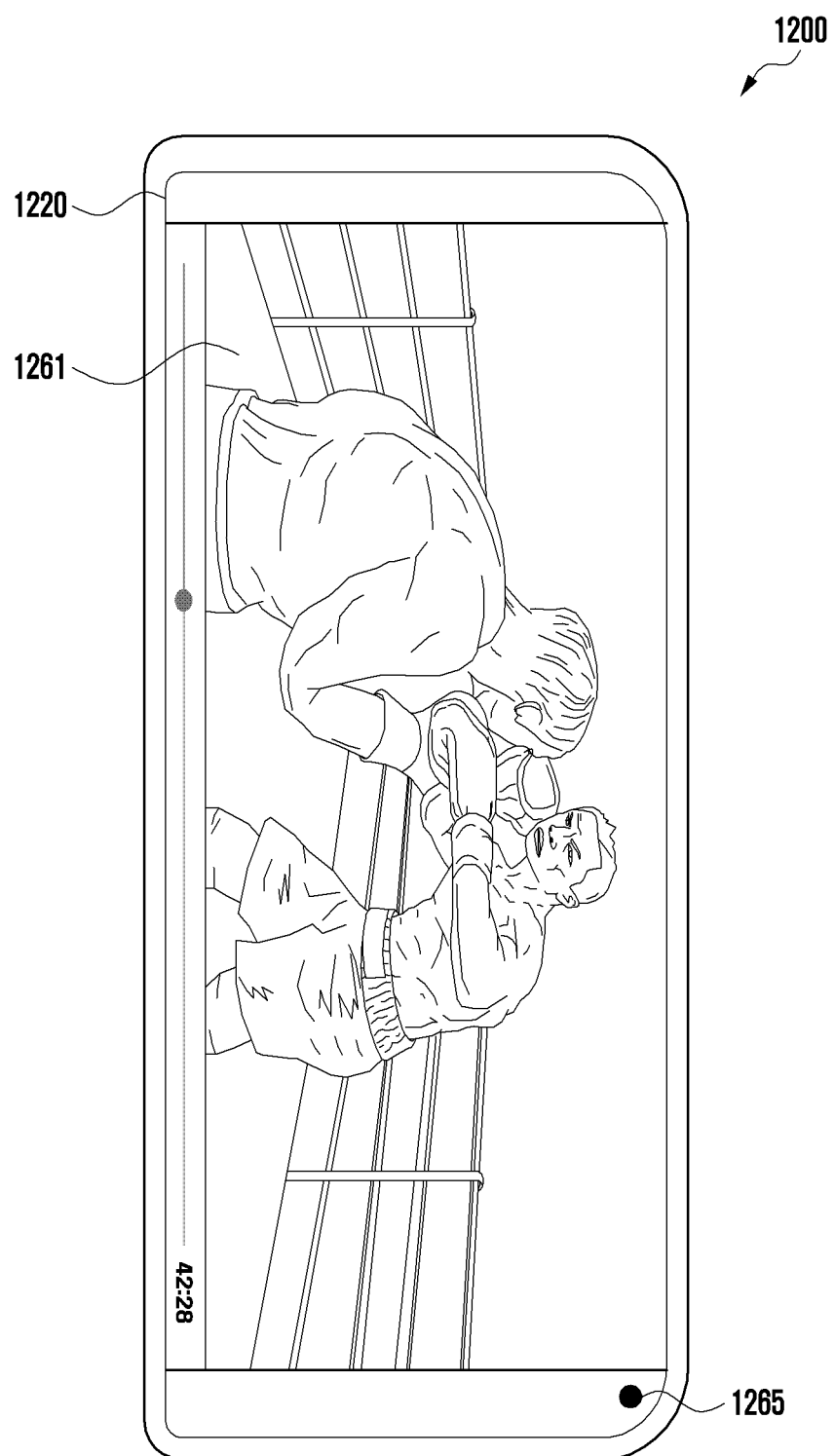

Referring to FIG. 12C, when a predetermined touch input (e.g., swipe) occurs on the touch lock screen 1270, the processor may remove the touch lock screen 1270 displayed on the upper layer and thereby display an application execution screen 1261. At this time, the execution screen 1261 of the video application may have an aspect ratio of being further extended widthwise in accordance with the resolution of the second display 1220.

In addition, the processor may output, on the second display 1220, a certain button 1265 for converting the resolution of the execution screen 1261 of the video application to the original resolution.

Figure 12D:
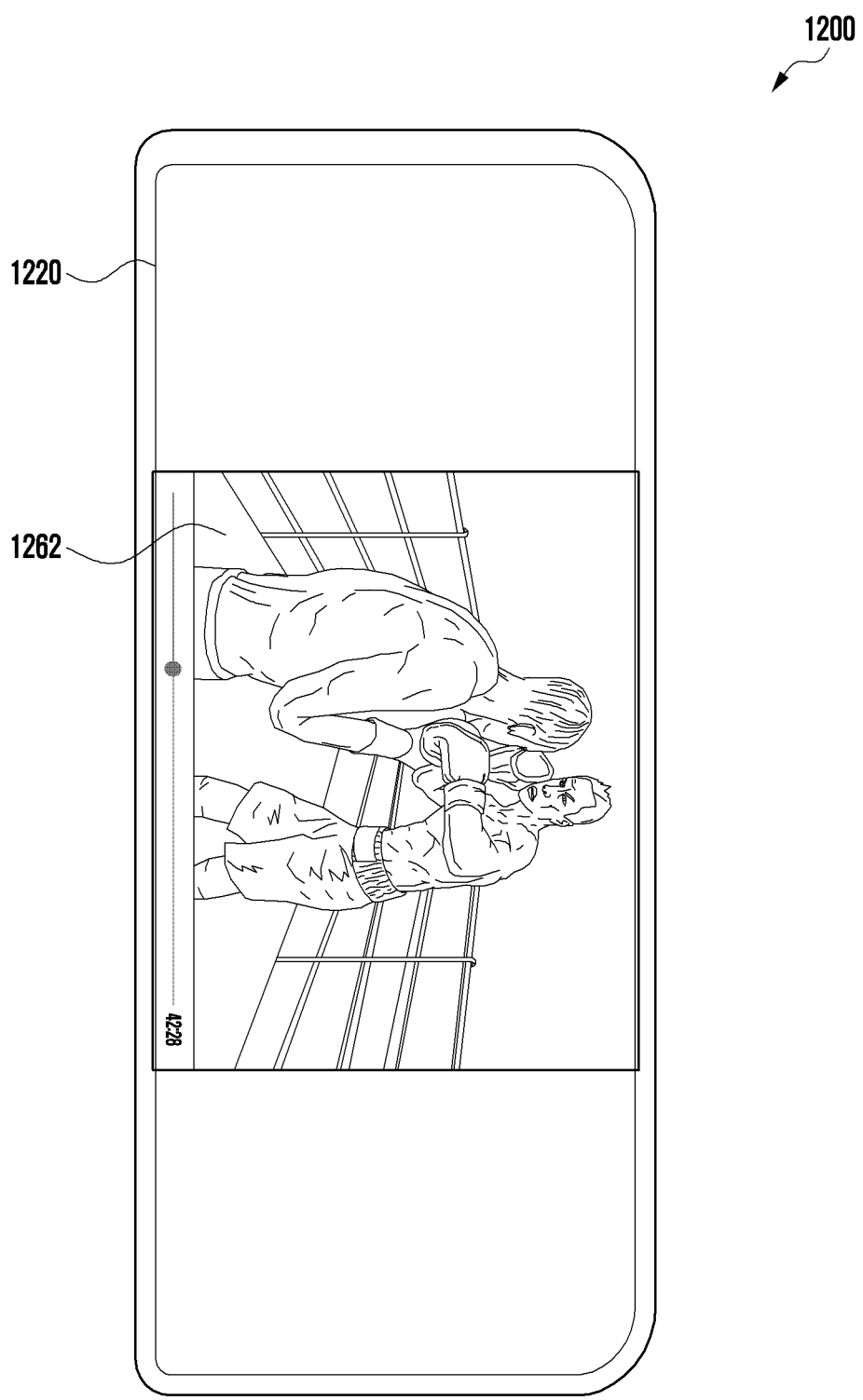

Referring to FIG. 12D, when the above button 1265 is selected, the processor may resize the execution screen 1261 of the video application to correspond to a predetermined resolution, that is, the resolution (aspect ratio) of the video application displayed on the first display 1210. Then, the processor may display a resized screen 1262 on the second display 1220.

FIGS. 13A, 13B, 13C and 13D are screenshots showing a screen displayed on each display of an electronic device in a folding operation according to various embodiments of the disclosure.

FIGS. 13A to 13D show examples of displaying a game application that disallows resizing of an execution screen. For example, the game application to be described hereinafter may be an application that does not support changing resolution and/or density during runtime and is configured to be forcibly terminated when changing the resolution is attempted.

Figure 13A:
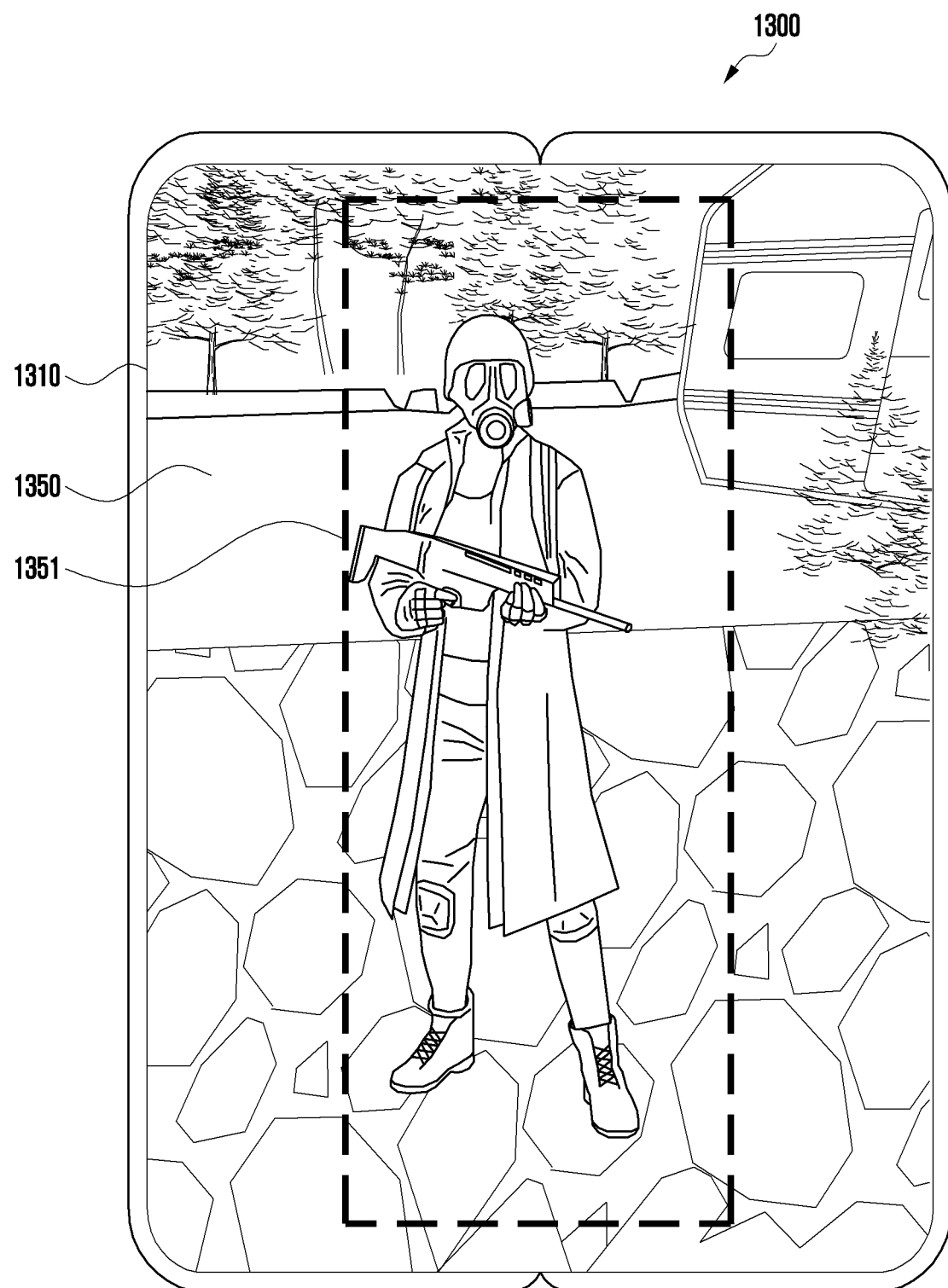
FIGS. 13A, 13B, 13C, and 13D are screenshots showing a screen displayed on each display of an electronic device in a folding operation according to various embodiments of the disclosure.

Referring to FIG. 13A, in an electronic device 1300 when a first display 1310 is unfolded, the processor (e.g., the processor 530 in FIG. 5) may generate an execution screen 1350 of the game application to correspond to the resolution and density of the first display 1310 and display the generated screen 1350 on the first display 1310 including a specific region 1351.

Figure 13B:
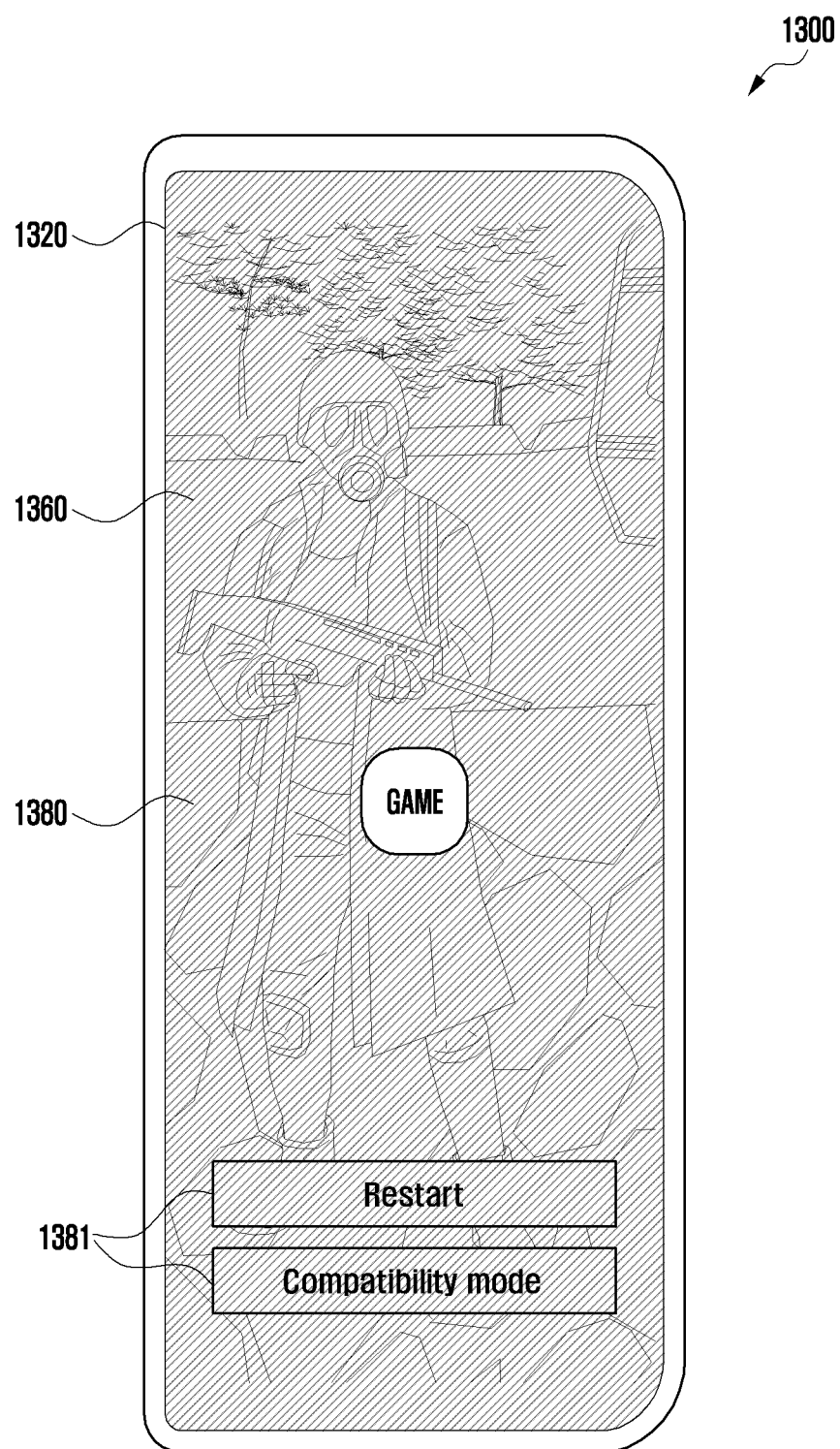

Referring to FIG. 13B, the processor may generate and display a touch lock screen 1380 on a second display 1320 in response to a folding gesture. According to various embodiments, the touch lock screen 1380 may contain a certain button 1381 for selecting an application restart or a compatibility mode. As described above, the game application may not support changing the resolution during runtime. Therefore, in order to execute the game application on the second display 1320 having a resolution different from that of the first display 1310 while executing the game application on the first display 1310, the game application may need to be re-executed after termination.

The processor may generate a thumbnail image 1360 having a region (e.g., a specific region 1351 in FIG. 13A) corresponding to the size of the second display 1320 in the execution screen 1350 of the game application displayed on the first display 1310. Then, the processor may display the thumbnail image 1360 on the second display 1320 and also display the touch lock screen 1380 on an upper layer of the thumbnail image 1360.

Figure 13C:
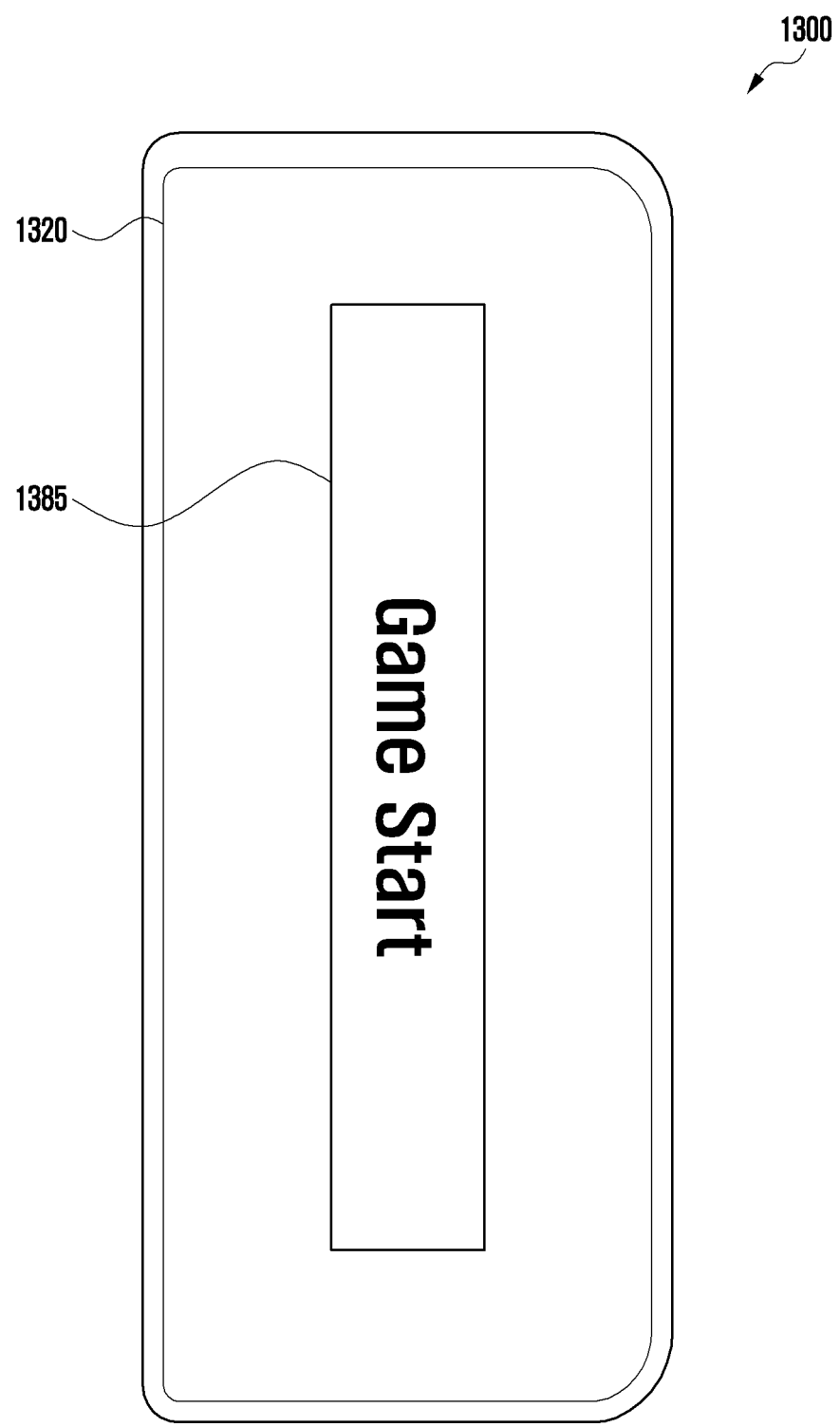

Referring to FIG. 13C, when the user selects the button of the application restart, the game application being executed may be terminated and re-executed. In this case, the processor may generate an execution screen 1385 of the re-executed game application in accordance with the resolution and density of the second display 1320.

Figure 13D:
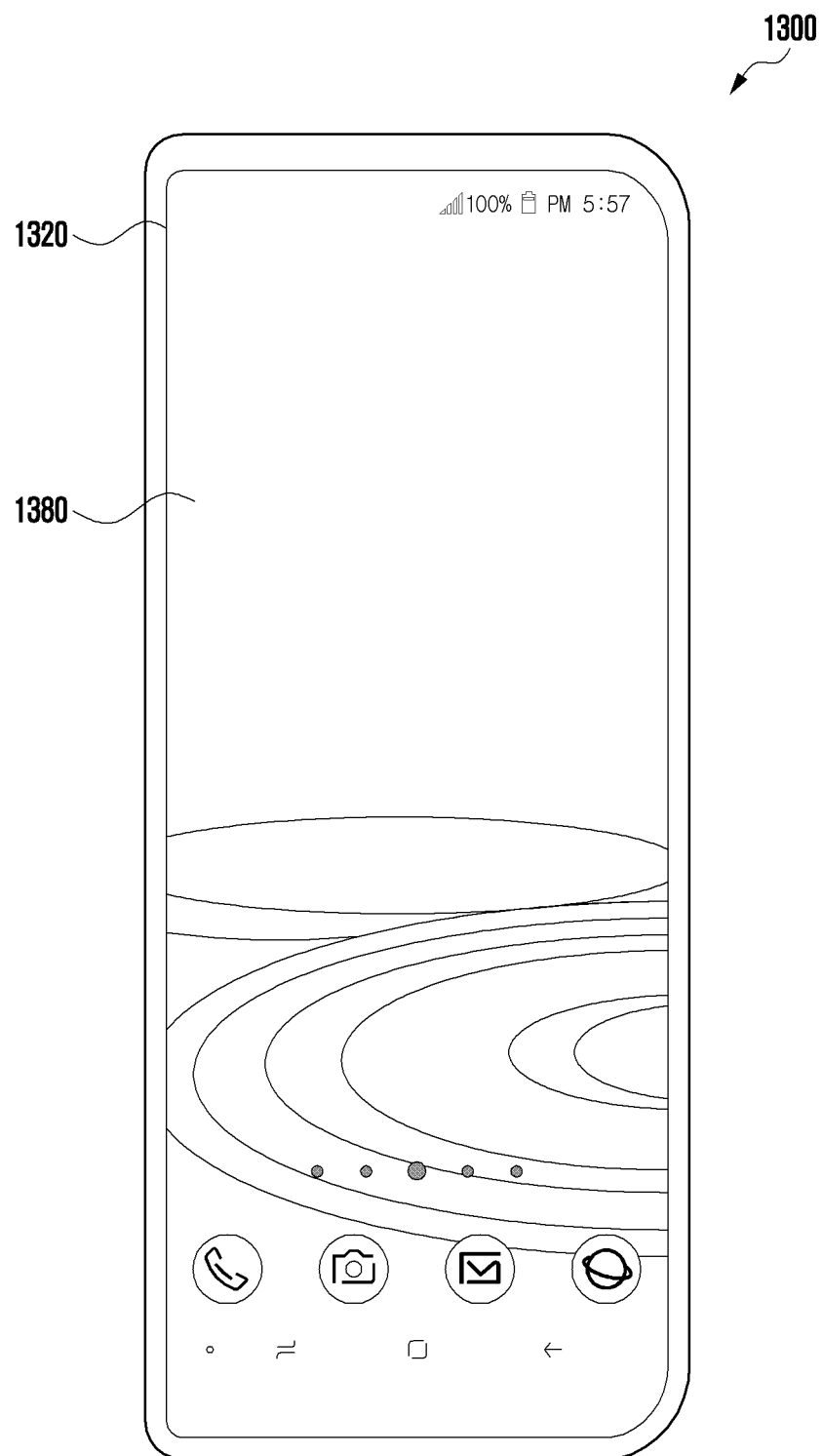

Referring to FIG. 13D, when the user selects the button of the compatibility mode, the processor may not send a screen switch event to the game application and may maintain the state of executing the game application in the background. In this case, the processor may pause the game application.

The processor may display a home screen 1380 on the second display 1320 at least in part simultaneously with the background execution of the game application. According to another embodiment, the processor may display, on the second display 1320, a screen of an application having the highest order on the z-order other than the game application.

Thereafter, when the first display 1310 is unfolded, the processor may automatically set the game application, being executed in the background, back to the top of the z-order and change the pause state to a resume state, thus allowing the game application to be continuously used on the first display 1310.

Figure 14:
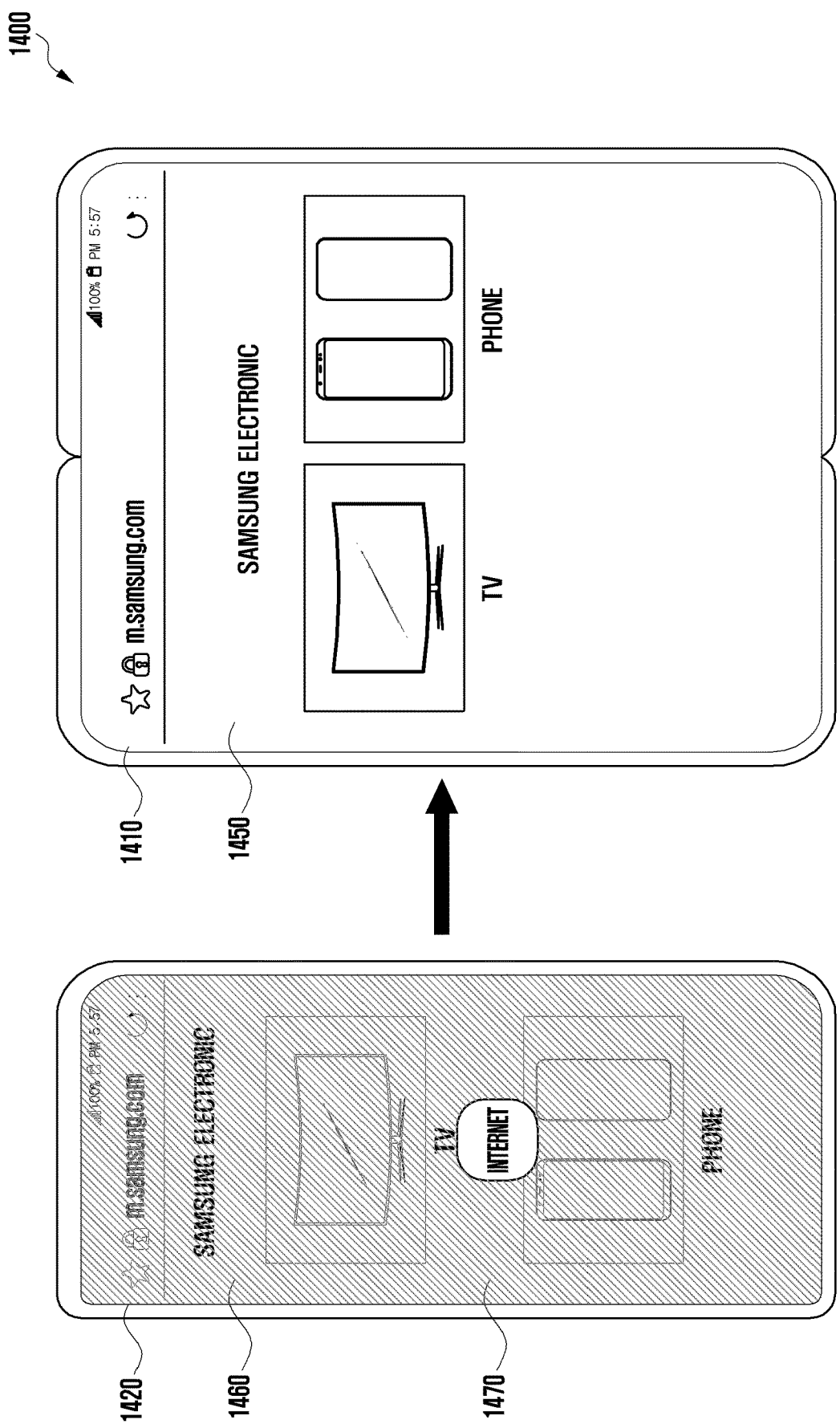
FIG. 14 is a screenshot showing a screen displayed on each display of an electronic device in an unfolding operation according to an embodiment of the disclosure.

FIG. 14 is a screenshot showing a screen displayed on each display of an electronic device in an unfolding operation according to an embodiment of the disclosure.

Referring to FIG. 14, an electronic device 1400 is shown in a case where an Internet application that is resizable and operates in a weak secure mode is being executed.

When a folding gesture is detected, the processor (e.g., the processor 530 in FIG. 5) may generate a touch lock screen 1470 and display the touch lock screen 1470 on a second display 1420. The touch lock screen 1470 may contain at least in part a translucent region and may be displayed on an upper layer of an execution screen 1460 of the Internet application.

Thereafter, in response to a predetermined touch input on the touch lock screen, the processor may remove the touch lock screen 1470 and display the execution screen 1460 of the Internet application.

The processor may detect an unfolding gesture for the first display 1410 while the touch lock screen 1470 is displayed or the execution screen 1460 of the Internet application is displayed with the touch lock screen 1470 removed. The processor may send a screen switch event to the Internet application in response to the unfolding gesture, and the Internet application may output an execution screen 1450 resized to correspond to the resolution of a first display 1410.

When the unfolding gesture is completed, the processor may remove the Internet application from the second display 1420 and enter in a power saving mode or output an AOD screen.

Figure 15:
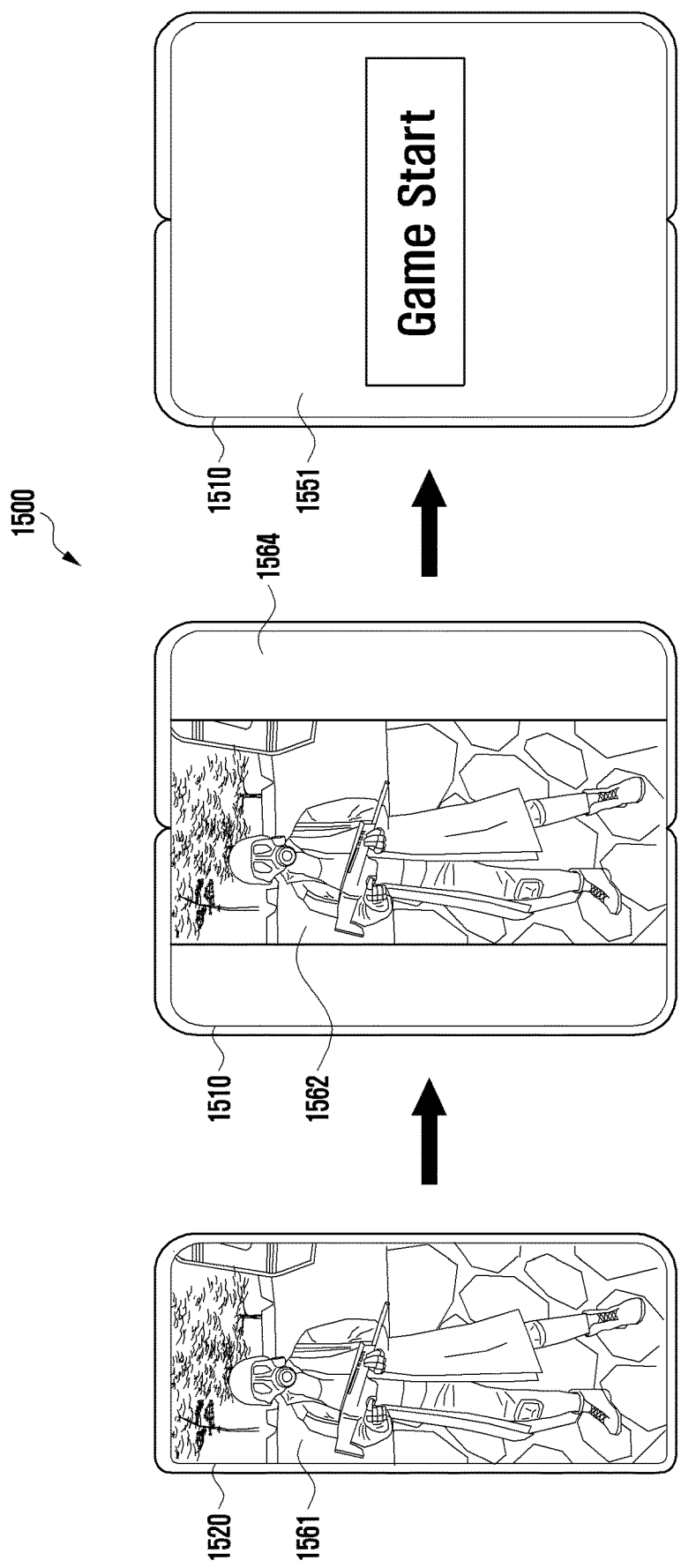
FIG. 15 is a screenshot showing a screen displayed on each display of an electronic device in an unfolding operation according to an embodiment of the disclosure.

FIG. 15 is a screenshot showing a screen displayed on each display of an electronic device in an unfolding operation according to an embodiment of the disclosure.

Referring to FIG. 15, an electronic device 1500 shown in a case where a game application that disallows resizing of an execution screen is being executed.

When the electronic device 1500 is folded, the processor (e.g., the processor 530 in FIG. 5) may display an execution screen 1561 of the game application on a second display 1520.

Thereafter, when an unfolding gesture is detected, the processor may identify, based on attribute information of the game application, that the game application does not support changing resolution and/or density during runtime and is configured to be forcibly terminated when changing the resolution is attempted.

In response to the unfolding gesture, the processor may display on a first display 1510 an execution screen 1562 of the game application corresponding to the resolution and density of the second display 1520. For example, the processor may display, on the first display 1510 in an unfolded state, the execution screen 1562 having the same resolution and density as the execution screen 1561 displayed on the second display 1520 in a folded state. At this time, an area 1564 of the first display 1510 other than the execution screen may be processed as black. Therefore, although the game application does not support resizing, the screen may be seamlessly switched from the second display 1520 to the first display 1510.

Thereafter, when the user selects a restart, the processor may terminate the execution of the application, re-execute the application, and display an execution screen 1551 of the re-executed application on the first display 1510. In this case, the game application may generate the execution screen 1551 based on the resolution and density of the first display 1510.

Figure 16:
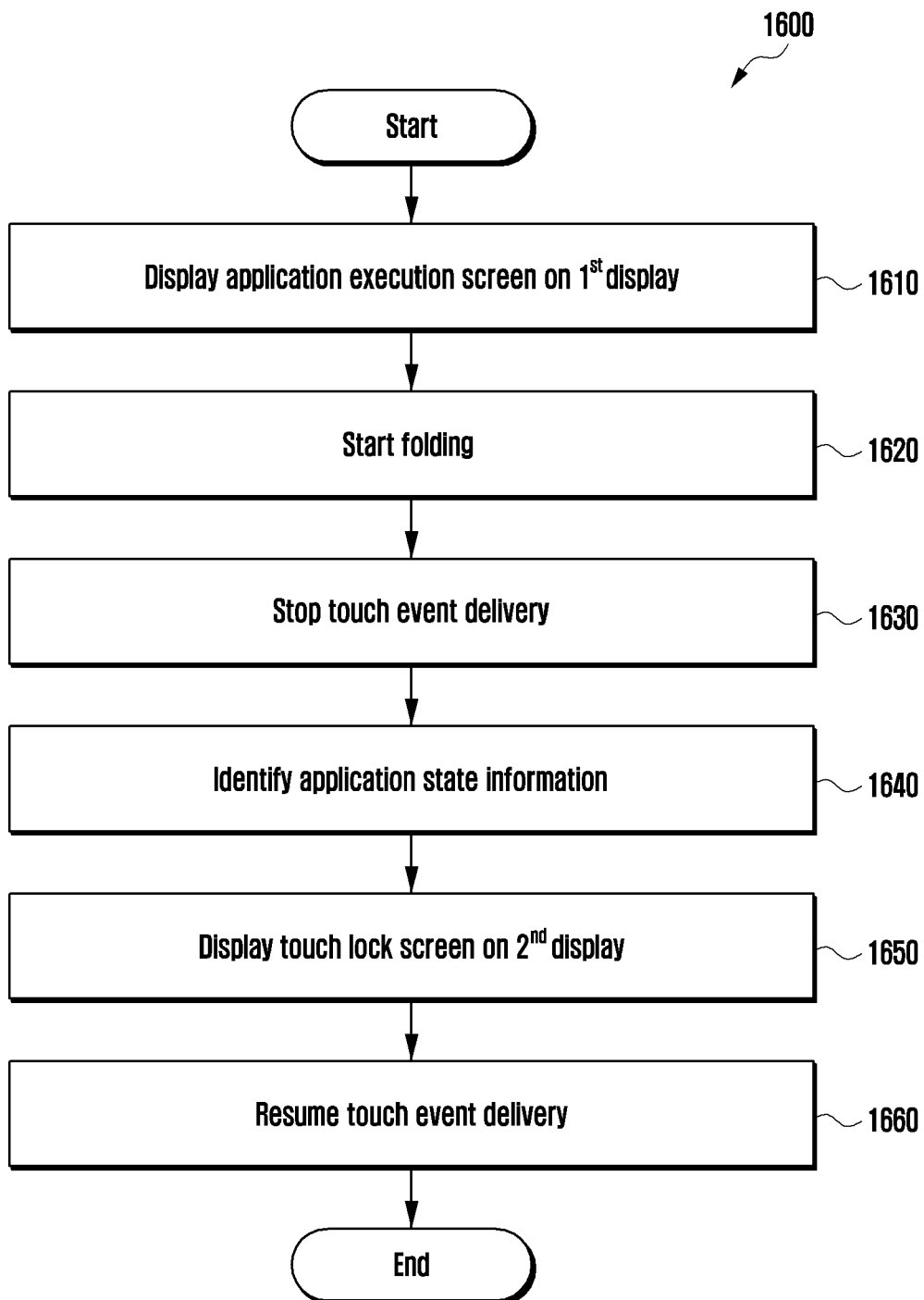
FIG. 16 is a flow diagram illustrating a control method of an electronic device according to an embodiment of the disclosure.

FIG. 16 is a flow diagram illustrating a control method of an electronic device according to an embodiment of the disclosure.

Referring to FIG. 16, an illustrated method 1600 may be performed by the electronic device (e.g., the electronic device 500 in FIG. 5) described above with reference to FIGS. 1A to 15, and descriptions of the above-described technical features will be omitted hereinafter.

At operation 1610, the electronic device may display an execution screen of an application on a first display (e.g., the first display 510 in FIG. 5). At this time, a second display (e.g., the second display 520 in FIG. 5) and a second touch sensor (e.g., the second touch sensor 525 in FIG. 5) may be in an inactivated state.

At operation 1620, the electronic device may detect a start of a folding gesture. For example, the electronic device may detect the start of the folding gesture through a change in an angle between first and second housing structures of the electronic device.

When the folding gesture is started, the electronic device may request, at operation 1630, the first touch sensor of the first display and/or the second touch sensor of the second display to stop delivering a touch event. In response to this delivery stop request, the touch event collected by an event hub (e.g., the event hub 732 in FIG. 7) may not be transmitted to the application (e.g., the application 711 in FIG. 7). The second touch sensor does not generate a touch event because the second touch sensor is still in the inactivated state even when the folding gesture is detected. However, regardless of touch sensor types, the electronic device may send the delivery stop request for the touch event.

At operation 1640, the electronic device may identify state information of the application being executed. According to various embodiments, the application state information may include information related to a security level and/or whether the application is resizable.

At operation 1650, the electronic device may display a touch lock screen (e.g., the touch lock screen 1070 in FIG. 10A or the touch lock screen 1080 in FIG. 10B) on the second display. The electronic device may generate the touch lock screen, based on the application state information. For example, the electronic device may display a translucent touch lock screen on an upper layer of the application execution screen. The electronic device may activate the second touch sensor of the second display in response to displaying the touch lock screen.

At operation 1660, the electronic device may process a touch event received from the second touch sensor of the second display after displaying the touch lock screen. When a predetermined touch input (e.g., swipe) occurs on the touch lock screen, the electronic device may remove the touch lock screen and display the application execution screen on the second display.

Figure 17:
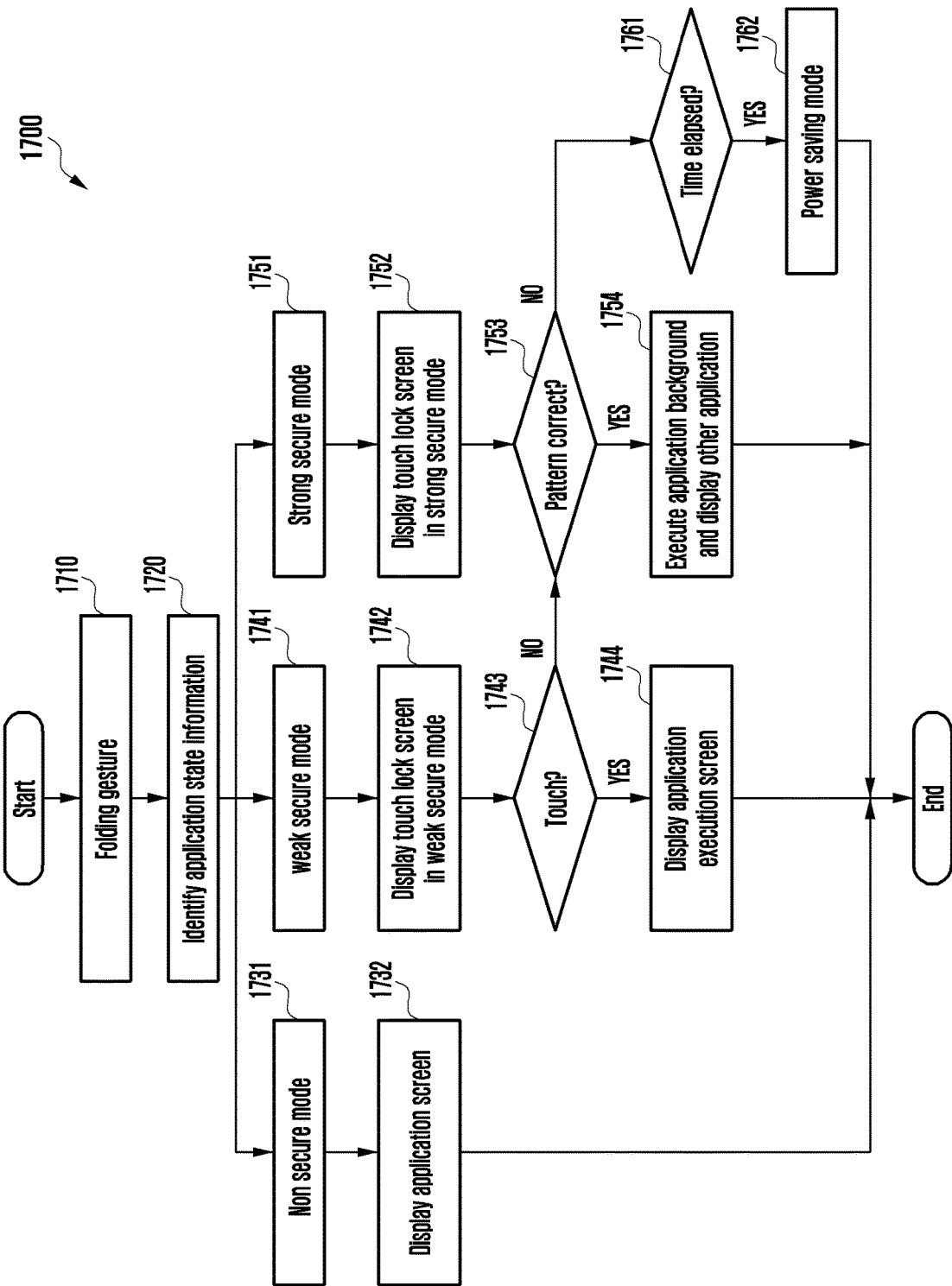
FIG. 17 is a flow diagram illustrating a control method of an electronic device according to an embodiment of the disclosure.

FIG. 17 is a flow diagram illustrating a control method of an electronic device according to an embodiment of the disclosure.

Referring to FIG. 17 a control method 1700 performed by the electronic device is illustrated. After detecting a folding gesture, the electronic device determines an operation mode depending on a security level of an application and performs the control method in accordance with the determined operation mode.

At operation 1710, the electronic device may detect the folding gesture.

At operation 1720, the electronic device may identify state information of an application. The application state information may include a security level assigned to the application, and the security level may be determined according to attribute information of the application or user's setting. According to another embodiment, the electronic device may determine an execution mode, based on attributes of the folding gesture. For example, the processor may determine the security level of the execution mode, based on a time difference between a start time and a completion time of the folding gesture, whether the second display after folding is in a user's visible direction, or an acceleration of a housing structure (e.g., the first and second housing structures 210 and 220 in FIG. 2A) moved by folding.

At operation 1731, the electronic device may determine to operate in a non-secure mode. The non-secure mode may be used for an application, such as a call application, which runs in an unfolded state, does not require security, and requires continuity of operation.

At operation 1732, the electronic device may resize an execution screen of the running application (e.g., the call application) and display the resized screen on a second display.

At operation 1741, the electronic device may determine to operate in a weak secure mode.

At operation 1742, the electronic device may generate and display a touch lock screen on the second display. The electronic device may display the translucent touch lock screen on an upper layer of the application execution screen. In this case, the application execution screen may be resized according to the resolution and density of the second display. The electronic device may process a touch event received from a second touch sensor of the second display in response to displaying the touch lock screen. The touch lock screen displayed in the weak secure mode has been described above with reference to FIG. 10A.

At operation 1743, the electronic device may detect a predetermined touch input (e.g., swipe) on the touch lock screen.

At operation 1744, the electronic device may remove displaying the touch lock screen and display the application execution screen on the second display.

At operation 1751, the electronic device may determine to operate in a strong secure mode.

At operation 1752, the electronic device may generate and display a touch lock screen for the strong secure mode on the second display. In this case, the touch lock screen may be opaque, and thus the application execution screen may be covered by the opaque touch lock screen. The touch lock screen may contain information for guiding user authentication (e.g., a pattern input, a password input, an iris recognition, a fingerprint recognition, and the like).

At operation 1753, the electronic device may receive a user input for a security pattern on the touch lock screen and determine whether the pattern is correct. When the pattern is correct, the electronic device may execute the application in the background at operation 1754 and display another application (e.g., a home screen) on the second display at least in part simultaneously.

The touch lock screen displayed in the strong secure mode has been described above with reference to FIG. 10B.

At operation 1743 or 1753, if a touch input is not received after displaying the touch lock screen, the electronic device may check at operation 1761 whether a predetermined time (e.g., 5 seconds) elapses. If the time elapses, the electronic device may switch the second display in a power saving mode at operation 1762.

Figure 18:
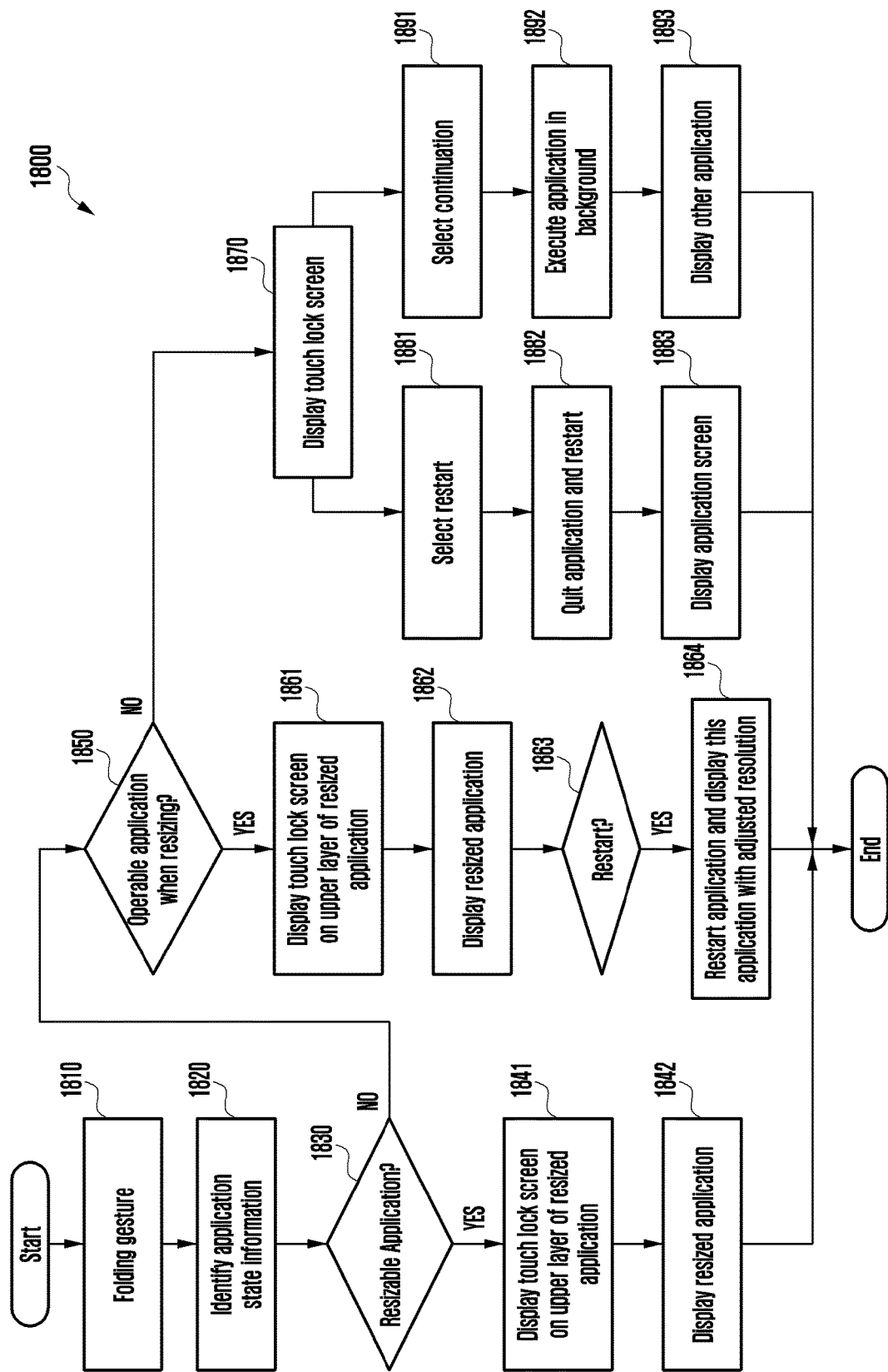
FIG. 18 is a flow diagram illustrating a control method of an electronic device according to an embodiment of the disclosure.

FIG. 18 is a flow diagram illustrating a control method of an electronic device according to an embodiment of the disclosure.

Referring to FIG. 18, illustrates a control method 1800 of the electronic device after detecting a folding gesture, depending on whether an application is resizable.

At operation 1810, the electronic device may detect the folding gesture.

At operation 1820, the electronic device may identify state information of the application. At operation 1830, based on the state information, the electronic device may determine whether an execution screen of the application is resizable.

At operation 1841, when the application is resizable (e.g., an Internet application), the electronic device may generate a touch lock screen and display the touch lock screen on an upper layer of the resized application on the second display.

At operation 1842, the electronic device may remove the touch lock screen in response to a predetermined touch input for the touch lock screen and display the resized application on the second display.

When it is determined at operation 1830 that the execution screen of the application is not resizable, the electronic device may determine at operation 1850 whether the application is continuously operable when resizing. For example, a video application may be resizable by a processor even though supporting no change of resolution (or aspect ratio). In another example, a game application may support no change of resolution and/or density during runtime and may be forcibly terminated when attempting to change the resolution.

At operation 1861, the electronic device may display the touch lock screen on an upper layer of the resized application (e.g., the video application). In this case, because the application does not support changing the resolution, the electronic device may forcibly change the resolution of the execution screen of the application in accordance with the resolution (or aspect ratio) of the second display.

At operation 1862, the electronic device may remove the touch lock screen in response to a predetermined touch input for the touch lock screen and display the resized application on the second display. In this case, contrary to the execution screen of the video application displayed on the first display, the execution screen of the video application displayed on the second display may have, for example, an aspect ratio of being extended widthwise. A button for converting the resolution of the execution screen of the application to the original resolution may be outputted on the second display.

When an input for selecting a restart button is received at operation 1863, the electronic device may restart (re-execute) the application at operation 1864 and display on the second display an execution screen of the application resized to correspond to a given resolution, that is, the resolution (aspect ratio) of the video application displayed on the first display.

When it is determined at operation 1850 that the application (e.g., the game application that does not support a change in resolution and/or density during runtime) is not operable when resizing, the electronic device may generate at operation 1870 a touch lock screen corresponding to the application and display it on the second display. At this time, the touch lock screen may contain a certain button for selecting an application restart or a compatibility mode.

When the button of the application restart is selected at operation 1881, the electronic device may terminate and restart (re-execute) the running application at operation 1882. In this case, the electronic device may generate an execution screen of the re-executed application in accordance with the resolution and density of the second display.

At operation 1883, the electronic device may display the execution screen of the application on the second display.

When the button of the compatibility mode (or continuation) is selected at operation 1891, the electronic device execute the application in the background at operation 1892. In this case, the electronic device may pause the application.

At operation 1893, the electronic device may display another application (e.g., a home screen) on the second display while the game application is displayed in the background.

Thereafter, when the electronic device is unfolded, the electronic device may automatically set the game application, being executed in the background, back to the top of the z-order and change the pause state to a resume state, thus allowing the game application to be continuously used on the first display.

Hereinafter, an electronic device having a form factor of a lengthwise (i.e., vertical) folding structure will be described with reference to FIGS. 19A to 20C. The features described above with reference to FIGS. 3 to 18 may also be applied to the electronic device to be described below. Although an in-folding foldable display structure will be described hereinafter, other various form factors such as an out-folding foldable display structure, a dual display structure, a G-type folding structure, an S-type folding structure, or a rollable display structure may be implemented in the lengthwise (vertical) folding structure.

Figure 19A:
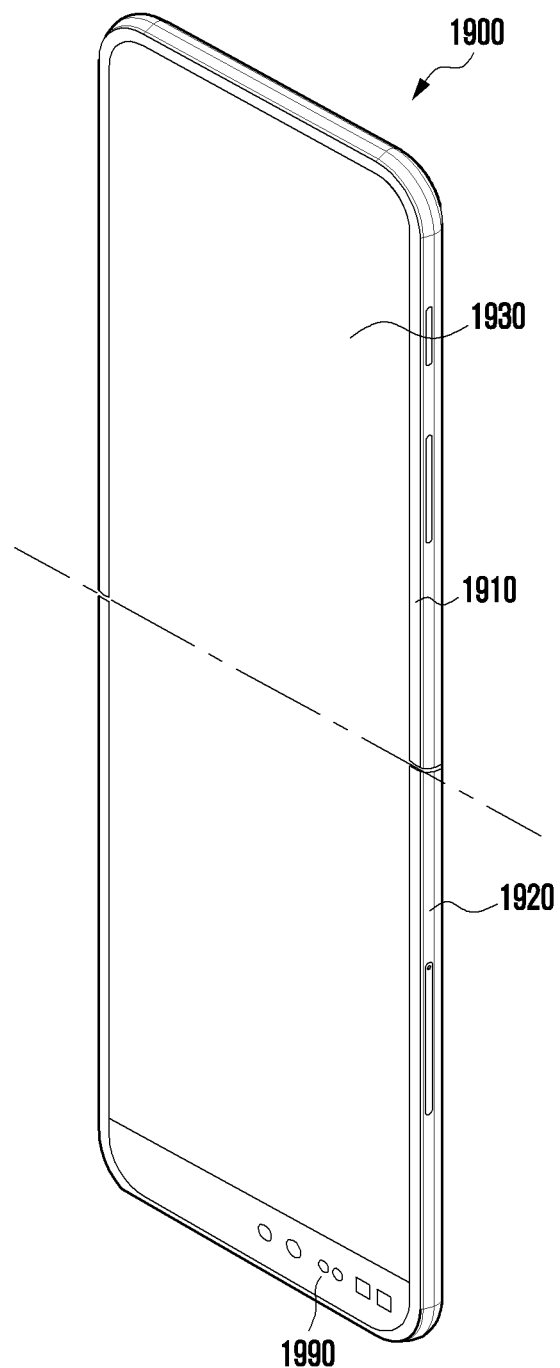
FIGS. 19A, 19B, and 19C are perspective views showing a used state of an electronic device of a vertical folding type in a folding or unfolding operation according to various embodiments of the disclosure.
Figure 19B:
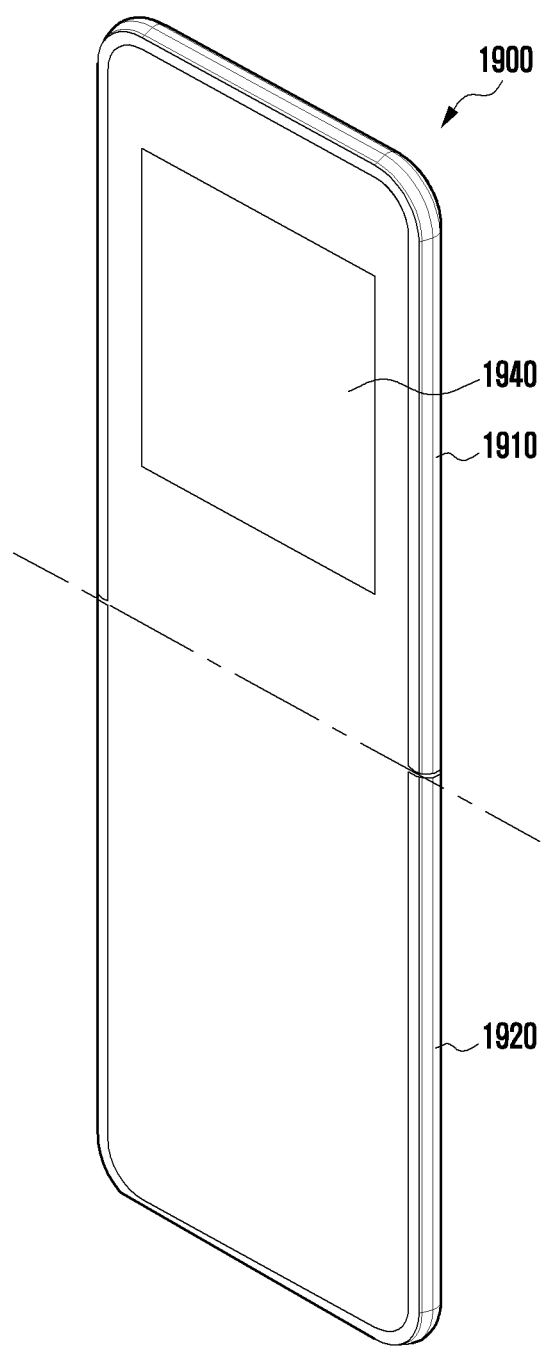
Figure 19C:
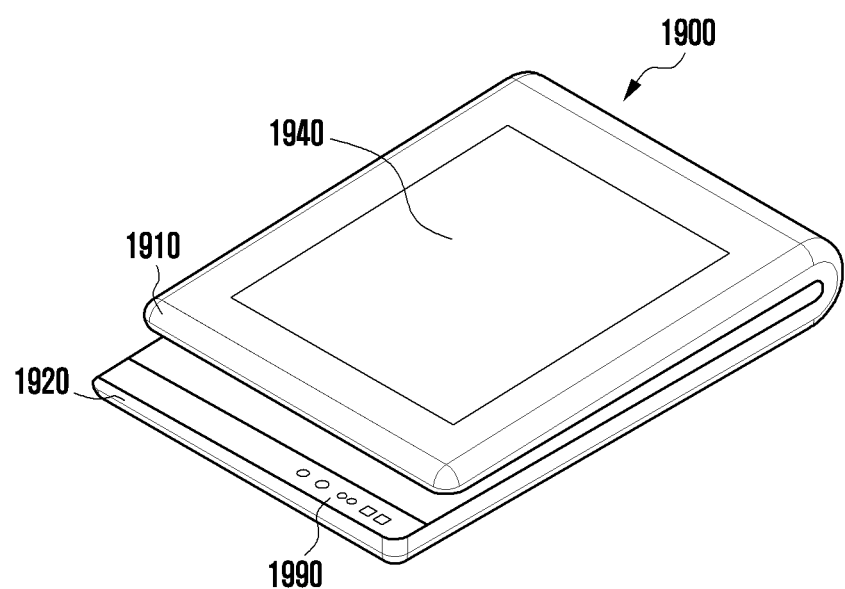

FIGS. 19A, 19B, and 19C are perspective views showing a used state of an electronic device of a vertical folding type in a folding or unfolding operation according to various embodiments of the disclosure.

Referring to FIG. 19A, illustrates a first surface of the electronic device 1900 in an unfolded state, and FIG. 19B illustrates a second surface of the electronic device 1900 in the unfolded state.

Referring to FIGS. 19A and 19B, the electronic device 1900 may include a foldable housing, a first display 1930, and a second display 1940.

The foldable housing includes a first housing structure 1910 and a second housing structure 1920 which are connected by a hinge structure. The first housing structure 1910 and the second housing structure 1920 may be foldable with each other about a folding axis. In a folded state, the first housing structure 1910 and the second housing structure 1920 may be disposed to face each other.

The first display 1930 may be folded and disposed on a first surface (or front surface) of the first and second housing structures 1910 and 1920. In this embodiment, the first housing structure 1910 and the second housing structure 1920 may be disposed up and down with each other, and the folding axis may be extended widthwise (in a horizontal direction). When the electronic device 1900 is in the unfolded state, an application may be displayed lengthwise (in a vertical direction).

One or more sensors 1990 such as a camera and an illumination sensor may be disposed at a lower portion of the second housing structure 1920 of the electronic device 1900. The sensors 1990 may be seen from the outside even in the folded state. The length in the vertical direction of the first housing structure 1910 may be smaller than the length in the vertical direction of the second housing structure 1920. Therefore, when the electronic device 1900 is folded, the sensors 1990 disposed at the lower portion of the second housing structure 1920 may be seen from the outside. Alternatively, when the electronic device 1900 may not include the sensors 1990, the first housing structure 1910 and the second housing structure 1920 may have the substantially same length.

The second display 1940 may be disposed on a second surface (or rear surface) of the first housing structure 1910.

The user may fold the electronic device 1900 about the folding axis extended widthwise by applying a force to the electronic device 1900 in the unfolded state.

Referring to FIG. 19C, when the electronic device 1900 is fully folded, the first display 1930 may not be seen from the outside. An application screen may be displayed through the second display 1940.

Figure 20A:
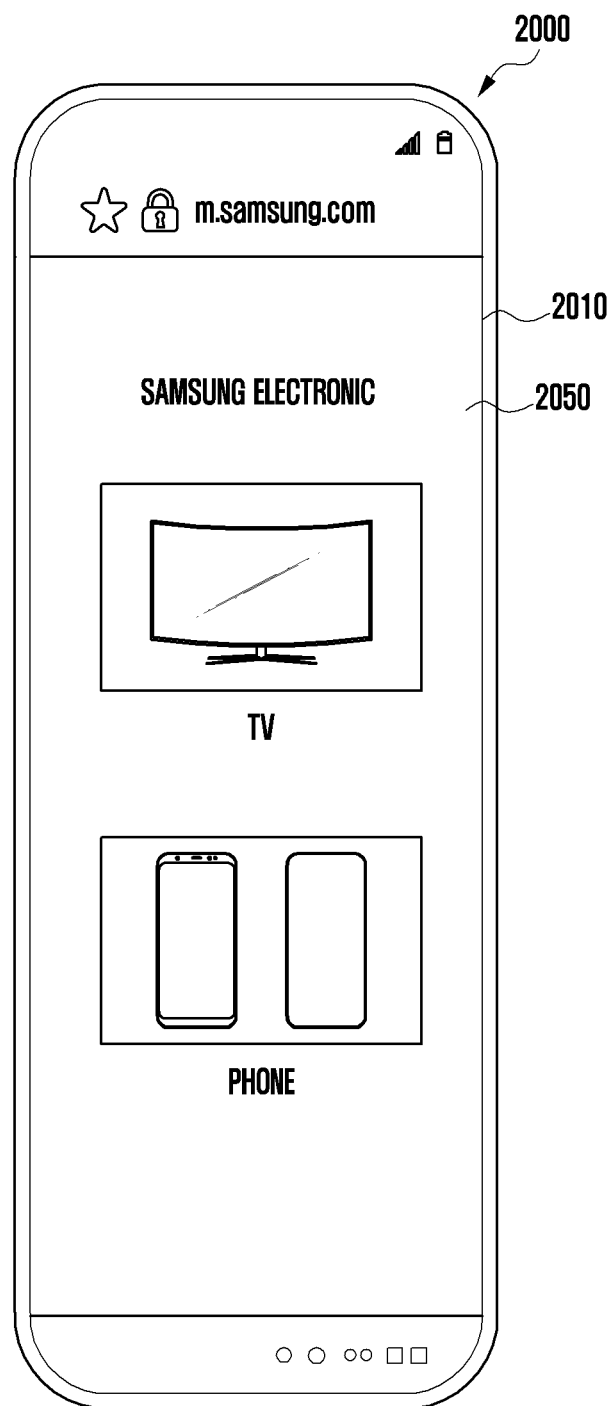
FIGS. 20A, 20B, and 20C are screenshots showing a screen displayed on each display of an electronic device in a folding operation according to various embodiments of the disclosure.
Figure 20B:
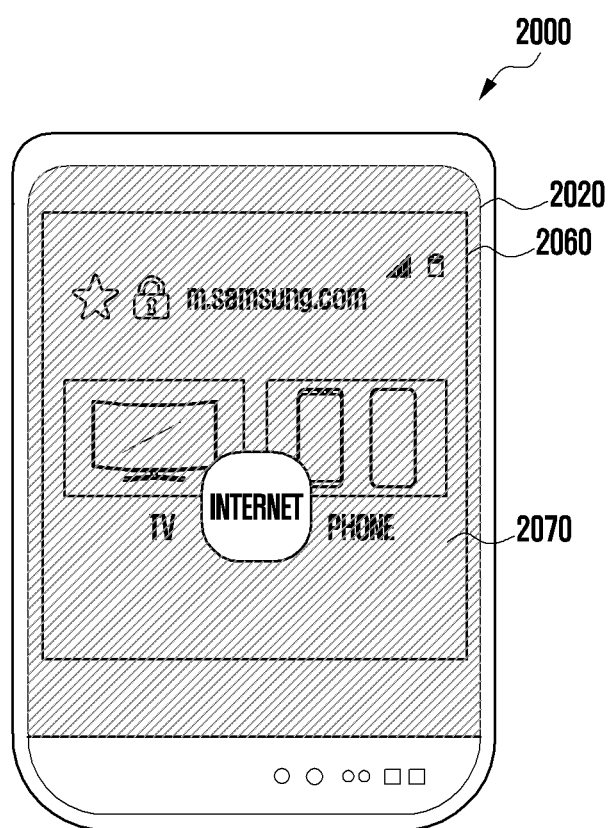
Figure 20C:
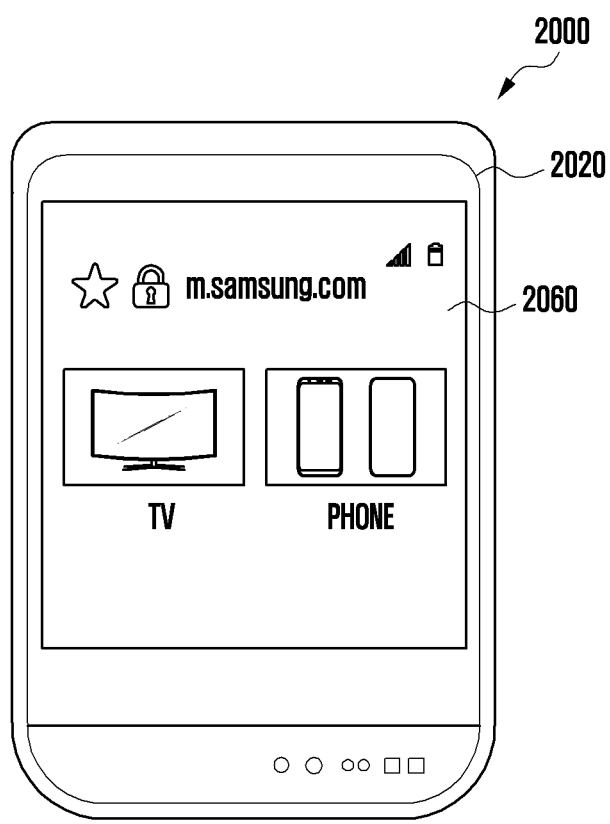

FIGS. 20A, 20B, and 20C are screenshots showing a screen displayed on each display of an electronic device in a folding operation according to various embodiments of the disclosure.

Referring to FIG. 20A, in an electronic device 2000 when a first display 2010 is unfolded, a processor (e.g., the processor 120 in FIG. 1B) may generate an execution screen 2050 of an application to correspond to attributes (e.g., size, ratio, resolution, density, and the like) of the first display 2010 and display the generated execution screen 2050 on the first display 2010. In the electronic device 2000 of the vertical folding type, the first display 2010 is long in the vertical direction in the unfolded state, so that the application screen 2050 may have a lengthwise form.

According to various embodiments, when detecting a folding gesture, the processor may generate a touch lock screen 2070. The processor may generate the touch lock screen 2070 according to a security level of an application. Referring to FIG. 20B, because an Internet application having a weak secure level is being executed, the processor may generate the translucent touch lock screen 2070. At least in part simultaneously, the processor may transmit a screen switch event to the Internet application, and the Internet application may redraw the application execution screen according to the attributes of the second display 2020. Because the length is reduced in the vertical direction during vertical folding, the application execution screen may be redrawn accordingly.

Referring to FIG. 20B, the processor may generate the touch lock screen 2070 containing at least in part a translucent region and display the touch lock screen 2070 on an upper layer of a resized execution screen 2060 of the Internet application.

Referring to FIG. 20C, when a predetermined touch input (e.g., swipe) occurs on the touch lock screen 2070, the processor removes the touch lock screen 2070 displayed on the upper layer and displays the application execution screen 2060.

FIGS. 20A to 20C relate to an embodiment in which the Internet application is executed, but other embodiments of FIGS. 12A to 15 may also be applied to the vertical folding structure of FIGS. 19A to 19C.

Now, various embodiments in which the electronic device is implemented as an out-folding foldable display structure will be described with reference to FIGS. 21A to 27.

Figure 21A:
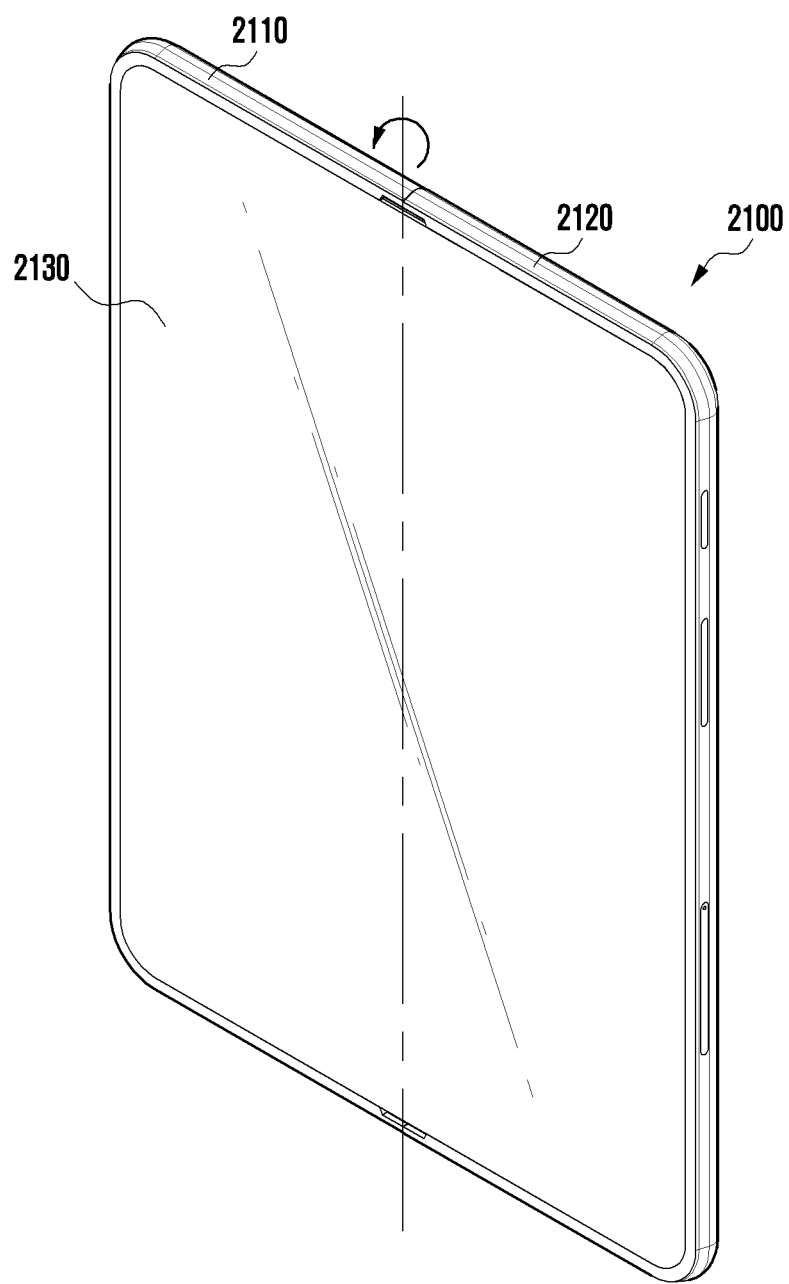
FIGS. 21A, 21B, and 21C are perspective views showing a used state of an electronic device of an out-folding type in a folding or unfolding operation according to various embodiments of the disclosure.
Figure 21B:
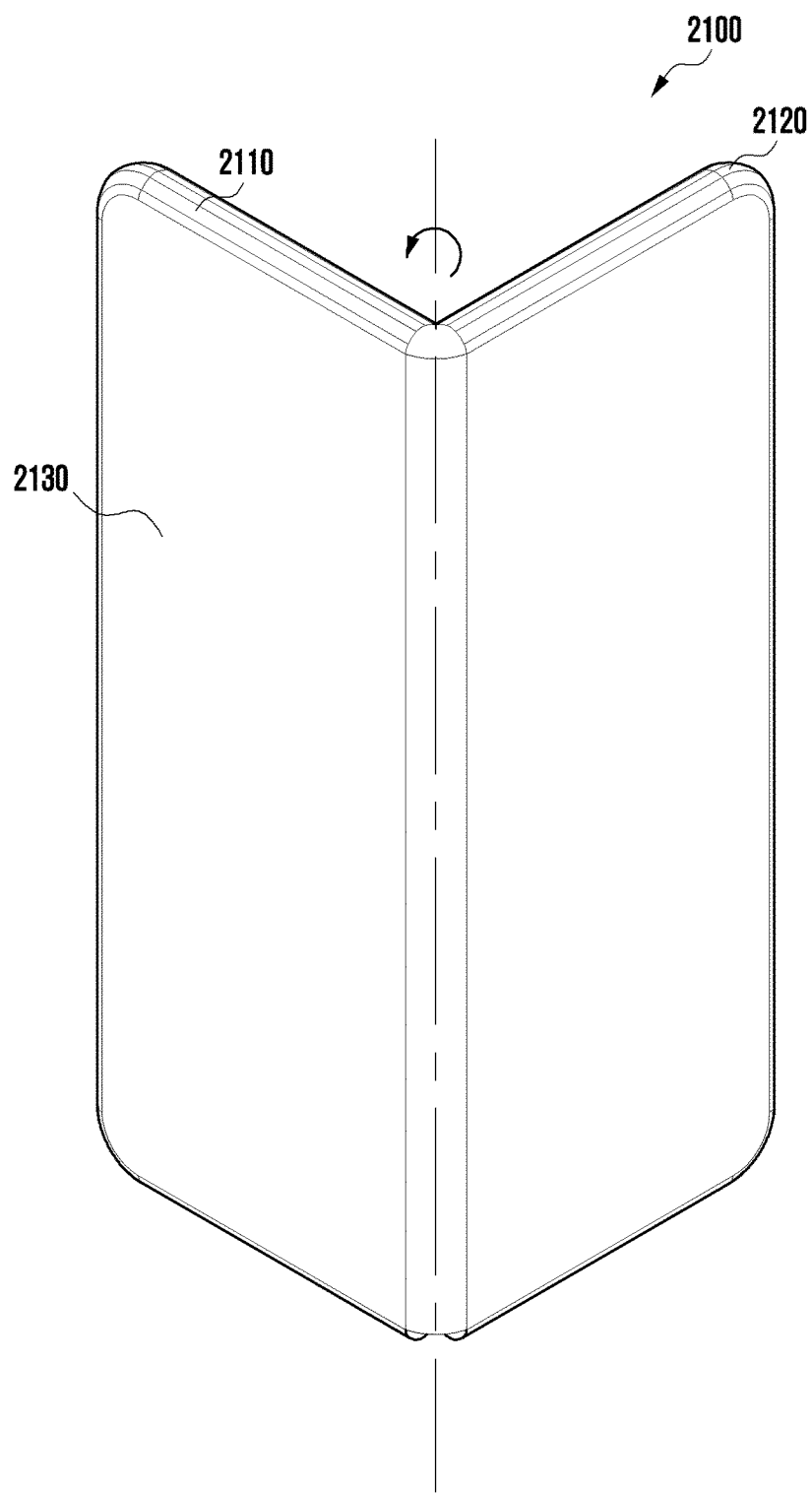
Figure 21C:
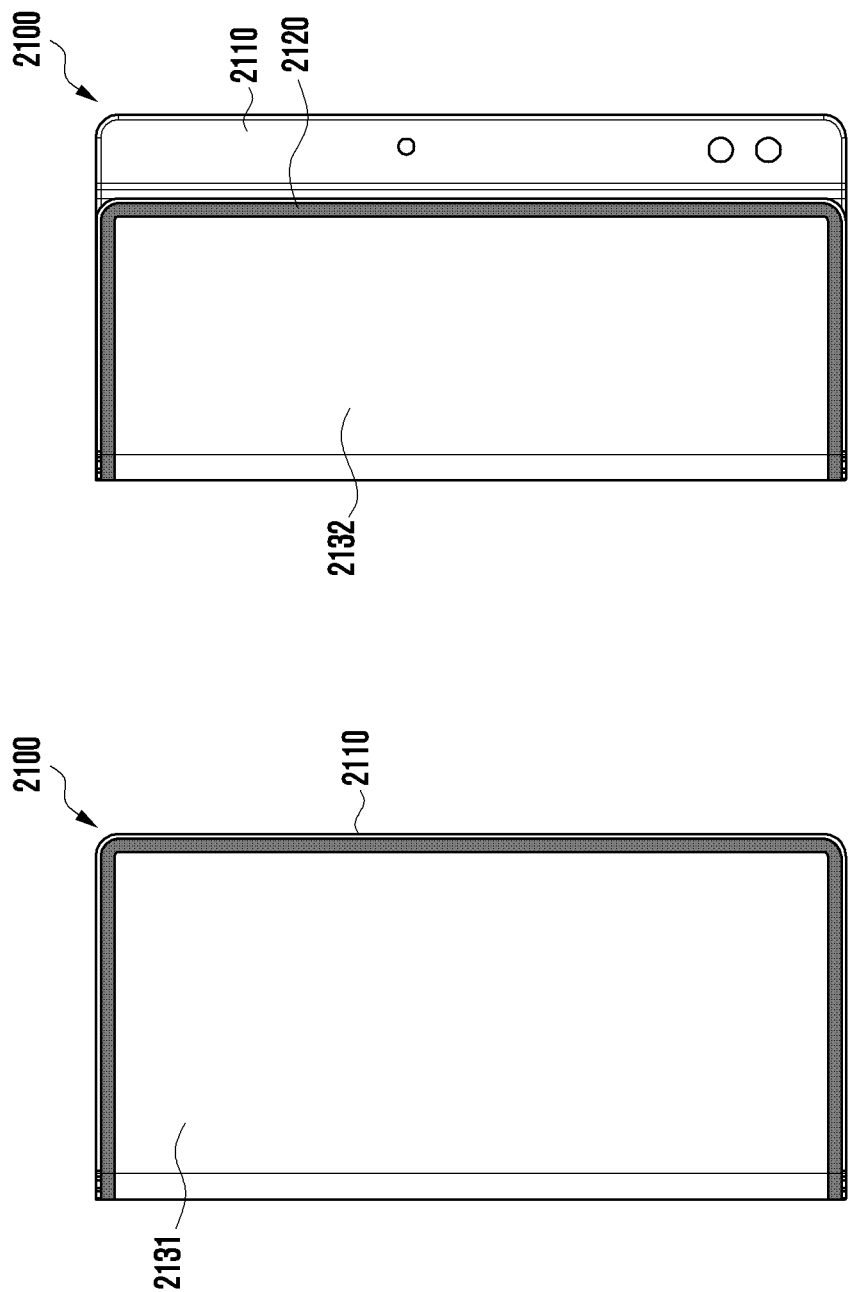

FIGS. 21A, 21B, and 21C are perspective views showing a used state of an electronic device of an out-folding type in a folding or unfolding operation according to various embodiments of the disclosure.

Referring to FIG. 21A, the electronic device 2100 may include a first housing structure 2110 and a second housing structure 2120 that are rotatably combined to be folded with respect to each other through a hinge structure. According to an embodiment, the first housing structure 2110 and the second housing structure 2120 may have the same size, so that rear covers of the first and second housing structures 2110 and 2120 may not be visible from the outside when folding. According to another embodiment, the first housing structure 2110 may be larger in the horizontal direction than the second housing structure 2120. In this case, a portion of the first housing structure 2110 may be visible from the outside when folding, and the electronic device 2100 may include various sensors such as a camera disposed in the visible portion.

According to various embodiments, a display 2130 may be disposed on front surfaces of the first and second housing structures 2110 and 2120. The display 2130 may be divided into a first area 2131 and a second area 2132 (see FIG. 21C), based on the folding axis. The first area 2131 may have the same size as or a larger size than the second area 2132. The display 2130 may include a touch sensor that detects a touch input on the display 2130.

Sensors such as a camera and an illumination sensor may be disposed on the rear surface of the first housing structure 2110 and/or the second housing structure 2120. In addition, an additional display (not shown) may be disposed on the rear surface of the first housing structure 2110 and/or the second housing structure 2120. Contrary to the display 2130 disposed on the front surface, the additional display may not be folded.

Referring to FIG. 21B, the first housing structure 2110 and the second housing structure 2120 may be folded about the folding axis. At this time, the first and second housing structures 2110 and 2120 may be folded counterclockwise, that is, in a direction where the rear surfaces of the first and second housing structures 2110 and 2120 face each other in the folded state and the first and second areas 2131 and 2132 of the display 2130 are viewed from the outside. The electronic device 2100 may determine that the unfolded state is switched to the folded state when an angle between the first and second housing structures 2110 and 2120 reaches a certain value (e.g., about 10 degrees) by a force applied to the first and/or second housing structure(s) by the user.

Referring to FIG. 21C, in the folded state, the first area 2131 of the display 2130 may be disposed on the front surface of the electronic device 2100, and the second area 2132 of the display 2130 may be disposed on the rear surface of the electronic device 2100. According to an embodiment, because the first housing structure 2110 and the first area 2131 of the display 2130 are larger than the second housing structure 2120 and the second area 2132 of the display 2130, respectively, the second area 2132 of the display 2130 may partially cover the rear surface of the electronic device 2100 with the rear cover of the first housing structure 2110 being exposed partially. In the exposed portion, various sensors such as a camera and an illuminance sensor may be disposed to be seen from the outside.

Although FIG. 21C illustrates that the first housing structure 2110 and the first area 2131 of the display 2130 are larger than the second housing structure 2120 and the second area 2132 of the display 2130, respectively, the first housing structure 2110 and the first area 2131 of the display 2130 may have the same sizes than the second housing structure 2120 and the second area 2132 of the display 2130, respectively. In the latter case, no sensor is disposed on the rear cover of the second housing structure 2120, and the rear cover of the second housing structure 2120 may not be viewed to the outside when folded.

Referring to FIGS. 21A, 21B, and 21C, the electronic device 2100 is out-folded about the folding axis extended vertically. Alternatively, as shown in FIGS. 19A to 19C, the electronic device 1900 may be out-folded about the folding axis extended horizontally.

Figure 22:
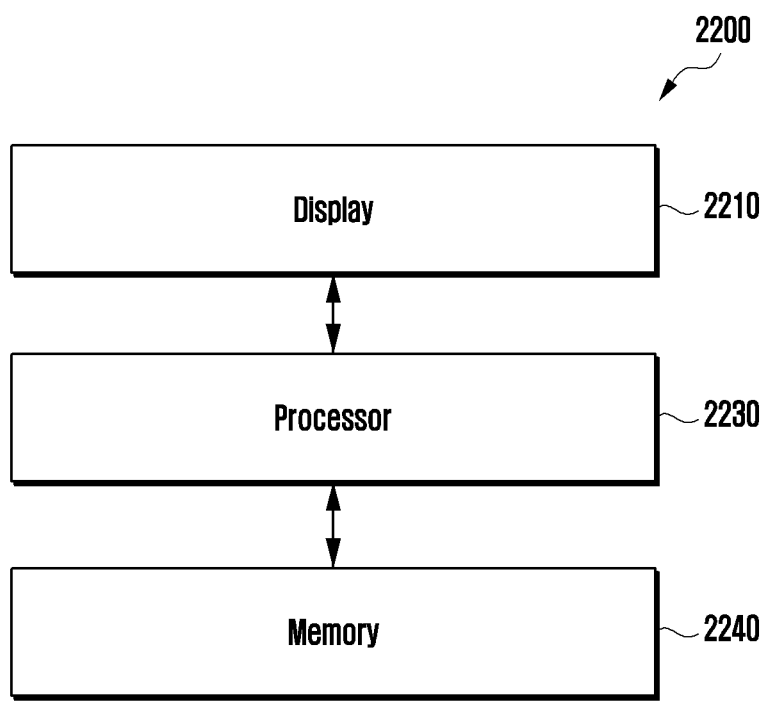
FIG. 22 is a block diagram illustrating an electronic device according to an embodiment of the disclosure.

FIG. 22 is a block diagram illustrating an electronic device according to an embodiment of the disclosure.

Referring to FIG. 22, an electronic device 2200 may include a display 2210, a processor 2230, and a memory 2240. Some of such components of the electronic device

2200 may be omitted or replaced. The electronic device 2200 may include at least some of the configurations and/or functions of the electronic device 101 in FIG. 1A and/or FIG. 1B. The electronic device 2200 may include the out-folding structure shown in FIGS. 21A to 21C.

According to various embodiments, the display 2210 may be disposed on a front surface of a housing (e.g., the first housing structure 2110 and the second housing structure 2120 in FIG. 21A). When the electronic device 2200 is folded, a first area (e.g., the first area 2131 in FIG. 21C) and a second area (e.g., the second area 2132 in FIG. 21C), which are divided based on the folding axis, may be disposed on the front and rear surfaces of the electronic device 2200, respectively. According to an embodiment, the electronic device 2200 may include an additional display (not shown) on a rear surface of the housing, and the additional display may not be folded.

According to various embodiments, the display 2220 may include a touch sensor (not shown) that detects a touch input occurring on the display 2220. The touch sensor may provide the processor 2230 with a touch event corresponding to the touch input. The touch event may include a press event, a release event, and/or a cancel event.

According to various embodiments, the processor 2230 is configured to perform operations or data processing related to control and/or communication of components of the electronic device 2200, and may include at least some of configurations and/or functions of the processor 120 shown in FIG. 1A and/or FIG. 1B. The processor 2230 may be functionally, operatively, and/or electrically connected to internal components of the electronic device 2200 including the display 2210 and the memory 2240.

According to various embodiments, when the electronic device 2200 is unfolded, the processor 2230 may display an execution screen of an application on the entire area of the display 2210. In the unfolded state of the electronic device 2200, the touch sensor may provide the processor 2230 with a touch event corresponding to a touch input occurring on the entire area of the display 2210.

According to various embodiments, the processor 2230 may detect a folding gesture for the electronic device 2200. As described above with reference to FIGS. 21A to 21C, the user may apply a force to the electronic device 2200 such that the rear surfaces of the first and second housing structures face each other and also the first and second areas of the display 2210 are viewed from the outside. The form of the electronic device 2200 when folding is described above with reference to FIG. 21C.

According to various embodiments, when the folding gesture is started, the processor 2230 may request the touch sensor to stop transmitting the touch event. This is because the touch on the display 2210 during folding is a user's unintended touch. According to another embodiment, when the folding gesture is started, the processor 2230 may ignore the received touch event without requesting the touch sensor to stop transmitting the touch event. That is, even if any touch event is received, it may not be provided to the application.

According to various embodiments, the processor 2230 may cancel a touch event (e.g., a press event or a release event) having been provided to the application before the folding gesture is started. For example, the processor 2230 may cancel the execution of the application to be carried in response to the touch event, or cancel the execution of the application having been already carried in response to the touch event.

According to various embodiments, when the folding gesture is started, the processor 2230 may provide the application with a cancel event corresponding to a touch event previously provided. For example, even if a press event actually occurs during the folding gesture, it is not a user's intention. Thus, the processor 2230 may provide the cancel event to the application even if the press event is received from the touch sensor. This prevents the application from being operated wrongly by recognizing a touch for folding as a touch event. Therefore, the application may not perform an operation according to a touch event generated by the touch sensor before the electronic device 2200 is folded.

According to various embodiments, the processor 2230 may change an area of the display 2210 to display an application in response to the folding of the electronic device 2200. The processor 2230 may determine one of the first and second areas of the display 2210 to display the application in the folded state. For example, in order to identify an area the user gazes at after folding, the processor 2230 may identify a user's touch input pattern (e.g., a touch with a thumb), identify an area seen upward by using a sensor (e.g., a gravity sensor), identify a folding direction (e.g., identify a housing structure having a higher moving speed at an edge), check a predetermined setting, or receive a selection of a specific icon after folding. The processor 2230 may display an application screen on any one of the first and second areas by using at least one of the above-described manners.

According to various embodiments, the processor 2230 may generate the application screen, based on attributes (e.g., size, ratio, resolution, density, and the like) of one of the first and second areas on which the screen is to be displayed.

According to various embodiments, the processor 2230 may identify whether an execution screen of the application is resizable.

When the application displayed on the display 2210 in the unfolded state is a resizable application (e.g., an Internet browser), and when the folding gesture is detected, the processor 2230 may display the application screen resized based on the attributes of the first or second area.

When the application displayed on the display 2210 in the unfolded state is a non-resizable application (e.g., a game application), and when the folding gesture is detected, the processor 2230 may display a menu for selecting a restart (i.e., re-execution) or continuation (i.e., continued execution) of the application.

According to various embodiments, the processor 2230 may generate a touch lock screen in response to the folding gesture and display the touch lock screen on an area to be determined to display the application screen after folding. The touch lock screen may be determined according to state information (e.g., security level and/or whether being resizable) of the running application.

According to various embodiments, the processor 2230 may display the touch lock screen on an upper layer of the first or second area. The processor 2230 may display the touch lock screen in the foreground to cover the screen of the top-level application on the z-order, thereby preventing an unintended touch event from being transmitted to the application.

According to various embodiments, the processor 2230 may process a touch event received from the touch sensor of the display 2210 after displaying the touch lock screen. After displaying the touch lock screen, the processor 2230 may release the touch lock screen in response to a touch event received from the display 2210 and provide the touch event to the running application.

According to various embodiments, the processor 2230 may operate in a non-secure mode, a weak secure mode, or a strong secure mode, depending on the security level assigned to the application. When folding, the processor 2230 may generate and display the touch lock screen corresponding to the security level of the application being executed. Alternatively, the processor 2230 may determine the security level or an execution mode, based on the attributes of the folding gesture.

The touch lock screen of this embodiment may include the touch lock screen described above with reference to FIGS. 10A to 10F.

Figure 23:
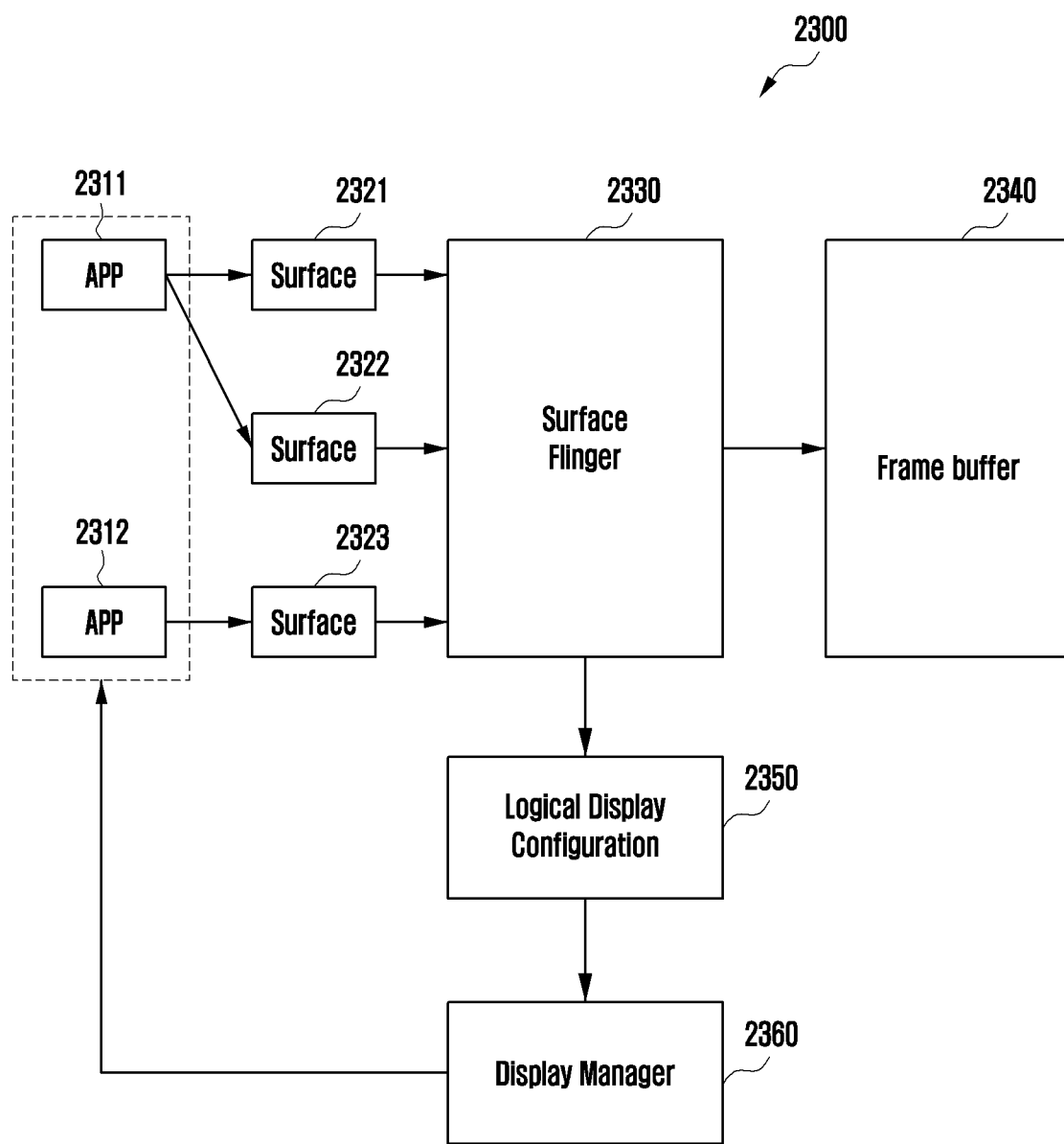
FIG. 23 is a block diagram illustrating a drawing engine of an electronic device according to an embodiment of the disclosure.

FIG. 23 is a block diagram illustrating a drawing engine of an electronic device according to an embodiment of the disclosure.

Referring to FIG. 23, the electronic device 2300 may designate a portion of a memory (e.g., the memory 2240 in FIG. 22) as surfaces 2321, 2322, and 2323 for recording execution states of applications 2311 and 2312.

A surface flinger 2330 may determine whether to display an execution screen of an application recorded on the surfaces 2321, 2322, and 2323, and also request the applications 2311 and 2312 to process changes in resolution and density in accordance with a changed display configuration.

A frame buffer 2340 may store an execution screen corresponding to the attributes (e.g., size, ratio, resolution, density, and the like) of the display and generated by each of the applications 2311 and 2312.

In a state where the electronic device 2300 is unfolded, the surface flinger 2330 may store, in the frame buffer 2340, the execution screen corresponding to the attributes of the display, generated by each of the applications 2311 and 2312, and recorded on the surfaces 2321, 2322, and 2323.

When the electronic device 2300 is folded, a logical display configuration 2350 may update the display configuration, based on the attributes (size, ratio, resolution, density, and the like) of the first or second area to display the screen after folding.

A display manager 2360 may transmit the attributes of the first or second area to the application when the display configuration is changed, and request the application to generate an execution screen according to the changed attributes.

The surface flinger 2330 may calculate and output an area of the frame buffer 2340 on which the surface is to be drawn, with reference to information of the first or second area on which the screen is to be displayed.

Each of the applications 2311 and 2312 may generate the execution screen of the application, based on the attributes of the first or second area received from the display manager 2360, and record the execution screen on the surfaces 2321, 2322, and 2323.

Therefore, in case of folding or unfolding, the screen can be provided seamlessly when the screen displayed on the entire display is switch to the first or second area.

Figure 24A:
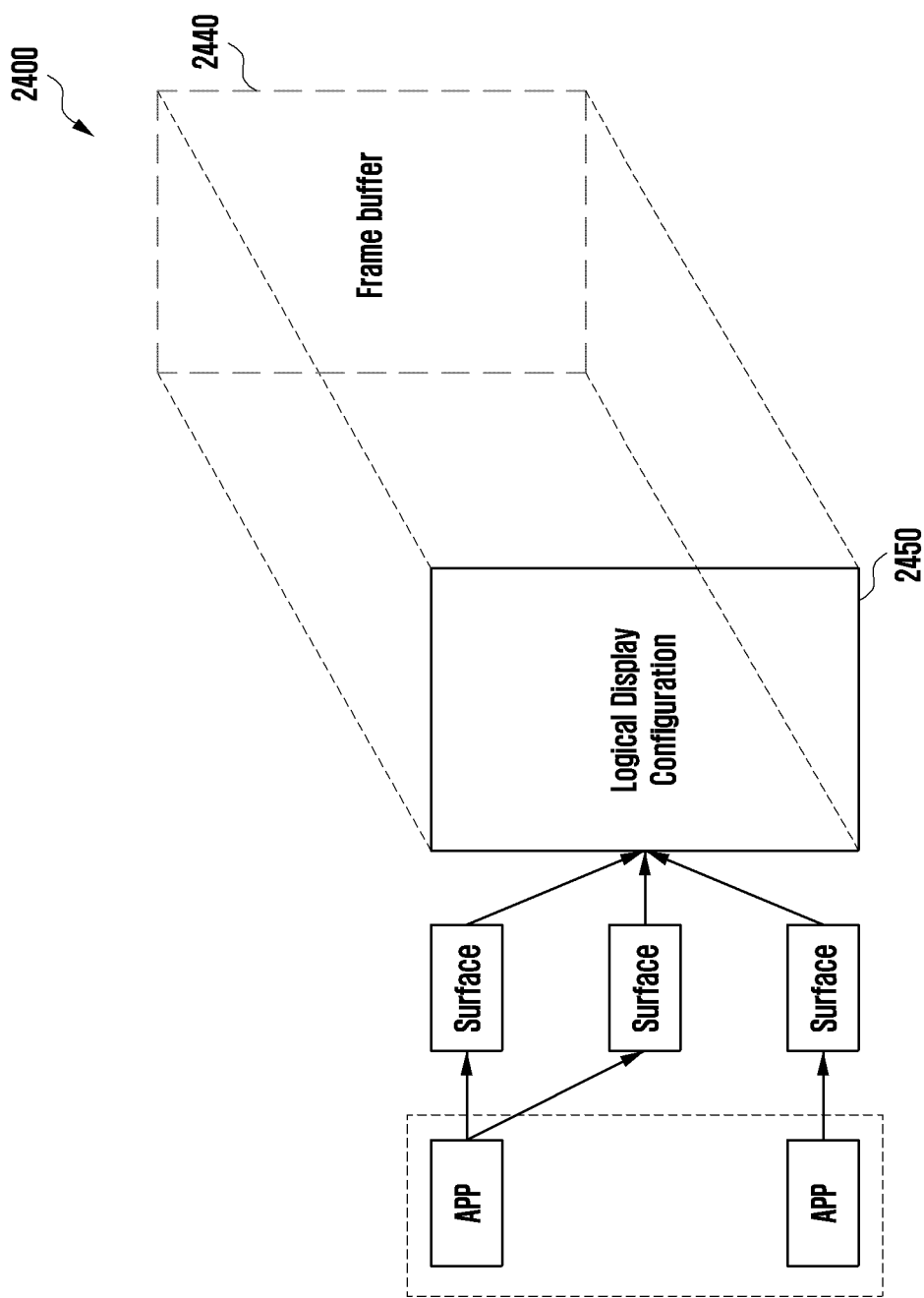
FIGS. 24A and 24B are block diagrams illustrating a drawing engine of an electronic device according to various embodiments of the disclosure.
Figure 24B:
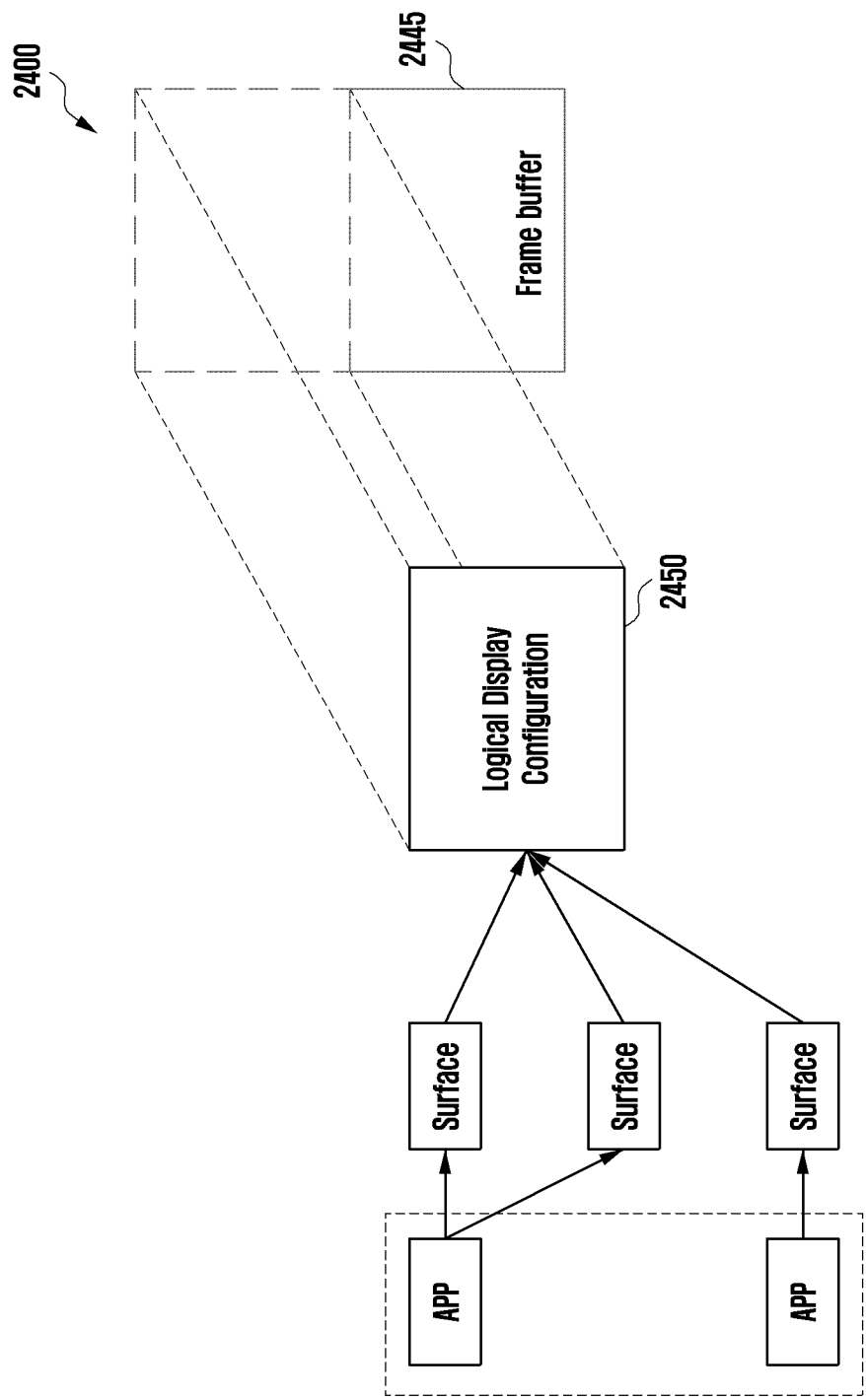

FIGS. 24A and 24B are block diagrams illustrating a drawing engine of an electronic device according to various embodiments of the disclosure.

According to various embodiments, a processor (e.g., the processor 2230 in FIG. 22) may allocate a certain region of a memory (e.g., the memory 2240 in FIG. 22) to a frame buffer 2400 to display an execution screen of an application. The processor may determine the size of the region to be allocated, based on attributes of a display and region information of the running application.

For example, when the electronic device is in an unfolded state, the execution screen of the application may be displayed on the entire display.

Referring to FIG. 24A, a logical display configuration 2450 may designate a surface for recording an execution state of an application by using the entire area 2440 of the frame buffer 2400. When the electronic device is in a folded state, the execution screen may be displayed in one of first and second areas of the display while no screen may be displayed in the other area.

Referring to FIG. 24B, the logical display configuration 2450 may designate a surface for recording an execution state of an application by using a partial area 2445 corresponding to the size of the first or second area (or ratio thereof to the display) in the entire area of the frame buffer 2400.

The processor may record display information in a memory region associated with the display, based on application drawing information and an application disposition position (e.g., the entire display, the first area, or the second area).

FIGS. 25A, 25B, 25C, and 25D are screenshots showing a screen displayed on a display of an electronic device in an out-folding operation according to various embodiments of the disclosure.

FIGS. 25A to 25D illustrate examples of displaying a resizable Internet application on the display.

Figure 25A:
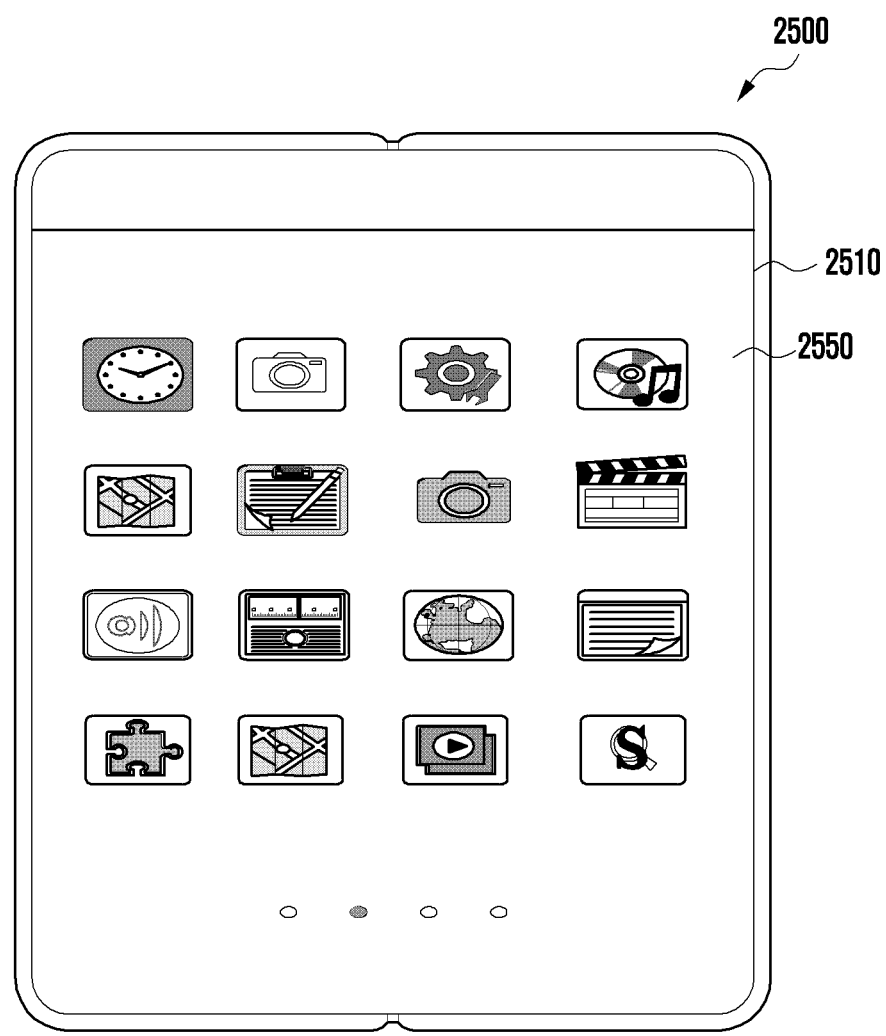
FIGS. 25A, 25B, 25C, and 25D are screenshots showing a screen displayed on a display of an electronic device in an out-folding operation according to various embodiments of the disclosure.

Referring to FIG. 25A, in an electronic device 2500 when the display 2510 is unfolded, a processor (e.g., the processor 2230 in FIG. 22) may generate an execution screen 2550 of the Internet application corresponding to attributes (e.g., size, ratio, resolution, density, and the like) of the display 2510 and display the execution screen 2550 on the entire area of the display 2510.

The processor may detect folding of the display 2510 in an unfolded state. In response to the detection of the folding, the processor may determine an area in which the execution screen of the application is to be displayed, from among a first area 2511 and a second area 2512 of the display 2510 divided based on the folding axis. For example, in order to identify an area the user gazes at after the folding, the processor may identify a user's touch input pattern (e.g., a touch with a thumb), identify an area seen upward by using a sensor (e.g., a gravity sensor), identify a folding direction (e.g., identify a housing structure having a higher moving speed at an edge), check a predetermined setting, or receive a selection of a specific icon after folding. The processor may display an application screen on any one of the first and second areas 2511 and 2512 by using at least one of the above-described manners. In the folded state, the area where the application screen is displayed may be changed again according to a user's manipulation (e.g., a rotation of the electronic device 2500 or a touch on an icon for changing the display area).

When detecting a folding gesture, the processor may transmit a screen switch event to the Internet application, and the Internet application may redraw the application execution screen according to the attributes of the first area 2511 determined to display the application screen.

At least in part simultaneously, the processor may generate a touch lock screen 2570.

According to various embodiments, when the folding is started, the processor may provide a visual effect 2555 to indicating a progress of folding until the folding is completed. The visual effect 2555 may be identical to the touch lock screen 2570. Alternatively, any other visual effect 2555 such as a certain graphic object or a shadow effect that is distinguished from the screen provided in the unfolded state may be used.

Figure 25B:
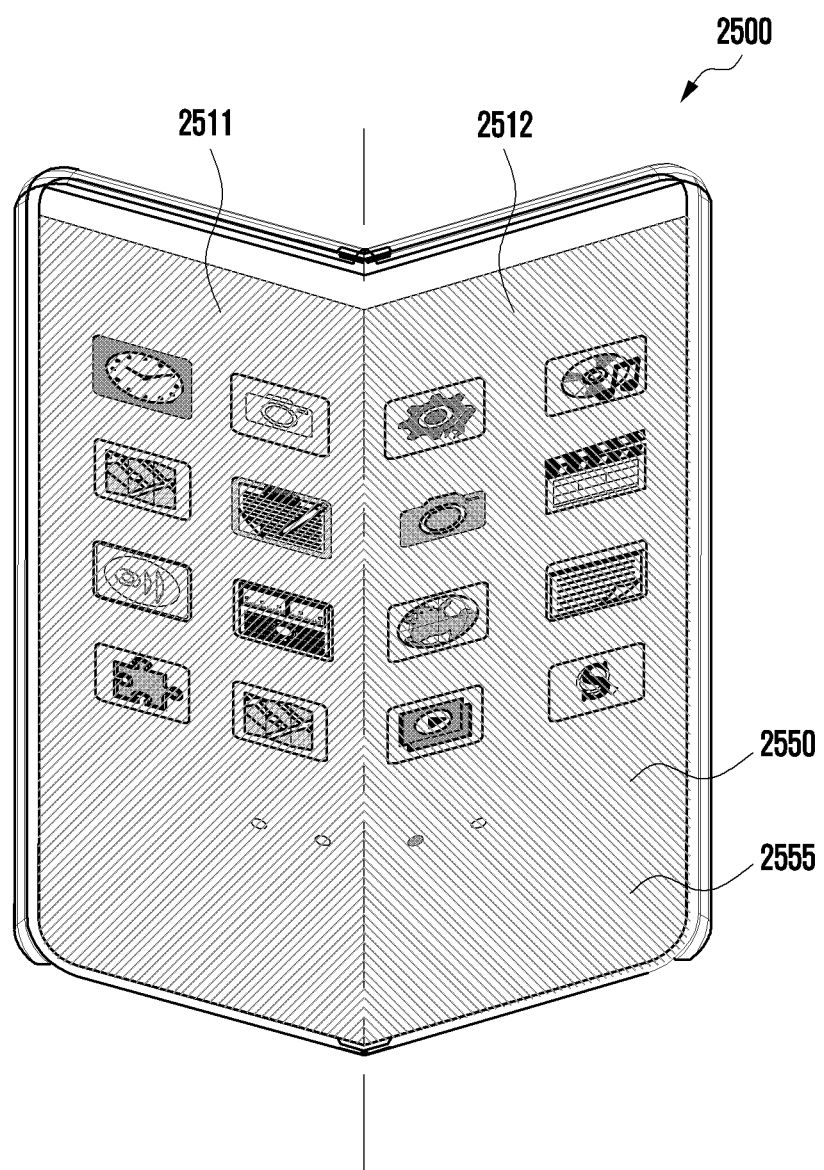

Referring to FIG. 25B, the processor may provide the visual effect 2555 throughout the display when the folding is started.

Figure 25C:
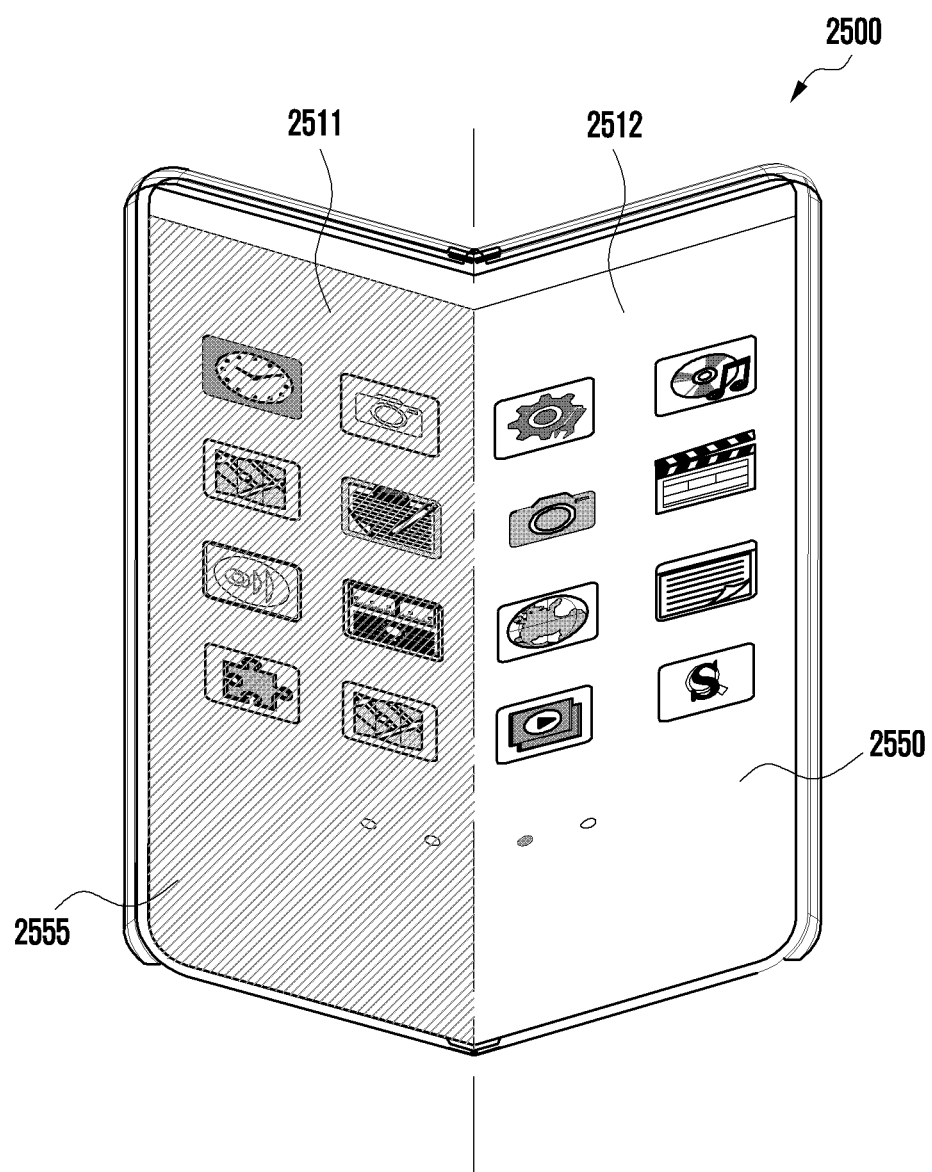

Referring to FIG. 25C, the processor may provide the visual effect 2555 only to the first area 2511 determined to display the application screen when the folding is completed.

According to various embodiments, the processor may not process a touch event by a user's touch input in a situation where the folding is in progress as shown in FIG. 25B or 25C.

According to another embodiment, when the folding is started, the processor may dynamically change a display range of the visual effect, depending on a folding angle. When the electronic device 2500 starts the folding in the unfolded state, the processor may provide the visual effect to all of the first and second areas 2511 and 2512 (e.g., FIG. 25B). Then, as the folding proceeds, that is, as an angle between a first housing structure covering the first area 2511 and a second housing structure covering the second area 2512 is reduced about the folding axis, the processor may reduce the display range of the visual effect in the second area 2512. For example, the visual effect that is provided throughout the first and second areas 2511 and 2512 when the folding is started may be displayed only in the entire first area 2511 and the half (e.g., half close to the first area 2511) of the second area 2512 when the angle between the first and second housing structures is reduced to 90 degrees.

Thereafter, when the folding is completed, all displayed images may be removed from the second area 2512, and the touch lock screen 2570 may be displayed on the first area 2511.

Figure 25D:
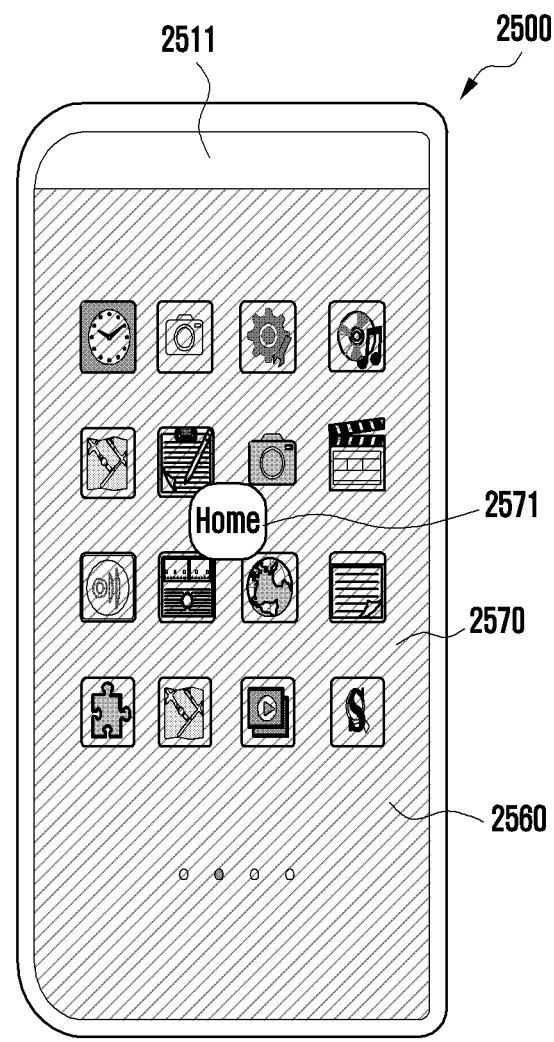

Referring to FIG. 25D, when the folding is completed, the processor may display the touch lock screen 2570 containing at least in part a translucent portion on the first area 2511 of the display. The processor may display the touch lock screen 2570 on an upper layer of the resized execution screen 2560 of the Internet application. The processor may display an icon 2551 indicating the running application on the touch lock screen 2570. When the folding is completed, the processor may turn off the second area or display no information even in a turned-on state.

After the touch lock screen 2570 is displayed, the processor may perform an operation according to a touch event for the first area 2511. At this time, the processor may not process the touch event by a touch input occurring in the second area.

When a predetermined touch input occurs on the touch lock screen 2570 displayed in the first area 2511, the processor may remove the touch lock screen displayed on the upper layer and instead display the application execution screen 2560.

Described with reference to FIGS. 25A to 25D is merely a case of displaying the Internet application having the weak secure level. However, like the electronic device having the in-folding foldable display structure previously described with reference to FIGS. 2A to 18, the electronic device of the out-folding foldable display structure described with reference to FIGS. 21A to 27 may provide different touch lock screens in the non-secure mode, the weak secure mode, and the strong secure mode.

Figure 26:
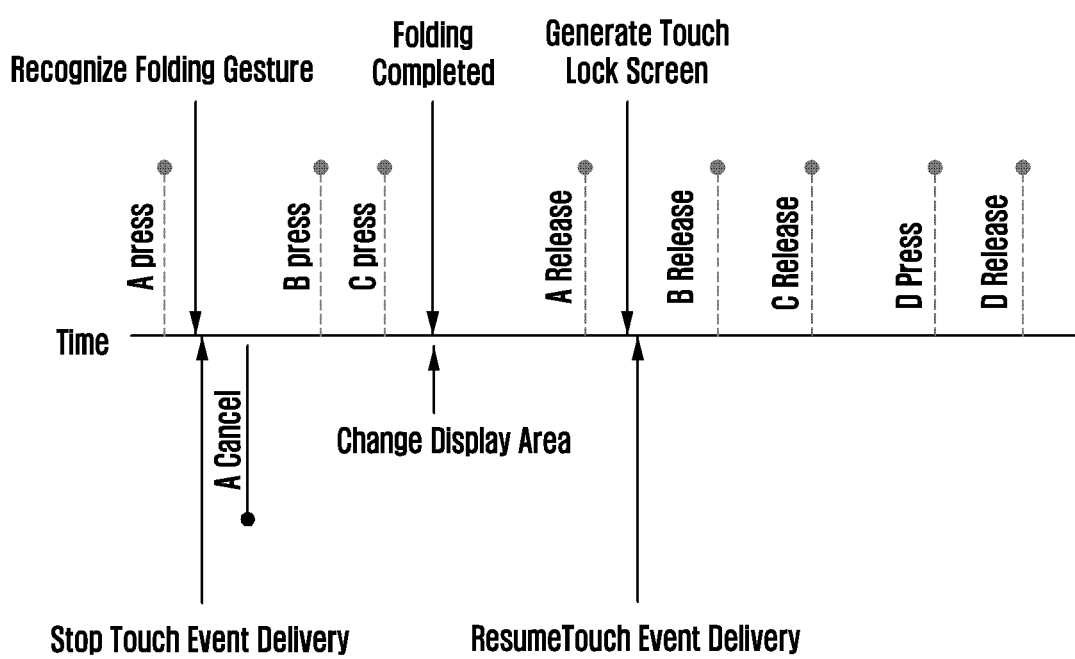
FIG. 26 is a diagram illustrating a method of processing a touch event detected in a folding operation at an electronic device according to an embodiment of the disclosure.

FIG. 26 is a diagram illustrating a method of processing a touch event detected in a folding operation at an electronic device according to an embodiment of the disclosure.

Referring to FIG. 26, a processor (e.g., the processor 2230 in FIG. 22) may display an execution screen of an application on the entire display while the electronic device is unfolded. At this time, a press event (A press) for one region of the display may be detected.

The processor may detect that a folding gesture is started. For example, the processor may detect the folding gesture through a variation in angle between a first housing structure covering a first area of the display and a second housing structure covering a second area of the display.

When the folding gesture is detected, the processor may request a touch sensor of the display to stop transmitting a touch event. Therefore, the touch event of the touch sensor may not be delivered to the processor until the processor requests again the touch sensor to transmit the touch event. For example, the touch event delivered to an event hub from a touch controller in the hardware layer and a touch driver in the kernel driver layer may not be delivered to the application.

Among touch events that have already occurred, the processor may discard a touch event that has not been delivered to the application. For example, the processor may provide the application with a cancel event (A cancel) for the touch event (A press) having been provided to the application before the folding is started. Therefore, the application may not perform an operation corresponding to the previously received touch event (A press) or cancel an operation that has already been performed.

Touch events (B press, C press) occurring while the folding gesture is carried may not be delivered to the processor.

During the folding in which the touch event is not processed, the processor may provide a visual effect (e.g., the visual effect 2555 in FIGS. 25B and 25C) for indicating a progress of the folding on the entire area of the display or on the first or second area of the display where the screen will be displayed after the folding.

When the folding gesture is completed, the processor may terminate displaying the screen in the second area determined to display no screen when the folding, and may not process the touch event occurring in the second area.

In response to folding completion, the processor may display a touch lock screen in the first area of the display determined to display the screen when the folding. In response to displaying the touch lock screen, the processor may activate the touch sensor and request the touch sensor to resume delivery of the touch event.

Therefore, a touch event (A release) occurring before the touch lock screen is displayed may not be provided to the application.

The touch sensor of the display may provide the processor with a touch event occurring after the touch lock screen is generated. For example, from a point of view of the user or the touch sensor, touch events of B release and C release are operations connected with touch events of B press and C press. Because the touch events of B press and C press are made during folding, the touch events of B press and C press may not be delivered to the processor. Thus, even though the touch events of B release and C release are delivered from the touch sensor, the processor may ignore the touch events of B release and C release and may not perform operations corresponding to the touch events of B release and C release. Alternatively, the processor may not provide the touch events of B release and C release to the application.

According to another embodiment, the processor may deliver, to the application, all touch events received from the touch sensor after the touch lock screen is generated. Then, among such touch events, the application may regard some touch events, such as B release and C release, received without corresponding press events as errors and thereby may not reflect them in an application state.

Thereafter, when new touch events of D press and D release are provided from the touch sensor, the processor may perform operations corresponding to the D press and the D release. For example, the processor may remove the touch lock screen from the display in response to touch events (D press and D release) occurring in the first area of the display while the touch lock screen is displayed, and may display an execution screen of the application in the first area of the display. Thereafter, the processor may provide the application with a touch event occurring while the execution screen of the application is displayed.

Unlike FIG. 26, when a touch event of D press is not entered within a given time (e.g., about 5 seconds), the processor may terminate displaying the touch lock screen and turn off the second display.

Figure 27:
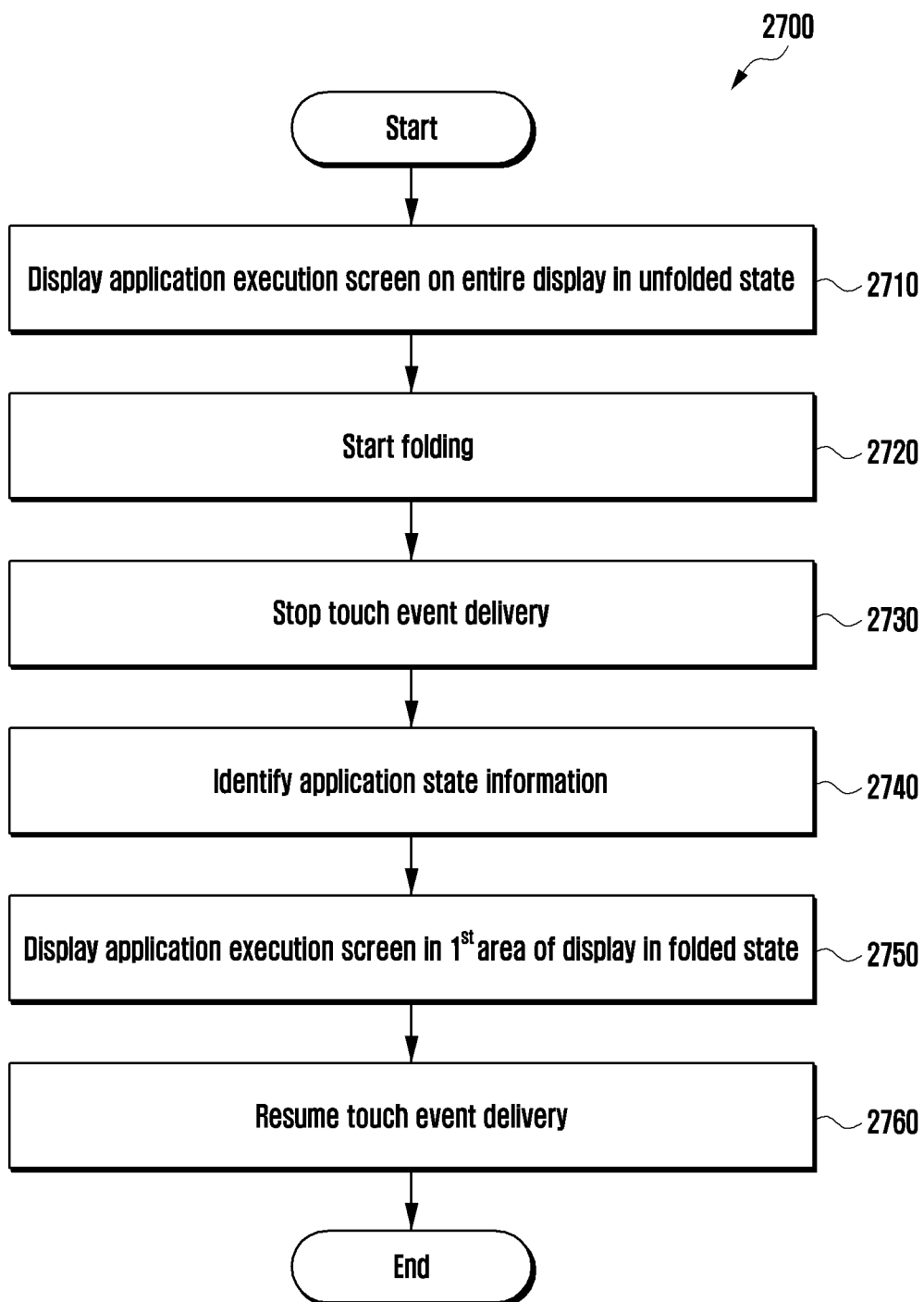
FIG. 27 is a flow diagram illustrating a control method of an electronic device according to an embodiment of the disclosure.

FIG. 27 is a flow diagram illustrating a control method of an electronic device according to an embodiment of the disclosure.

An illustrated method 2700 may be performed by the electronic device described above with reference to FIGS. 21A to 26, and descriptions of the above-described technical features will be omitted hereinafter.

Referring to FIG. 27, at operation 2710, the electronic device may display an execution screen of an application on the entire area of a display in an unfolded state.

At operation 2720, the electronic device may detect a start of a folding gesture. For example, the electronic device may detect the start of the folding gesture through a change in an angle between first and second housing structures of the electronic device.

When the folding gesture is started, the electronic device may request, at operation 2730, a touch sensor of the display to stop delivering a touch event. In response to this delivery stop request, the touch event collected by an event hub may not be transmitted to the application.

At operation 2740, the electronic device may identify state information of the application being executed. According to various embodiments, the application state information may include information related to a security level and/or whether the application is resizable.

At operation 2750, the electronic device may display an application execution screen in a first area of the display. The electronic device may determine, as the first area, an area to display the application execution screen in a folded state, and redraw the application execution screen, based on attributes (e.g., size, ratio, resolution, and the like) of the first area.

The electronic device may generate a touch lock screen, based on the state information of the application. For example, the electronic device may display a translucent touch lock screen on an upper layer of the application execution screen. In addition, the electronic device may terminate displaying the screen in a second area of the display and may not process a touch event occurring in the second area.

At operation 2760, after the touch lock screen is displayed, the electronic device may process a touch event for the first area received from the touch sensor of the display. When a predetermined touch input (e.g., swipe) occurs on the touch lock screen, the electronic device may remove the touch lock screen and instead display the application execution screen in the first area of the display.

Figure 28:
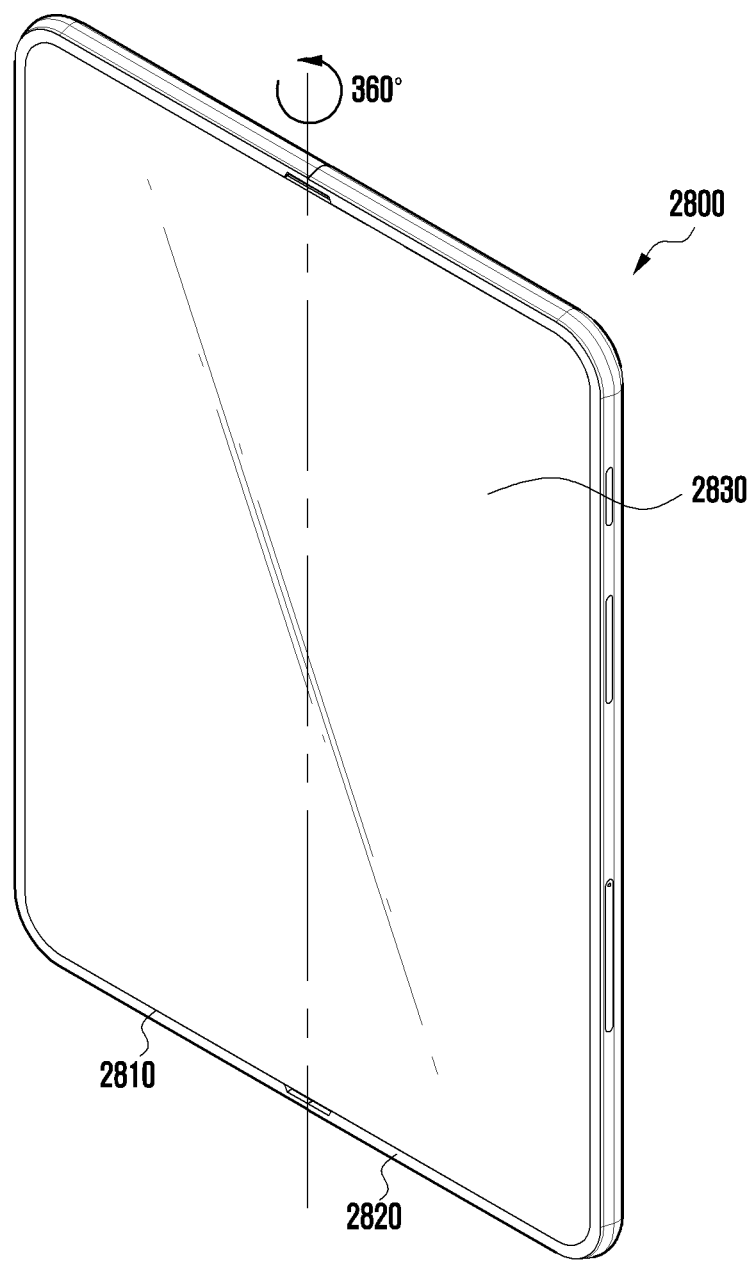
FIG. 28 is a perspective view showing an electronic device in which a part of housing structures is rotatable 360 degrees according to an embodiment of the disclosure.

FIG. 28 is a perspective view showing an electronic device in which a part of housing structures is rotatable 360 degrees according to an embodiment of the disclosure.

Referring to FIG. 28, an electronic device 2800 may include a first housing structure 2810, a second housing structure 2820, and a display 2830. The display 2830 may be disposed on front surfaces of the first and second housing structures 2810 and 2820.

Each of the first and second housing structures 2810 and 2820 may be rotatable 360 degrees. For example, when the second housing structure 2820 rotates clockwise, folding is made in a direction where first and second areas of the display 2830 face each other as similar to the above-described in-folding foldable display structure. In addition, when the second housing structure 2820 rotates counterclockwise, folding is made in a direction where the first and second areas of the display 2830 are seen from the outside as similar to the above-described out-folding foldable display structure.

When the second housing structure 2820 rotates clockwise as in the in-folding foldable display structure, the electronic device 2800 may operate like having the in-folding foldable display structure as described above with reference to FIGS. 2A to 18. For example, a processor of the electronic device 2800 may display an execution screen of an application on a second display disposed on a rear surface of the first housing structure 2810 when the electronic device 2800 is folded.

In addition, when the second housing structure 2820 rotates counterclockwise as in the out-folding foldable display structure, the electronic device 2800 may operate like having the out-folding foldable display structure as described above with reference to FIGS. 21A to 27. For example, the processor of the electronic device 2800 may display the application execution screen on a first or second area of the display 2830 when the electronic device 2800 is folded.

Hereinafter, an electronic device having a dual display structure in which two displays, which are physically separated from each other, are disposed on the front surface of the housing will be described with reference to FIGS. 29A to 30. Although the following description will focus on the electronic device having the dual display structure and being folded in the in-folding structure, the same description may also be applied to the electronic device being folded in the out-folding structure.

Figure 29A:
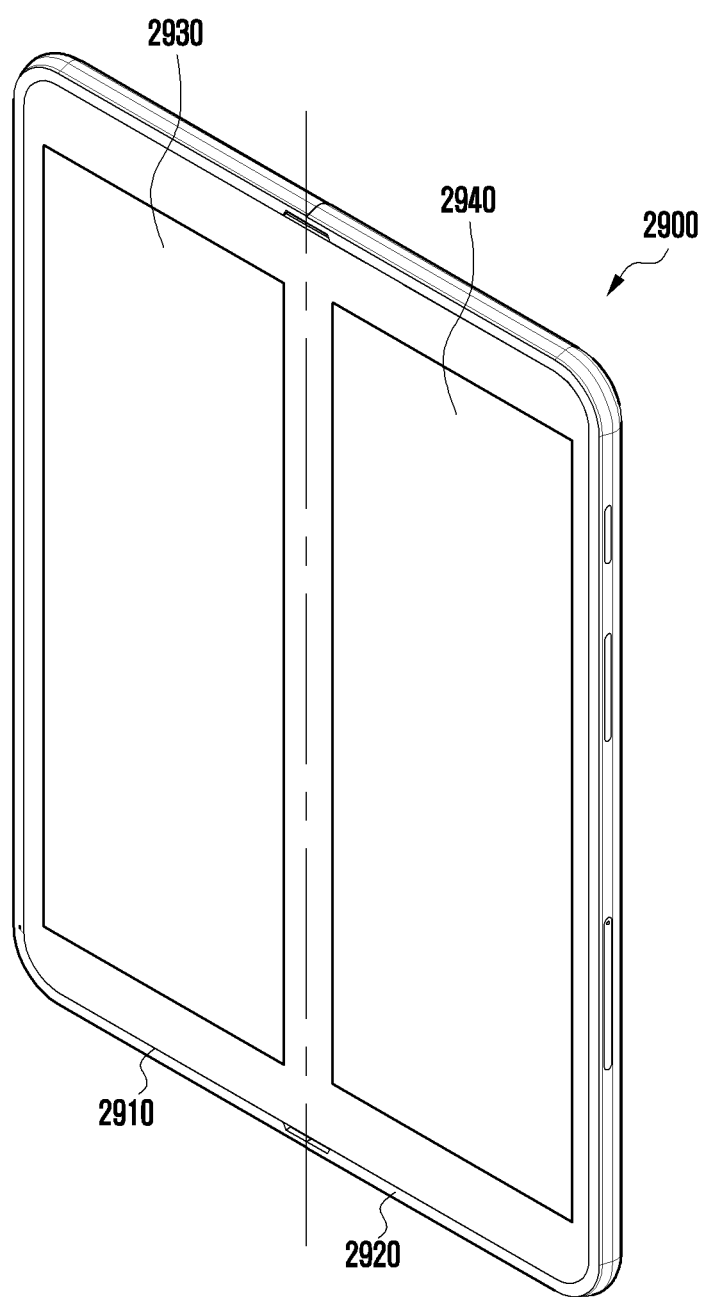
FIGS. 29A and 29B are perspective views showing an electronic device having a plurality of displays on one surface of a housing according to various embodiments of the disclosure.
Figure 29B:
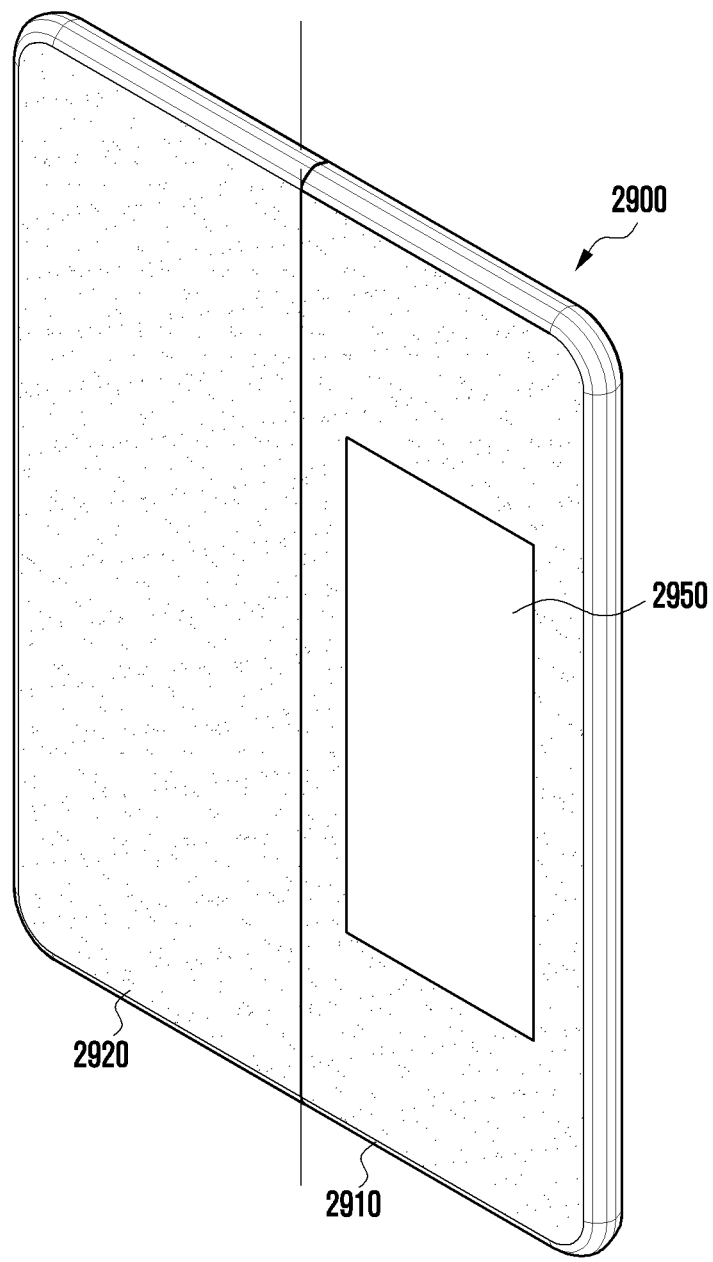

FIGS. 29A and 29B are perspective views showing an electronic device having a plurality of displays on one surface of a housing according to various embodiments of the disclosure.

An electronic device 2900 may include a first housing structure 2910 and a second housing structure 2920 that are rotatably combined through a hinge structure to be foldable with each other.

Referring to FIG. 29A, a first display 2930 may be disposed on a front surface of the first housing structure 2910, and a second display 2940 may be disposed on a front surface of the second housing structure 2920. The first and second displays 2930 and 2940 are physically separated and may be connected to a processor of the electronic device 2900 through independent ports and interfaces. The first display 2930 may include a first touch sensor (not shown) for detecting a touch input on the first display 2930, and the second display 2940 may include a second touch sensor (not shown) for detecting a touch input on the second display 2940.

Referring to FIG. 29B, a third display 2950 may be disposed on a rear surface of the first housing structure 2910. The third display 2950 may include a third touch sensor (not shown) for detecting a touch input on the third display 2950.

The electronic device 2900 may be folded based on the folding axis. For example, the second housing structure 2920 may rotate clockwise to fold in a direction where the first display 2930 and the second display 2940 face each other.

Figure 30:
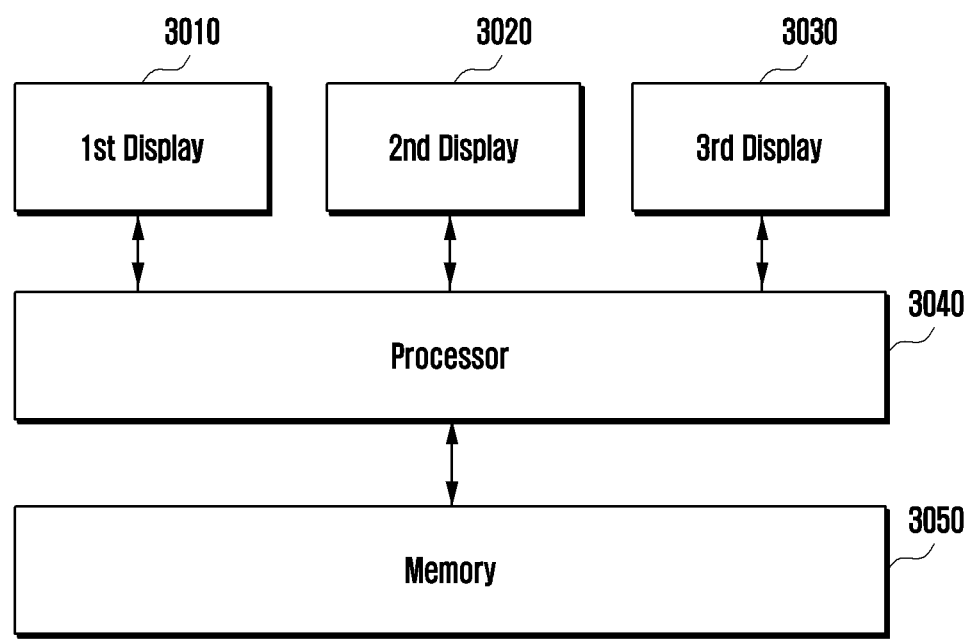
FIG. 30 is a block diagram illustrating an electronic device according to an embodiment of the disclosure.

FIG. 30 is a block diagram illustrating an electronic device according to an embodiment of the disclosure.

Referring to FIG. 30, an electronic device 3000 may include a first display 3010, a second display 3020, a third display 3030, a processor 3040, and a memory 3050. Some of such components of the electronic device 3000 may be omitted or replaced. The electronic device 3000 may include at least some of the configurations and/or functions of the electronic device 101 in FIG. 1A and/or FIG. 1B. The electronic device 3000 may include the dual display structure shown in FIGS. 29A and 29B.

According to various embodiments, the first display 3010 may be disposed on a front surface of a first housing structure (e.g., the first housing structure 2910 in FIGS. 29A and 29B), and the second display 3020 may be disposed on a front surface of a second housing structure (e.g., the second housing structure 2920 in FIGS. 29A and 29B). Therefore, when the electronic device 3000 is in an unfolded state, the first display 3010 and the second display 3020 may face the same direction. The third display 3030 may be disposed on a rear surface of the first housing structure. According to an embodiment, the electronic device 3000 may not include the third display 3030. According to an embodiment, the second display 3020 may be separated from the second housing structure. To this end, the second housing structure may include a structure allowing the second display 3020 to be detachable and also include one or more pins for electrical connection when attached.

According to various embodiments, the processor 3040 may display an execution screen of an application on the first display 3010 and/or the second display 3020 when the electronic device 3000 is unfolded. At this time, when a plurality of applications are running, the processor 3040 may display a screen of a first application on the first display 3010 and also display a screen of a second application on the second display 3020. When only one application is running, the processor 3040 may divide an execution screen of the application and display the divided screens on the first display 3010 and the second display 3020, respectively, or may display the execution screen of the application on one of the first and second displays 3010 and 3020.

When the electronic device 3000 is in an unfolded state, the third display 3030 may be turned off.

According to various embodiments, when a folding gesture is started, the processor 3040 may request a touch sensor to stop transmitting a touch event. According to various embodiments, the processor 3040 may cancel a touch event (e.g., a press event or a release event) having been provided to the application before the folding gesture is started. According to various embodiments, when folding is started, the processor 3040 may provide the application with a cancel event corresponding to the touch event previously provided.

According to various embodiments, when the electronic device 3000 is folded, the processor 3040 may turn off the first display 3010 and the second display 3020 and display an application execution screen on the third display 3030. The processor 3040 may redraw an application, based on attributes (e.g., size, ratio, resolution, density, and the like) of the third display 3030.

According to various embodiments, the processor 3040 may display a touch lock screen on the third display 3030 in response to the folding gesture. After displaying the touch lock screen, the processor 3040 may process a touch event received from a third touch sensor of the third display 3030. The processor 3040 may release the touch lock screen in response to a touch event received from the third display 3030 after displaying the touch lock screen and provide the touch event to a running application.

According to various embodiments, the processor 3040 may generate the touch lock screen, based on state information of the application. The application state information may include information about a security level assigned to the application and/or information about whether the application execution screen is resizable.

In addition, the electronic device 3000 may further include the features of the electronic device having the in-folding foldable display structure described above with reference to FIGS. 2A through 18. In this case, the first area (e.g., the first area 451 in FIG. 4E) and the second area (e.g., the second area 452 in FIG. 4E) of the first display in the in-folding foldable display structure may correspond to the first display 3010 and the second display 3020 in the dual display structure, respectively.

Figure 31A:
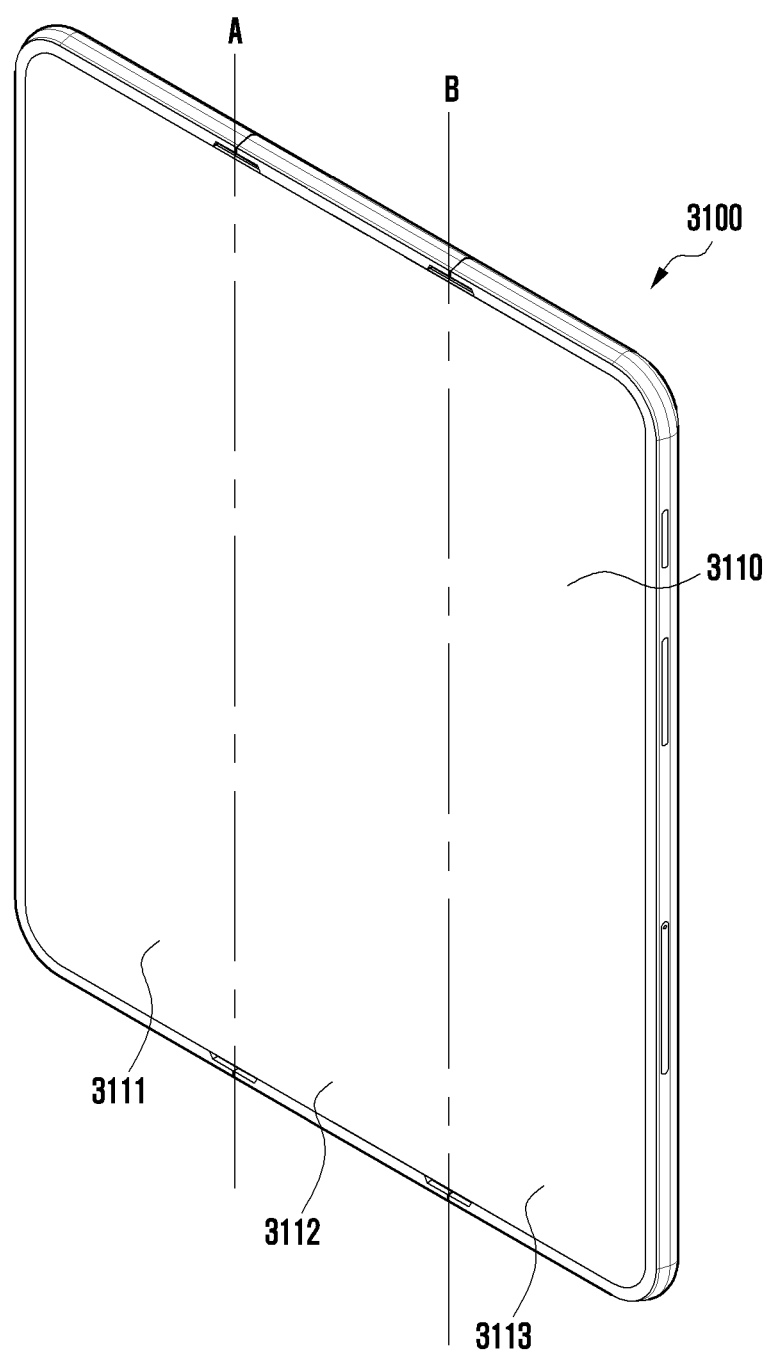
FIGS. 31A and 31B are views showing a G-shape foldable electronic device according to various embodiments of the disclosure.
Figure 31B:
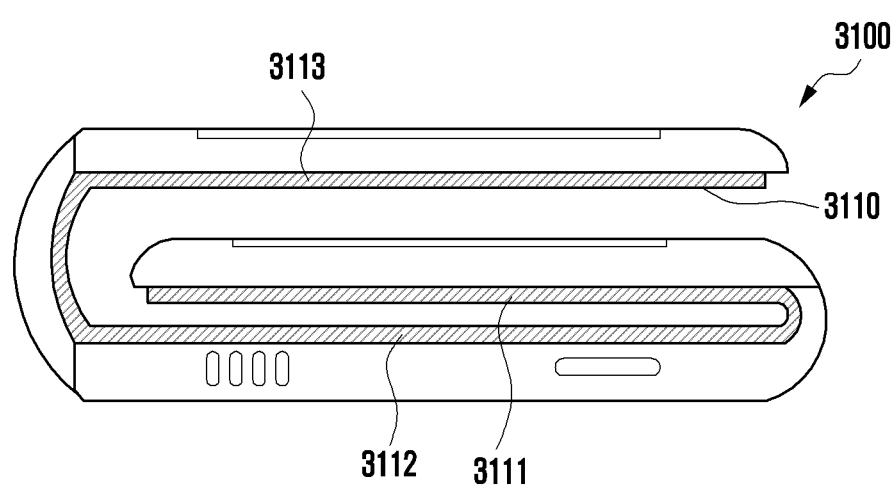

FIGS. 31A and 31B are views showing a G-shape foldable electronic device according to various embodiments of the disclosure.

According to various embodiments, an electronic device 3100 may include a first housing structure 3111, a second housing structure 3112, and a third housing structure 3113 that are divided based on two folding axes A and B.

Referring to FIG. 31A, a display 3110 may be disposed on front surfaces of the first, second, and third housing structures 3111, 3112, and 3113. The display 3110 has a foldable display structure being foldable about two folding axes. That is, the display 3110 may be divided into a first area disposed on the first housing structure 3111, and a second area disposed on the second housing structure 3112, and a third area disposed on the third housing structure 3113.

Referring to FIG. 31B, the first housing structure 3111 may be folded inwardly toward the second housing structure 3112, and then the third housing structure 3113 may be folded inwardly. Therefore, in a folded state, the first area of the display 3110 may face the second area, and the third area may face a rear surface of the first housing structure 3111.

According to various embodiments, when folding is started, the electronic device 3100 may not process a touch event occurring on the display 3110. When the folding is completed, the electronic device 3100 may turn off the display 3110.

Figure 32A:
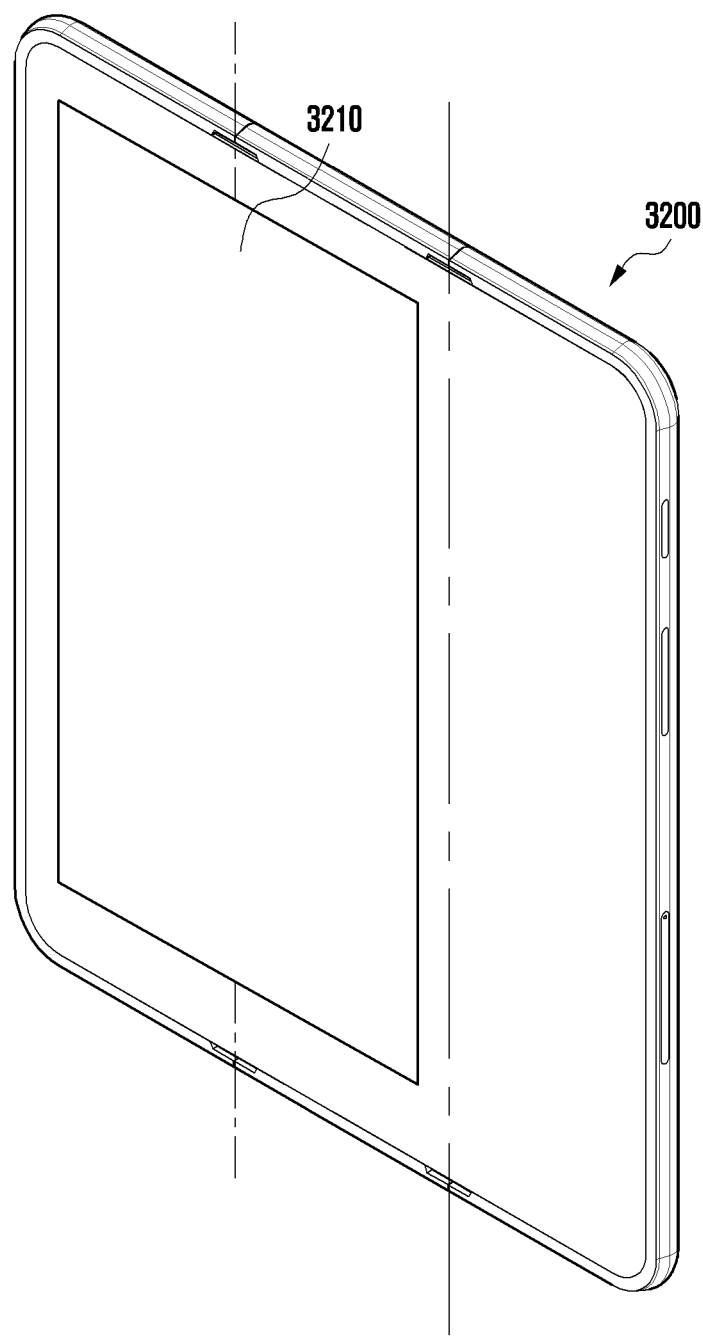
FIGS. 32A, 32B, and 32C are views showing an S-shape foldable electronic device according to various embodiments of the disclosure.
Figure 32B:
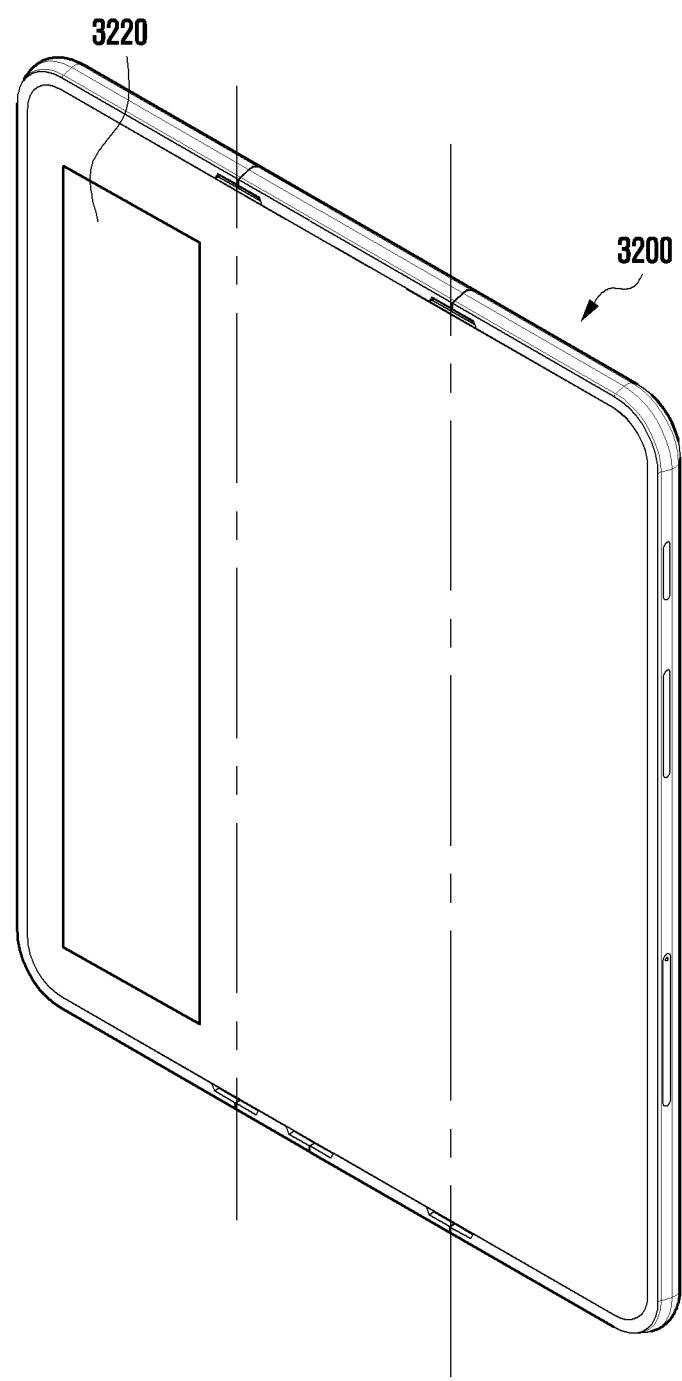
Figure 32C:
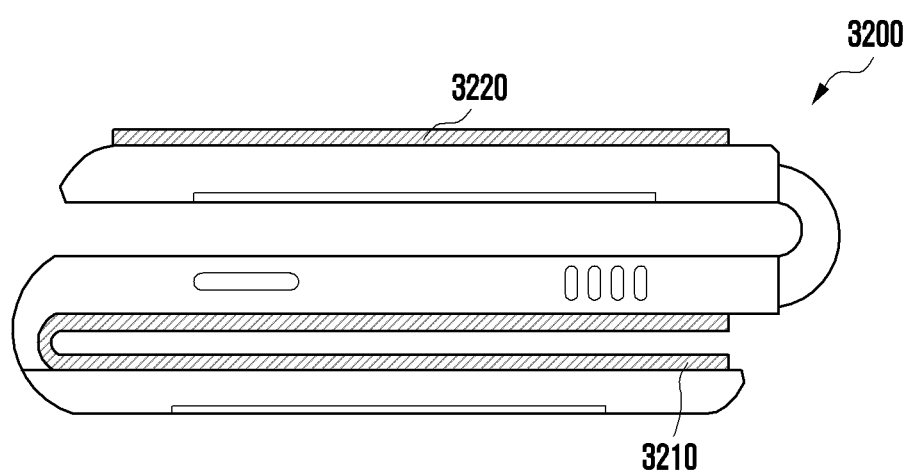

FIGS. 32A, 32B, and 32C are views showing an S-shape foldable electronic device according to various embodiments of the disclosure.

According to various embodiments, an electronic device 3200 may include a first housing structure, a second housing structure, and a third housing structure that are divided based on two folding axes.

Referring to FIG. 32A, a first display 3210 may be disposed on front surfaces of the first and second housing structures.

Referring to FIG. 32B, a second display 3220 may be disposed on a rear surface of the third housing structure. The first display 3210 may be a foldable display, and the second display 3220 may not be foldable.

Because the first display 3210 covers two housing structures, the first display 3210 may have a greater size than that of the second display 3220.

Referring to FIG. 32C, when the electronic device 3200 is folded, first and second areas of the first display 3210 distinguished by one folding axis may face each other, and the second display 3220 may be exposed to the outside.

According to various embodiments, in an unfolded state, the electronic device 3200 may display an application screen on the first display 3210. At this time, the second display 3220 may be turned off. In a folded state, the electronic device 3200 may display the application screen on the second display 3220 and turn off the first display 3210.

When folding is started, the processor may not process a touch event occurring on the first display 3210. In response to the folding of the electronic device 3200, the processor may resize the application screen, based on attributes (e.g., size, ratio, resolution, density, etc.) of the second display 3220 and display the resized application screen on the second display 3220. Also, in response to a folding gesture, the processor may generate a touch lock screen and display the touch lock screen in an area to display the application screen after the folding. The touch lock screen may be determined according to state information (e.g., security level and/or whether the application is resizable) of the running application.

Figure 33A:
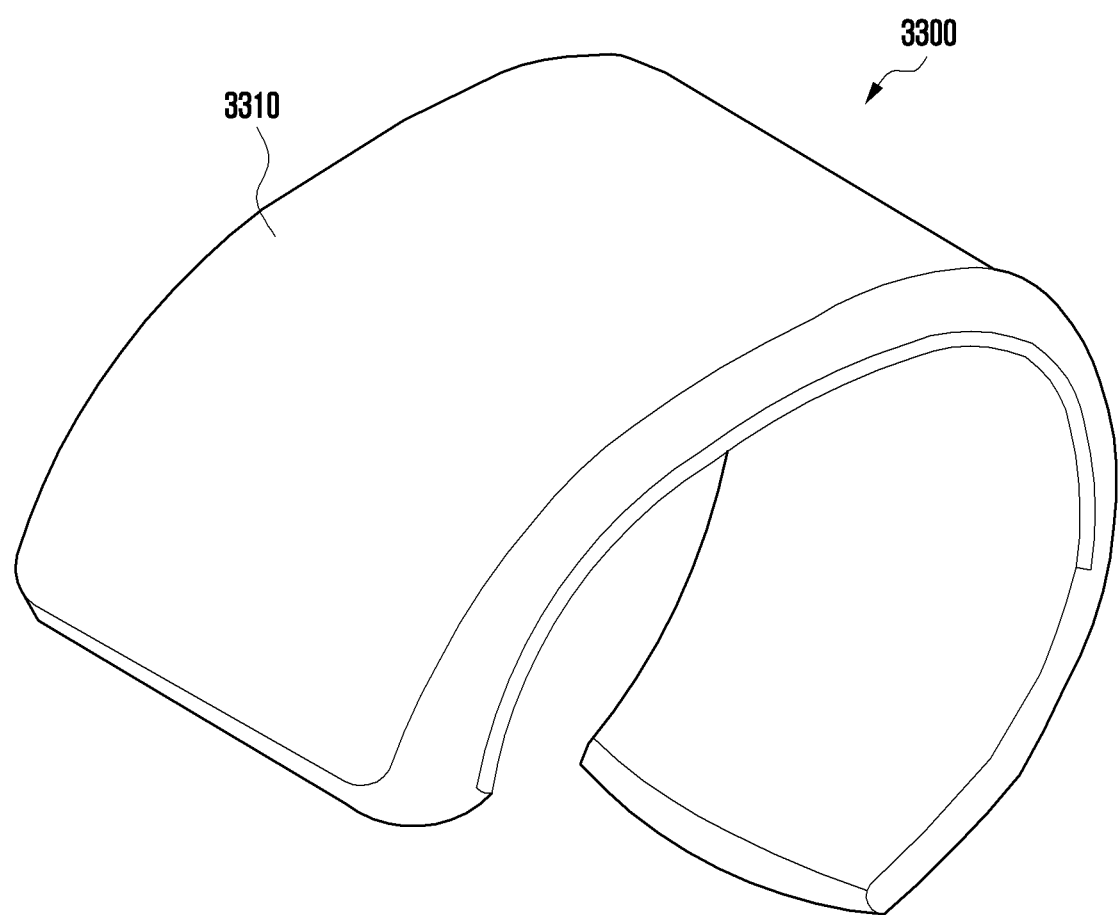
FIGS. 33A and 33B are views showing an electronic device having a rollable display according to various embodiments of the disclosure.
Figure 33B:
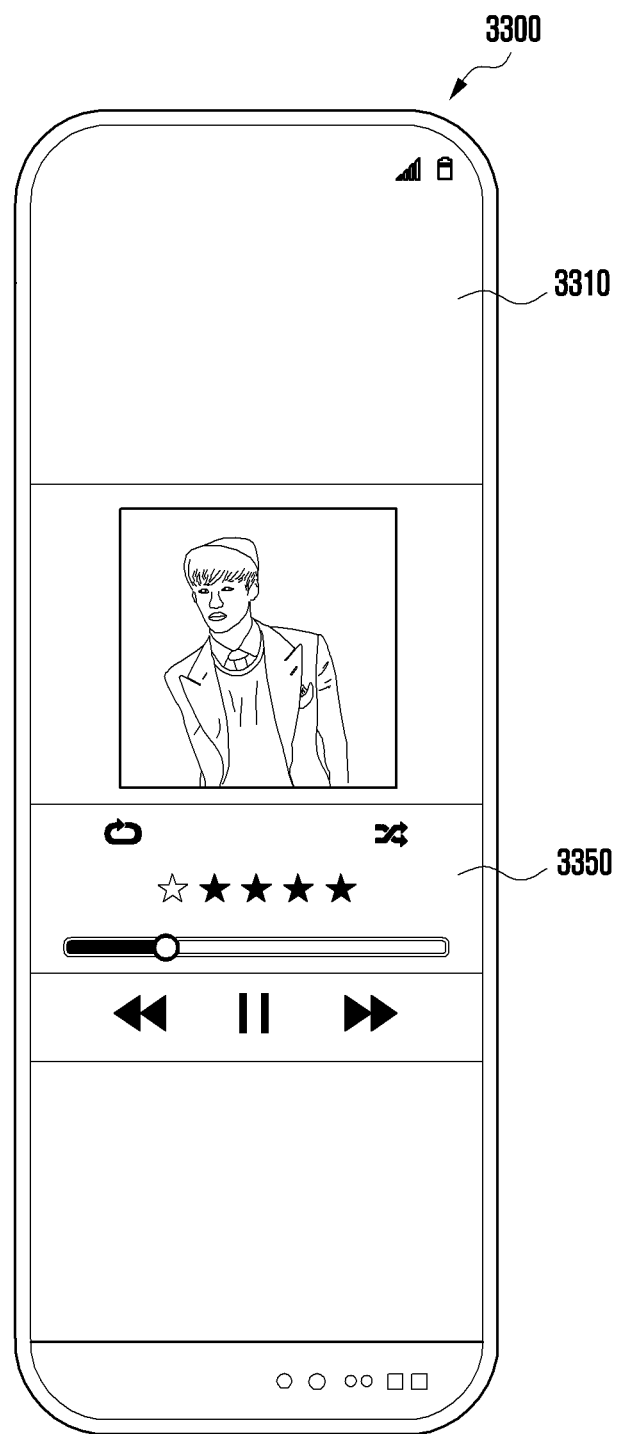

FIGS. 33A and 33B are views showing an electronic device having a rollable display according to various embodiments of the disclosure.

Referring to FIG. 33A, an electronic device 3300 may have a wholly woundable form without any folding axis. A display 3310 may be disposed on a front surface of the electronic device 3300. The display 3310 may be a rollable display. When the electronic device 3300 is fully unfolded, an execution screen of an application may be displayed on the entire display 3310.

Referring to FIG. 33B, the electronic device 3300 may be rolled. When the electronic device 3300 is rolled at a predetermined angle or more, the electronic device 3300 may determine an area to display an application in response to rolling. For example, the electronic device 3300 may display an execution screen 3350 of the application in a central area of the display 3310. In a rolled state, the electronic device 3300 may resize the application screen, based on attributes (e.g., size, ratio, resolution, density, etc.) of the determined area to display the application.

According to various embodiments, when the rolling is started, the electronic device 3300 may not process a touch event. When the rolling is completed, the electronic device 300 may display a touch lock screen and process a touch event occurring in the corresponding area after displaying the touch lock screen. In this case, no screen may be displayed on an area other than the display area, and a touch event occurring in the corresponding area may not be processed.

Figure 34:
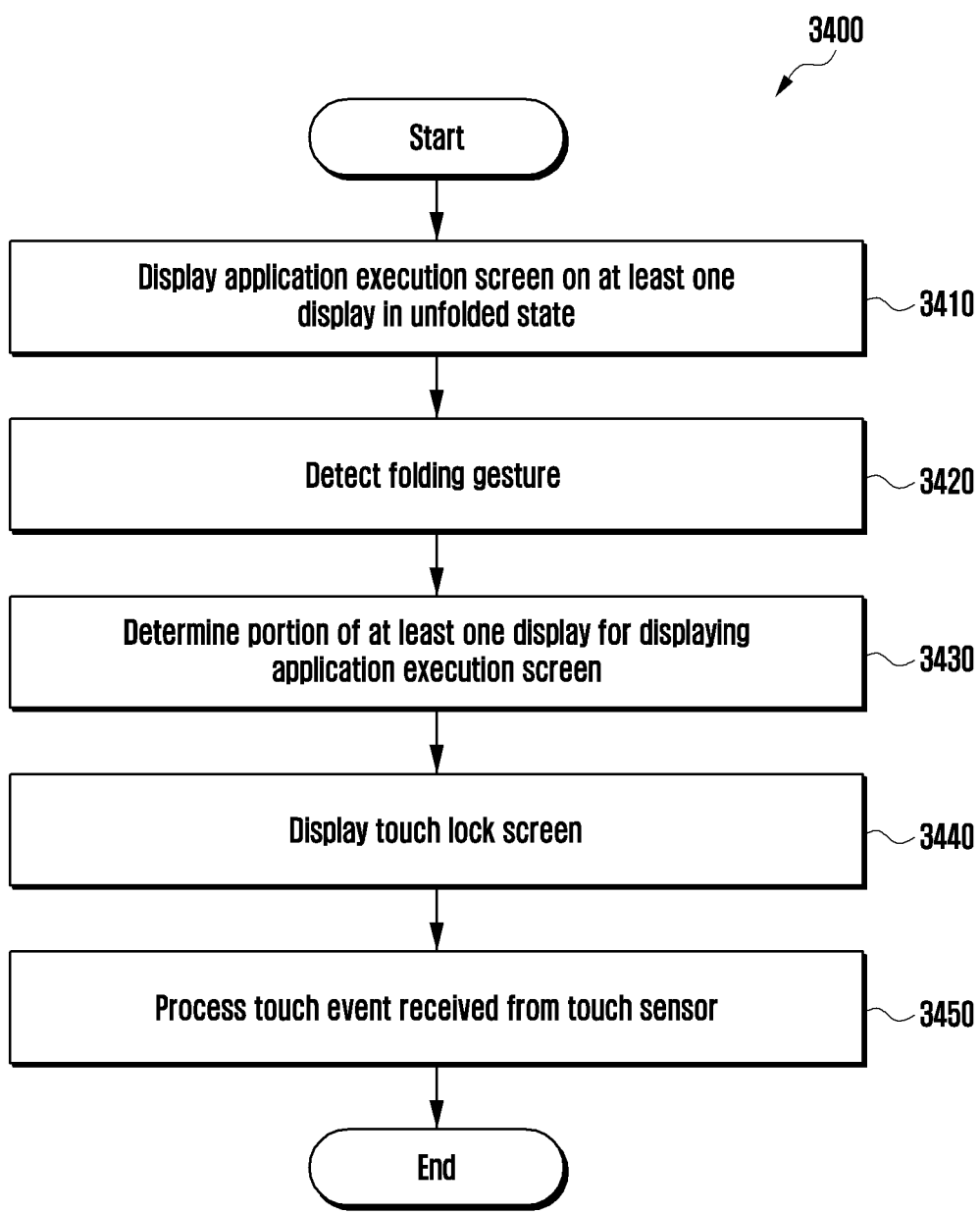
FIG. 34 is a flow diagram illustrating a control method of an electronic device according to an embodiment of the disclosure.

FIG. 34 is a flow diagram illustrating a control method of an electronic device according to an embodiment of the disclosure.

An illustrated method 3400 may be performed by the electronic device (e.g., the electronic device 101 in FIG. 1B) described above with reference to FIGS. 1A to 33B, and descriptions of the above-described technical features will be omitted hereinafter.

Referring to FIG. 34, at operation 3410, the electronic device may display an application execution screen on at least one display in an unfolded state. According to various embodiments, the electronic device may be configured with various form factors (e.g., an in-folding foldable display structure, an out-folding foldable display structure, a dual display structure, a G-type folding structure, an S-type folding structure, or a rollable display structure). A display area for displaying the application execution screen in the unfolded state as to each form factor structure has been previously described.

At operation 3420, the electronic device may detect a folding gesture. The folding gesture may refer to a user's action of folding a part of the electronic device based on the folding axis by applying force to the electronic device being in the unfolded state. When the folding gesture is started, the electronic device may request each display to stop transmission of a touch event, or ignore a received touch event. The electronic device may cancel a touch event having been provided to an application before the folding gesture is started.

At operation 3430, in response to the folding gesture, the electronic device may determine an area (or a portion) of at least one display to display an application execution screen. For example, when the electronic device has the in-folding foldable display structure, the application screen may be displayed using both a foldable first display disposed on one housing surface and a non-foldable second display disposed on the other housing surface. When the electronic device has the out-folding foldable display structure, the application screen may be displayed on any one of first and second areas separated based on a folding axis of a foldable display. In case where most of a display is not viewed to the user among the above-described various form factors (e.g., in case where there is no rear display in the in-folding foldable display structure or in the dual display structure), the application is no longer displayed and may be operated in the background when the electronic device is folded.

At operation 3440, the electronic device may generate and display a touch lock screen on the determined area (or portion). The touch lock screen according to various embodiments has been described above with reference to FIGS. 10A to 10F.

At operation 3450, the electronic device may process a touch event received from the touch sensor of the display on which the application execution screen is displayed after the touch lock screen is displayed. The electronic device may release the touch lock screen in response to a touch event received from the display after the touch lock screen is displayed, and provide the touch event to a running application.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A mobile communication device comprising:
   a foldable housing including a first housing portion and a second housing portion;
   a first touch display accommodated on an inner side of the housing, which is visible when the housing is at least partially unfolded and substantially invisible from an outside of the communication device when the housing is fully folded;
   a second touch display accommodated on an outer side of the first housing portion; and
   a processor; and memory storing instructions which, when executed by the processor, cause the mobile communication device to:
while the housing is unfolded and the second touch display is deactivated, control to display, via the first touch display, a first execution screen corresponding to a first application being executed,
in response to the housing being folded from being unfolded while the first execution screen is displayed via the first touch display, control to deactivate the first touch display and, control to display, via the second touch display, a touch lock screen including an indication for removing the touch lock screen, and
while the housing is fully folded and the first touch display is deactivated, based on a touch input according to the indication, control the second touch display, to change from displaying the touch lock screen including the indication to displaying a second execution screen having a size corresponding to the second touch display according to attributes of the second touch display, based on the first execution screen displayed from prior to the folding of the housing.

2. The mobile communication device of claim 1, wherein, when executed by the processor, the instructions further cause the mobile communication device to:
perform the displaying of the second execution screen based at least in part on a determination that the touch input including a swipe input is received via the second touch display, while the touch lock screen including the indication is displayed on the second touch display.

3. The mobile communication device of claim 1, wherein the first touch display has an attribute different from the second touch display.

4. The mobile communication device of claim 3, wherein, when executed by the processor, the instructions further cause the mobile communication device to:
generate the first execution screen based at least in part on an attribute of the first touch display, and
generate the second execution screen, by resizing the first execution screen, based at least in part on an attribute of the second touch display.

5. The mobile communication device of claim 4, wherein, when executed by the processor, the instructions further cause the mobile communication device to:
perform the resizing of the first execution screen based at least in part on one portion of data corresponding to the first execution screen, and not another portion of the data.

6. The mobile communication device of claim 4, wherein, when executed by the processor, the instructions further cause the mobile communication device to:
based at least in part on a determination that the touch input according to the indication is entered within a predetermined time from displaying the touch lock screen, control the second touch display to displaying a second execution screen.

7. The mobile communication device of claim 1, wherein, when executed by the processor, the instructions further cause the mobile communication device to:
based at least in part on a determination that the touch input according to the indication is not detected within a predetermined time from displaying of the touch lock screen, control the second touch display to terminate displaying of the touch lock screen and turn off.

8. The mobile communication device of claim 1, wherein, when executed by the processor, the instructions further cause the mobile communication device to:
while the housing is fully folded, perform at least one of the displaying of the touch lock screen, the displaying of the second execution screen, or the deactivating of the second touch display based at least in part on a display policy selected by a user.

9. The mobile communication device of claim 1, wherein, when executed by the processor, the instructions further cause the mobile communication device to:
display the second execution screen as substantially invisible while the touch lock screen is displayed via the second touch display.

10. The mobile communication device of claim 1, wherein, when executed by the processor, the instructions further cause the mobile communication device to:
execute a video application as the first application.

11. A mobile communication device comprising:
a foldable housing including a first housing portion and a second housing portion rotatable connected with the first housing portion;
a first touch display disposed across the first housing portion and the second housing portion, wherein the first touch display is not exposed to the outside when the foldable housing is in folded state;
a second touch display disposed on opposite side of the first touch display in the first housing portion and having an attribute different from the first touch display;
a processor; and
memory storing instructions which, when executed by the processor, cause the mobile communication device to:
in response to a first touch input to execute an application on the first touch display, received while the foldable housing is unfolded state:
execute the application,
generate a first execution screen corresponding to the executed application based on an attribute of the first touch display, and
display the first execution screen on the first touch display, in response to the foldable housing is changed to the folded state:
activate the second touch display,
display a graphic object including information regarding the executed application can be used in continuation from prior to the folding of the foldable housing on the second touch display, and
in response to a second touch input received through the second touch display while the graphic object is displayed:
remove display of the graphic object from the second touch display; and
display a second execution screen corresponding to the executed application having a size corresponding to the second touch display based on an attribute of the second execution screen.

12. The mobile communication device of claim 11, wherein the second touch input is a swipe input across the graphic object on the second touch display.

13. The mobile communication device of claim 11, wherein the attributes of the second touch display comprises at least one of a size, a ratio, or a resolution of the second touch display.

14. A method of a mobile communication device comprising a foldable housing including a first housing portion and a second housing portion and a first touch display accommodated on an inner side of the foldable housing and a second touch display accommodated on an outer side of the first housing portion, the method comprising:
- while the foldable housing is unfolded and the second touch display is deactivated, displaying, via the first touch display, a first execution screen corresponding to a first application being executed,
- in response to the foldable housing being folded from being unfolded, while the first execution screen is displayed via the first touch display:
  - deactivating the first touch display, and
  - displaying, via the second touch display, a touch lock screen including an indication for removing the touch lock screen, and
- while the foldable housing is fully folded and the first touch display is deactivated, based on a touch input according to the indication, changing, by the second touch display, from displaying the touch lock screen including the indication, to displaying a second execution screen having a size corresponding to the second touch display according to attributes of the second touch display, based on the first execution screen displayed from prior to the folding of the foldable housing.

15. The method of claim 14, wherein displaying of the second execution screen comprises:
- displaying the second execution screen, based at least in part on a determination that the touch input including a swipe input is received via the second touch display, while the touch lock screen including the indication is displayed on the second touch display.

16. The method of claim 14, wherein the first touch display has an attribute different from the second touch display, and the method further comprises:
- generating the first execution screen based at least in part on an attribute of the first touch display, and
- generating the second execution screen, by resizing the first execution screen, based at least in part on an attribute of the second touch display.

17. The method of claim 14, wherein resizing of the first execution screen comprises resizing the first execution screen based at least in part on one portion of data corresponding to the first execution screen, and not another portion of the data.

18. The method of claim 14, wherein displaying of the second execution screen comprises:
- displaying the second execution screen, based at least in part on a determination that the touch input according to the indication is entered within a predetermined time from displaying the touch lock screen.

19. The method of claim 14, further comprising:
- terminating displaying of the touch lock screen, based at least in part on a determination that the touch input according to the indication is not detected within a predetermined time from displaying of the touch lock screen.

20. The method of claim 14, wherein the second execution screen is substantially invisible while the touch lock screen is displayed via the second touch display.

* * * * *